(12) United States Patent
Schiffer et al.

(10) Patent No.: US 11,542,288 B2
(45) Date of Patent: Jan. 3, 2023

(54) ANTIVIRAL COMPOUNDS

(71) Applicant: University of Massachusetts, Boston, MA (US)

(72) Inventors: Celia A. Schiffer, Shrewsbery, MA (US); Akbar Ali, Westborough, MA (US); Nese Kurt-Yilmaz, Shrewsbury, MA (US); Linah N. Rusere, Hendersonville, NC (US); Gordon J. Lockbaum, Worcester, MA (US); Mina Henes, Boxborough, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 17/334,454

(22) Filed: May 28, 2021

(65) Prior Publication Data
US 2021/0371439 A1 Dec. 2, 2021

Related U.S. Application Data

(60) Provisional application No. 63/032,902, filed on Jun. 1, 2020.

(51) Int. Cl.
*C07F 9/6561* (2006.01)

(52) U.S. Cl.
CPC ................. *C07F 9/6561* (2013.01)

(58) Field of Classification Search
CPC .................................................. C07F 9/6561
See application file for complete search history.

(56) References Cited

U.S. PATENT DOCUMENTS 7,649,015 B2 * 1/2010 Arimili ................ C07D 239/49
549/220

OTHER PUBLICATIONS

PubChem CID 144113959, National Center for Biotechnology Information. PubChem Compound Summary for CID 144113959. https://pubchem.ncbi.nlm.nih.gov/compound/144113959. Accessed May 17, 2022, create date Dec. 7, 2019. (Year: 2019).*
PubChem CID 89111550, National Center for Biotechnology Information. PubChem Compound Summary for CID 89111550. https://pubchem.ncbi.nlm.nih.gov/compound/89111550. Accessed May 17, 2022, create date Feb. 13, 2015. (Year: 2015).*
Abel et al., "Advancing drug discovery through enhanced free energy calculations," Accounts of Chemical Research, Jul. 18, 2017, 50(7):1625-32.
Adams et al., "PHENIX: a comprehensive Python-based system for macromolecular structure solution," Acta Crystallographica Section D: Biological Crystallography, Feb. 1, 2010, 66(2):213-21.
Afantitis et al., "A combined LS-SVM & MLR QSAR workflow for predicting the inhibition of CXCR3 receptor by quinazolinone analogs," Molecular Diversity, May 2010, 14(2):225-35.
Ali et al., "Discovery of HIV-1 protease inhibitors with picomolar affinities incorporating N-aryl-oxazolidinone-5-carboxamides as novel P2 ligands," Journal of Medicinal Chemistry, Dec. 14, 2006, 49(25):7342-56.
Ali et al., "Structure-based design, synthesis, and structure—activity relationship studies of HIV-1 protease inhibitors incorporating phenyloxazolidinones," Journal of Medicinal Chemistry, Nov. 11, 2010, 53(21):7699-708.
Altman et al., "HIV-1 protease inhibitors from inverse design in the substrate envelope exhibit subnanomolar binding to drug-resistant variants," Journal of the American Chemical Society, May 14, 2008, 130(19):6099-113.
Anderson et al., "Viral protease inhibitors," Antiviral Strategies, Jan. 2009, 189:85-110.
Aoki et al., "A novel central nervous system-penetrating protease inhibitor overcomes human immunodeficiency virus 1 resistance with unprecedented aM to pM potency," Elife, Oct. 17, 2017, 6:e28020, 25 pages.
Avnir et al., "Structural determination of the broadly reactive anti-IGHV1-69 anti-idiotypic antibody G6 and its idiotope," Cell Reports, Dec. 12, 2017, 21(11):3243-55.
Ballester et al., "A machine learning approach to predicting protein-ligand binding affinity with applications to molecular docking," Bioinformatics, May 1, 2010, 26(9):1169-75.
Bandaranayake et al., "The effect of clade-specific sequence polymorphisms on HIV-1 protease activity and inhibitor resistance pathways," Journal of Virology, Oct. 1, 2010, 84(19):9995-10003.
Barski et al., "Inhibition of HTLV-1 infection by HIV-1 first-and second-generation integrase strand transfer inhibitors," Frontiers in Microbiology, Aug. 13, 2019, 10:1877, 11 pages.
Behler, "First principles neural network potentials for reactive simulations of large molecular and condensed systems," Angewandte Chemie International Edition, Oct. 9, 2017, 56(42):12828-40.
Beierlein et al., "Targeted Mutations of Bacillus anthracis Dihydrofolate Reductase Condense Complex Structure—Activity Relationships," Journal of Medicinal Chemistry, Oct. 28, 2010, 53(20):7327-36.
Bowers et al., "Scalable algorithms for molecular dynamics simulations on commodity clusters," SC'06: Proceedings of the 2006 ACM/IEEE Conference on Supercomputing, Nov. 11, 2006, 13 pages.
Brünger et al., "Free R value: a novel statistical quantity for assessing the accuracy of crystal structures," Nature, Jan. 1992, 355(6359):472-5.
Cai et al., "Decomposing the energetic impact of drug resistant mutations in HIV-1 protease on binding DRV," Journal of Chemical Theory and Computation, Apr. 13, 2010, 6(4):1358-68.
Cai et al., "Decomposing the Energetic Impact of Drug-Resistant Mutations: The Example of HIV-1 Protease-DRV Binding," Computational Drug Discovery and Design, Nov. 24, 2011, 551-560.
Cai et al., "Differential flap dynamics in wild-type and a drug resistant variant of HIV-1 protease revealed by molecular dynamics and NMR relaxation," Journal of Chemical Theory and Computation, Oct. 9, 2012, 8(10):3452-62.
Cai et al., "Drug resistance mutations alter dynamics of inhibitor-bound HIV-1 protease," Journal of Chemical Theory and Computation, Aug. 12, 2014, 10(8):3438-48.

(Continued)

Primary Examiner — Laura L Stockton
(74) Attorney, Agent, or Firm — Fish & Richardson P.C.

(57) ABSTRACT

The present application provides compounds and methods of treating viral infections, including viral infections caused by HIV or HTLV.

21 Claims, 23 Drawing Sheets

(56) References Cited

OTHER PUBLICATIONS

Callebaut et al., "In vitro characterization of GS-8374, a novel phosphonate-containing inhibitor of HIV-1 protease with a favorable resistance profile," Antimicrobial Agents and Chemotherapy, Apr. 2011, 55(4):1366-76.
Camps-Valls et al, "Semi-supervised support vector biophysical parameter estimation," IGARSS 2008-2008 IEEE International Geoscience and Remote Sensing Symposium, IEEE, Jul. 7, 2008, 3:III-1131, 4 pages.
Champness et al., "The structure of Pneumocystis carinii dihydrofolate reductase to 1.9 Å resolution," Structure, Oct. 1, 1994, 2(10):915-24.
Chapelle et al., "Semi-supervised classification by low density separation," AISTATS, Jan. 6, 2005, vol. 2005, 57-64.
Chen et al., "A semi-supervised method for drug-target interaction prediction with consistency in networks," PloS one, May 7, 2013, 8(5):e62975, 7 pages.
Chen et al., "The rise of deep learning in drug discovery," Drug Discovery Today, Jun. 1, 2018, 23(6):1241-50.
Cihlar T, et al., "Suppression of HIV-1 protease inhibitor resistance by phosphonate-mediated solvent anchoring," Journal of Molecular Biology, Oct. 27, 2006, 363(3):635-47.
Davis et al., "MolProbity: all-atom contacts and structure validation for proteins and nucleic acids," Nucleic Acids Research, Jul. 1, 2007, 35(suppl_2):W375-83.
Delgado et al., "FoldX 5.0: working with RNA, small molecules and a new graphical interface," Bioinformatics, Oct. 15, 2019, 35(20):4168-9.
Durrant et al., "Machine-learning techniques applied to antibacterial drug discovery," Chemical Biology & Drug Design, Jan. 2015, 85(1):14-21.
Duvenaud et al., "Convolutional networks on graphs for learning molecular fingerprints," arXiv preprint arXiv: 1509.09292, Sep. 30, 2015, 9 pages.
Emsley et al., "Coot: model-building tools for molecular graphics," Acta Crystallographica Section D: Biological Crystallography, Dec. 1, 2004, 60(12):2126-32.
Foulkes et al., "Role of invariant Thr80 in human immunodeficiency virus type 1 protease structure, function, and viral infectivity," Journal of Virology, Jul. 15, 2006, 80(14):6906-16.
Foulkes-Murzycki et al., "Cooperative effects of drug-resistance mutations in the flap region of HIV-1 protease," ACS Chemical Biology, Mar. 15, 2013, 8(3):513-8.
Foulkes-Murzycki et al., "Hydrophobic sliding: a possible mechanism for drug resistance in human immunodeficiency virus type 1 protease," Structure, Feb. 1, 2007, 15(2):225-33.
Free et al., "A mathematical contribution to structure-activity studies," Journal of Medicinal Chemistry, Jul. 1964, 7(4):395-9.
G-Dayanandan et al., "Propargyl-linked antifolates are dual inhibitors of Candida albicans and Candida glabrata," Journal of Medicinal Chemistry, Mar. 27, 2014. 57(6):2643-56.
Ghasemi et al., "Neural network and deep-learning algorithms used in QSAR studies: merits and drawbacks," Drug Discov. Today, Oct. 1, 2018, 23(10):1784-90.
Ghosh et al., "Design and development of highly potent HIV-1 protease inhibitors with a crown-like oxotricyclic core as the P2-ligand to combat multidrug-resistant HIV variants," Journal of Medicinal Chemistry, May 25, 2017, 60(10):4267-78.
Ghosh et al., "Design and synthesis of highly potent HIV-1 protease inhibitors containing tricyclic fused ring systems as novel P2 ligands: structure-activity studies, biological and x-ray structural analysis," Journal of Medicinal Chemistry, May 15, 2018, 61(10):4561-77.
Ghosh et al., "Design and synthesis of potent HIV-1 protease inhibitors incorporating hexahydrofuropyranol-derived high affinity P2 ligands: structure—activity studies and biological evaluation," Journal of Medicinal Chemistry, Jan. 27, 2011, 54(2):622-34.
Ghosh et al., "Design of HIV protease inhibitors targeting protein backbone: an effective strategy for combating drug resistance," Accounts of Chemical Research, Jan. 15, 2008, 41(1):78-86.
Ghosh et al., "Recent Progress in the Development of HIV-1 Protease Inhibitors for the Treatment of HIV/AIDS," Journal of Medicinal Chemistry, Jun. 9, 2016, 59(11):5172-208.
Gomes et al., "Atomic convolutional networks for predicting protein-ligand binding affinity," arXiv preprint arXiv:1703.10603, Mar. 30, 2017, 17 pages.
Gómez-Bombarelli et al., "Automatic chemical design using a data-driven continuous representation of molecules," ACS Central Science, Feb. 28, 2018, 4(2):268-76.
Guo et al., "Probing the α-helical structural stability of stapled p53 peptides: molecular dynamics simulations and analysis," Chemical Biology & Drug Design, Apr. 2010. 75(4):348-59.
Hajian et al., "Propargyl-linked antifolates are potent inhibitors of drug-sensitive and drug-resistant *Mycobacterium tuberculosis*," PloS one, Aug. 31, 2016, 11(8):e0161740, 13 pages.
Harder et al., "OPLS3: a force field providing broad coverage of drug-like small molecules and proteins," Journal of Chemical Theory and Computation, Jan. 12, 2016, 12(1):281-96.
Hazen et al., "In vitro antiviral activity of the novel, tyrosyl-based human immunodeficiency virus (HIV) type 1 protease inhibitor brecanavir (GW640385) in combination with other antiretrovirals and against a panel of protease inhibitor-resistant HIV," Antimicrobial Agents and Chemotherapy, Sep. 2007, 51(9):3147-54.
He et al., "Discovery of GS-8374, a potent human immunodeficiency virus type 1 protease inhibitor with a superior resistance profile," MedChemComm, Jun. 11, 2011, 2(11):1093-8.
Heaslet et al., "Structural comparison of chromosomal and exogenous dihydrofolate reductase from *Staphylococcus aureus* in complex with the potent inhibitor trimethoprim," Proteins: Structure, Function, and Bioinformatics, Aug. 15, 2009, 76(3):706-17.
Henes et al., "Molecular determinants of epistasis in HIV-1 protease: Elucidating the interdependence of L89V and L90M mutations in resistance," Biochemistry, Aug. 6, 2019, 58(35):3711-26.
Henes et al., "Picomolar micromolar: elucidating the role of distal mutations in HIV-1 protease in conferring drug resistance," ACS Chemical Biology, Jul. 30, 2019, 14(11):2441-52.
Hou et al., "Structural analysis of the active site and DNA binding of human cytidine deaminase APOBEC3B," Journal of Chemical Theory and Computation, Nov. 20, 2018, 15(1):637-47.
Hui et al., "Large scale purification and refolding of HIV-1 protease from *Escherichia coli* inclusion bodies," Journal of Protein Chemistry, Jun. 1993, 12(3):323-7.
Ishima et al., "NMR and MD studies combined to elucidate inhibitor and water interactions of HIV-1 protease and their modulations with resistance mutations," Journal of Biomolecular NMR, Jul. 2019, 73(6):365-74.
Ishima, "CPMG relaxation dispersion," Protein Dynamics 2014, Humana Press, Totowa, NJ, Sep. 3, 2013, 29-49.
Ishima, "Recent developments in (15)N NMR relaxation studies that probe protein backbone dynamics," Top Curr Chem 2012, Sep. 7, 2011, 326, 99-122.
Jabara et al., "Accurate sampling and deep sequencing of the HIV-I protease gene using a Primer ID," Proceedings of the National Academy of Sciences, Dec. 13, 2011, 108(50):20166-71.
Jorgensen, "Computer-aided discovery of anti-HIV agents," Bioorganic & Medicinal Chemistry, Oct. 15, 2016, 24(20):4768-78.
Keshipeddy et al., "Nonracemic antifolates stereoselectively recruit alternate cofactors and overcome resistance in *S. aureus*," Journal of the American Chemical Society, Jul. 22, 2015, 137(28):8983-90.
Khan et al., "Probing structural changes among analogous inhibitor-bound forms of HIV-1 protease and a drug-resistant mutant in solution by nuclear magnetic resonance," Biochemistry, Feb. 19, 2018, 57(10):1652-62.
King et al., "Combating susceptibility to drug resistance: lessons from HIV-1 protease," Chemistry & Biology, Oct. 1, 2004, 11(10):1333-8.
King et al., "Extreme entropy—enthalpy compensation in a drug-resistant variant of HIV-1 protease," ACS Chemical Biology, Sep. 21, 2012, 7(9):1536-46.

(56) References Cited

OTHER PUBLICATIONS

King et al., "Lack of synergy for inhibitors targeting a multi-drug-resistant HIV-1 protease," Protein Science, Feb. 2002, 11(2):418-29.
King et al., "Structural and thermodynamic basis for the binding of TMC114, a next-generation human immunodeficiency virus type 1 protease inhibitor," Journal of Virology, Nov. 1, 2004, 78(21):12012-21.
Kittler et al., "Statistical properties of error estimators in performance assessment of recognition systems," IEEE transactions on pattern analysis and machine intelligence, Mar. 1982, (2):215-20.
Lee et al., "A strongly transdominant mutation in the human immunodeficiency virus type 1 gag gene defines an Achilles heel in the virus life cycle," Journal of Virology, Sep. 1, 2009, 83(17):8536-43.
Lefebvre et al., "Resilience to resistance of HIV-1 protease inhibitors: profile of darunavir," AIDS Reviews, Sep. 30, 2008, 10(3):131-42.
Leidner et al., "Hydration structure and dynamics of inhibitor-bound HIV-1 protease," Journal of Chemical Theory and Computation, Mar. 23, 2018, 14(5):2784-96.
Leidner et al., "Target-specific prediction of ligand affinity with structure-based interaction fingerprints," Journal of Chemical Information and Modeling, Aug. 5, 2019, 59(9):3679-91.
Lin et al., "Dengue protease substrate recognition: binding of the prime side," ACS Infectious Diseases, Oct. 14, 2016, 2(10):734-43.
Lin et al., "Dengue virus NS2B/NS3 protease inhibitors exploiting the prime side," Journal of Virology, Apr. 28, 2017, 91(10):e00045-17.
Liu et al., "Tumor gene expression data classification via sample expansion-based deep learning," Oncotarget, Dec. 12, 2017, 8(65), 15 pages.
Lo et al., "Machine learning in chemoinformatics and drug discovery," Drug Discovery Today, Aug. 1, 2018, 23(8):1538-46.
Lockbaum et al., "Inhibiting HTLV-1 Protease: A Viable Antiviral Target. ACS Chemical Biology," Feb. 23, 2021, 16(3):529-38.
Lockbaum et al., "Structural adaptation of darunavir analogues against primary mutations in HIV-1 protease," ACS Infectious Diseases, Dec. 13, 2018 Dec. 13;5(2):316-25.
Lombardo et al., "Crystal structures of trimethoprim-resistant DfrA1 rationalize potent inhibition by propargyl-linked antifolates," ACS Infectious Diseases, Feb. 12, 2016, 2(2):149-56.
Lundberg et al., "A unified approach to interpreting model predictions," 31st Conference on Neural Information Processing Systems (Advances in Neural Information Processing Systems), May 22, 2017, 4765-74.
Ma et al., "CRISPR-Cas9-mediated saturated mutagenesis screen predicts clinical drug resistance with improved accuracy," Proceedings of the National Academy of Sciences, Oct. 31, 2017, 114(44):11751-6.
Matthew et al., "Molecular mechanism of resistance in a clinically significant double-mutant variant of HCV NS3/4A protease," Structure, Oct. 2, 2018, 26(10):1360-72.
McCoy et al., "Phaser crystallographic software," Journal of Applied Crystallography, Aug. 1, 2007, 40(4):658-74.
Miller et al., "Ultra-potent P1 modified arylsulfonamide HIV protease inhibitors: the discovery of GW0385," Bioorganic & Medicinal Chemistry Letters, Apr. 1, 2006, 16(7):1788-94.
Mittal et al., "Hydrophobic core flexibility modulates enzyme activity in HIV-1 protease," Journal of the American Chemical Society, Mar. 7, 2012, 134(9):4163-8.
Mittal et al., "Structural and thermodynamic basis of amprenavir/darunavir and atazanavir resistance in HIV-1 protease with mutations at residue 50," Journal of Virology, Apr. 15, 2013, 87(8):4176-84.
Montanucci et al., "DDGun: an untrained method for the prediction of protein stability changes upon single and multiple point variations," BMC Bioinformatics, Jul. 2019, 20(14):1-0.
Morgillo et al., "Mechanisms of resistance to EGFR-targeted drugs: lung cancer," ESMO open, Jan. 1, 2016, 1(3):e000060, 9 pages.
Moriarty et al., "electronic Ligand Builder and Optimization Workbench (eLBOW): a tool for ligand coordinate and restraint generation," Acta Crystallographica Section D: Biological Crystallography, Oct. 1, 2009, 65(10):1074-80.
Nalam et al., "Evaluating the substrate-envelope hypothesis: structural analysis of novel HIV-1 protease inhibitors designed to be robust against drug resistance," Journal of Virology, May 15, 2010, 84(10):5368-78.
Nalam et al., "Substrate envelope-designed potent HIV-1 protease inhibitors to avoid drug resistance," Chemistry & Biology, Sep. 19, 2013, 20(9):1116-24.
Nan et al., "EGFR TKI as first-line treatment for patients with advanced EGFR mutation-positive non-small-cell lung cancer," Oncotarget, Sep. 26, 2017, 8(43):75712, 1-15.
Otwinowski et al., "Processing of X-ray diffraction data collected in oscillation mode," Methods in Enzymology, Jan. 1, 1997, ;276:307-26.
Özen et al., "Dynamics of preferential substrate recognition in HIV-1 protease: redefining the substrate envelope," Journal of Molecular Biology, Jul. 22, 2011, 410(4):726-44.
Özen et al., "HIV-1 protease and substrate coevolution validates the substrate envelope as the substrate recognition pattern," Journal of Chemical Theory and Computation, Feb. 14, 2012, 8(2):703-14.
Özen et al., "Improving the resistance profile of hepatitis C NS3/4A inhibitors: Dynamic substrate envelope guided design," Journal of Chemical Theory and Computation, Dec. 10, 2013, 9(12):5693-705.
Özen et al., "Structural basis and distal effects of Gag substrate coevolution in drug resistance to HIV-1 protease," Proceedings of the National Academy of Sciences, Nov. 11, 2014, 111(45):15993-8.
Pandurangan et al., "SDM: a server for predicting effects of mutations on protein stability," Nucleic Acids Research, Jul. 3, 2017, 45(W1):W229-35.
Parai et al., "Design, synthesis, and biological and structural evaluations of novel HIV-1 protease inhibitors to combat drug resistance," Journal of Medicinal Chemistry, Jul. 26, 2012, 55(14):6328-41.
Paulsen et al., "Interdependence of inhibitor recognition in HIV-1 protease," Journal of Chemical Theory and Computation., May 9, 2017, 13(5):2300-9.
Persons et al., "An NMR strategy to detect conformational differences in a protein complexed with highly analogous inhibitors in solution," Methods, Sep. 15, 2018, 148:9, 17 pages.
Prabu-Jeyabalan et al., "How does a symmetric dimer recognize an asymmetric substrate? A substrate complex of HIV-1 protease," Journal of Molecular Biology, Sep. 1, 2000, 301(5):1207-20.
Prabu-Jeyabalan et al., "Substrate shape determines specificity of recognition for HIV-1 protease: analysis of crystal structures of six substrate complexes," Structure, Mar. 1, 2002, 10(3):369-81.
Prachanronarong et al., "Molecular basis for differential patterns of drug resistance in influenza N1 and N2 neuraminidase," Journal of Chemical Theory and Computation, Dec. 13, 2016, 12(12):6098-108.
Prachanronarong et al., "Mutations in influenza A virus neuraminidase and hemagglutinin confer resistance against a broadly neutralizing hemagglutinin stem antibody," Journal of Virology, Jan. 4, 2019, 93(2):e01639-18.
Queener et al., "Trimethoprim resistance of dihydrofolate reductase variants from clinical isolates of Pneumocystis jirovecii," Antimicrobial Agents and Chemotherapy, Oct. 2013, 57(10):4990-8.
Ragland et al., "Drug resistance conferred by mutations outside the active site through alterations in the dynamic and structural ensemble of HIV-1 protease," Journal of the American Chemical Society, Aug. 27, 2014, 136(34):11956-63.
Ragland et al., "Elucidating the interdependence of drug resistance from combinations of mutations. Journal of chemical theory and computation. Nov. 14, 2017;13(11):5671-82.
Redaelli et al., "Three novel patient-derived BCR/ABL mutants show different sensitivity to second and third generation tyrosine kinase inhibitors," American Journal of Hematology, Nov. 1, 2012, 87(11):E125, 4 pages.
Reeve et al., "Charged propargyl-linked antifolates reveal mechanisms of antifolate resistance and inhibit trimethoprim-resistant

(56) References Cited

OTHER PUBLICATIONS

MRSA strains possessing clinically relevant mutations," Journal of Medicinal Chemistry, Jul. 14, 2016, 59(13):6493-500.
Reeve et al., "MRSA isolates from united states hospitals carry dfrg and dfrg resistance genes and succumb to propargyl-linked antifolates," Cell Chemical Biology, Dec. 22, 2016, 23(12):1458-67.
Reeve et al., "Toward Broad Spectrum Dihydrofolate Reductase Inhibitors Targeting Trimethoprim Resistant Enzymes Identified in Clinical Isolates of Methicillin Resistant *Staphylococcus aureus*," ACS Infectious Diseases, Sep. 30, 2019, 5(11):1896-906.
Ricordel et al., "Molecular mechanisms of acquired resistance to third-generation EGFR-TKIs in EGFR T790M-mutant lung cancer," Annals of Oncology, Jan. 1, 2018, 29:i28-37.
Romano et al., "Drug resistance against HCV NS3/4A inhibitors is defined by the balance of substrate recognition versus inhibitor binding," Proceedings of the National Academy of Sciences, Dec. 7, 2010, 107(49):20986-91.
Romano et al., "The molecular basis of drug resistance against hepatitis C virus NS3/4A protease inhibitors," PLoS Pathog, Jul. 26, 2012, 8(7):e1002832, 15 pages.
Rose et al., "Regulation of autoproteolysis of the HIV-1 and HIV-2 proteases with engineered amino acid substitutions," Journal of Biological Chemistry, Jun. 5, 1993, 268(16):11939-45.
Roskoski Jr, "Properties of FDA-approved small molecule protein kinase inhibitors," Pharmacological Research, Jun. 1, 2019, 144:19-50.
Rusere et al., "HIV-1 protease inhibitors incorporating stereochemically defined P2' ligands to optimize hydrogen bonding in the substrate envelope," Journal of Medicinal Chemistry, Aug. 6, 2019, 62(17):8062-79.
Rusere et al., "Quinoxaline-based linear HCV NS3/4A protease inhibitors exhibit potent activity against drug resistant variants," ACS Medicinal Chemistry Letters, May 17, 2018, 9(7):691-6.
Schiffer et al., "Accessibility and order of water sites in and around proteins: A crystallographic time-averaging study," Proteins: Structure, Function, and Bioinformatics, Sep. 1, 1999, 36(4):501-11.
Schiffer et al., "Prediction of homologous protein structures based on conformational searches and energetics," Proteins: Structure, Function, and Bioinformatics, Mar. 12, 1990;8(1):30-43.
Scocchera et al., "Charged nonclassical antifolates with activity against Gram-positive and Gram-negative pathogens," ACS Medicinal Chemistry Letters, Jul. 14. 2016, 7(7):692-6.
Shivakumar et al., "Improving the prediction of absolute solvation free energies using the next generation OPLS force field," Journal of Chemical Theory and Computation, Aug. 14. 2012, 8(8):2553-8.
Silvas et al., "Substrate sequence selectivity of APOBEC3A implicates intra-DNA interactions," Scientific Reports, May 14, 2018, 8(1), 11 pages.
Smola et al., "A tutorial on support vector regression," Statistics and Computing, Aug. 2004, 14(3):199-222.
Solomon et al., "Mechanism for APOBEC3G catalytic exclusion of RNA and non-substrate DNA," Nucleic Acids Research, Aug. 22, 2019, 47(14):7676-89.
Soumana et al., "Molecular and dynamic mechanism underlying drug resistance in genotype 3 hepatitis C NS3/4A protease," Journal of the American Chemical Society, Sep. 14, 2016, 138(36):11850-9.
Soumana et al., "Structural analysis of asunaprevir resistance in HCV NS3/4A protease," ACS Chemical Biology, Nov. 21, 2014, 9(11):2485-90.
Soumana et al., "Structural and thermodynamic effects of macrocyclization in HCV NS3/4A inhibitor MK-5172," ACS Chemical Biology, Apr. 15, 2016, 11(4):900-9.
Soverini et al., "BCR-ABL kinase domain mutation analysis in chronic myeloid leukemia patients treated with tyrosine kinase inhibitors: recommendations from an expert panel on behalf of European LeukemiaNet," Blood, The Journal of the American Society of Hematology Aug. 4, 2011, 118(5):1208-15.
Steinbrecher et al., "Accurate binding free energy predictions in fragment optimization," Journal of Chemical Information and Modeling, Nov. 23, 2015, 55(11):2411-20.
Sun et al., "Citrullination of NF-kB p65 enhances its nuclear localization and TLR-induced expression of IL-1β and TNFα," Science Immunology, Jun. 9, 2017, 2(12), 32 pages.
Svetnik et al., "Random forest: a classification and regression tool for compound classification and QSAR modeling," Journal of Chemical Information and Computer Sciences, Nov. 24, 2003, 43(6):1947-58
Tamposis et al., "Semi-supervised learning of Hidden Markov Models for biological sequence analysis," Bioinformatics, Jul. 1, 2019, 35(13):2208-15.
Tie et al., "High resolution crystal structures of HIV-1 protease with a potent non-peptide inhibitor (UIC-94017) active against multi-drug-resistant clinical strains," Journal of Molecular Biology, Apr. 23, 2004, 338(2):341-52.
Vanhaelen et al., "Design of efficient computational workflows for in silico drug repurposing," Drug Discovery Today, Feb. 1, 2017, 22(2):210-22.
Wang et al., "Semi-supervised kernel regression," Sixth International Conference on Data Mining (ICDM'06), IEEE, Dec. 18, 2006, 1130-5.
Wei et al., "Emergence of resistant human immunodeficiency virus type 1 in patients receiving fusion inhibitor (T-20) monotherapy," Antimicrobial Agents and Chemotherapy, Jun. 2002, 46(6):1896-905.
Westover et al., "Mechanisms of acquired resistance to first-and second-generation EGFR tyrosine kinase inhibitors," Annals of Oncology, Jan. 1, 2018, 29:i10-9.
Williams-Noonan et al., "Free energy methods in drug design: Prospects of alchemical perturbation in medicinal chemistry: miniperspective," Journal of Medicinal Chemistry, Feb. 8, 2018, 61(3):638-49.
Windsor et al., "Fluorogenic assay for inhibitors of HIV-1 protease with sub-picomolar affinity," Scientific Reports, Aug. 11, 2015, 5(1):1-7.
Windsor et al., "Sub-picomolar inhibition of HIV-1 protease with a boronic acid," Journal of the American Chemical Society, Oct. 16, 2018, 140(43):14015-8.
Wu et al., "Management of acquired resistance to EGFR TKI-targeted therapy in advanced non-small cell lung cancer," Molecular Cancer, Dec. 2018, 17(1):1-4.
Xia et al., "Semi-supervised drug-protein interaction prediction from heterogeneous biological spaces," BMC Systems Biology, Sep. 2010, 4(2), 12 pages.
Xie et al., "Im2map: deriving maps from georeferenced community contributed photo collections," Proceedings of the 3rd ACM SIGMM International Workshop on Social Media, Nov. 30, 2011, 29-34.
Xie et al., "Semi-supervised regression with temporal image sequences," 2010 IEEE International Conference on Image Processing, Sep. 26, 2010, 2637-40.
Xu et al., "Semi-supervised least-squares support vector regression machines," Journal of Information & Computational Science, Jun. 2011, 8(6):885-92.
Yilmaz et al., "Improving viral protease inhibitors to counter drug resistance," Trends in Microbiology, Jul. 1, 2016, 24(7):547-57.
Zhao et al., "Determining effects of non-synonymous SNPs on protein-protein interactions using supervised and semi-supervised learning," PLoS Computational Biology, May 1, 2014, 10(5):e1003592, 16 pages.
Romano et al., "Molecular mechanisms of viral and host cell substrate recognition by hepatitis C virus NS3/4A protease," Journal of Virology, Jul. 1, 2011, 85(13):6106-16.

\* cited by examiner

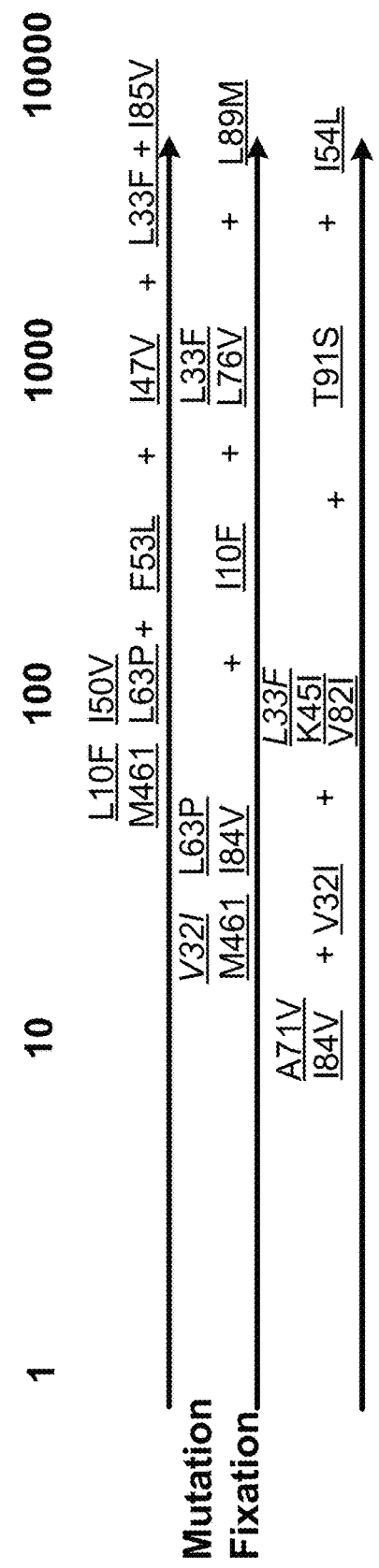
FIG. 2

| | I13G16V32L33K45M46I54R71L76V82 T84 | Ki (nM) | Fold Change | kcat/Km (s*μM)⁻¹ | Res Å | R | R$_{free}$ | PDB Code |
|---|---|---|---|---|---|---|---|---|
| WT – NL43 | | < 0.005 | 1 | 17.1 ± 0.1 | 2.00 | 19.2 | 22.8 | 6DGX |
| I84V | 84V | 0.025 ± 0.005 | 5 | 11.8 ± 0.1 | 1.90 | 18.3 | 21.2 | 6DH0 |
| I84V/V82F* | 82F 84V | 0.24 ± 0.02 | 47 | 3.4 ± 0.2 | 1.96 | 18.2 | 22.8 | 6OPT |
| Sel-DRV₀-4Mut* | 45I46I 82F 84V | 0.42 ± 0.09 | 83 | 9.7 ± 0.1 | 1.94 | 20.5 | 23.2 | 6OPU |
| Sel-DRV₀-8Mut | 13V16E32I33F45I46I 82F 84V | 12.8 ± 0.4 | 2,560 | 3.5 ± 0.2 | 1.91 | 17.6 | 22.3 | 6OPV |
| Sel-DRV₀-10Mut | 13V16E32I33F45I46I 71V76V82F 84V | 156 ± 4 | 31,280 | 5.3 ± 0.1 | 2.13 | 19.1 | 22.6 | 6OPY |
| Sel-DRV0-11Mut | 13V16E32I33F45I46I54T71V76V82F84V | 759 ± 57 | 151,840 | 1.3 ± 0.4 | 2.20 | 22.0 | 26.8 | 6OPZ |

FIG. 4

| Cleavage Site | HIV-1 (P4-P1/P1'-P4') | HTLV-1 (P4-P1/P1'-P4') |
|---|---|---|
| MA/CA | SQNY/PIVQ | PQVL/PVMH |
| CA/NC | - | TKVL/VVQP |
| Gag/PR | SFNF/PQIT | ASIL/PVIP |
| PR/Pol | TLNF/PISP | PVIL/PIQA |
| Pro/RT | - | PAVL/GLEL |
| RT-RH/IN | RKIL/FLDG | VLQL/SPAD |

FIG. 6A

| Cleavage Site | Sequence (P4-P1/P1'-P4') | $K_M$ (μM) | $k_{cat}$ (s$^{-1}$) | $k_{cat}/K_M$ (μM$^{-1}$s$^{-1}$) |
|---|---|---|---|---|
| MA/CA | PQVL/PVMH | 101.3 ± 1.9 | 21.6 ± 0.1 | 0.21 ± 0.02 |
| CA/NC | TKVL/VVQP | 31.6 ± 5.9 | 1.9 ± 0.1 | 0.06 ± 0.01 |

FIG. 6B

| Inhibitor | 2D Structure | $K_i$ (µM) |
|---|---|---|
| Indinavir (IDV) | | 63 ± 9 |
| Darunavir (DRV) | | 0.8 ± 0.1 |
| UM1 | | 0.28 ± 0.02 |
| UM6 | | 0.12 ± 0.01 |
| UM7 | | 1.2 ± 0.1 |
| UM8 | | 1.9 ± 0.4 |
| UM9 | | 0.4 ± 0.1 |
| Ex.7 | | 0.03 ± 0.01 |

FIG. 7

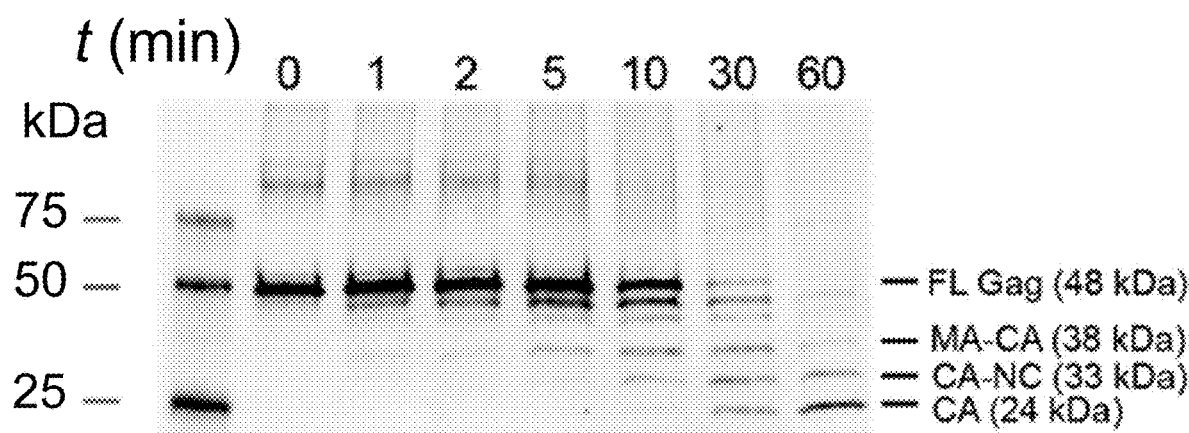
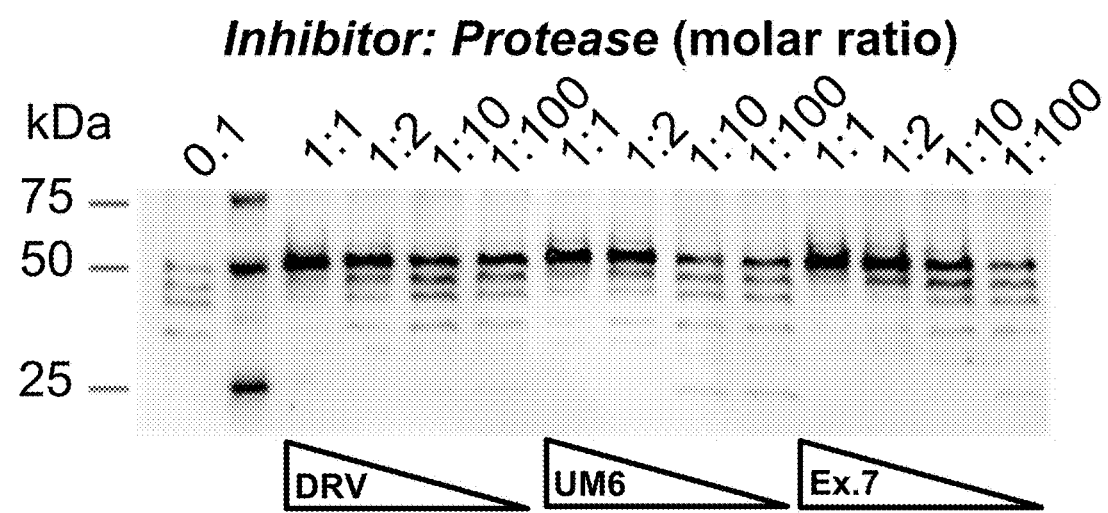
FIG. 9

| Protease-Inhibitor | HTLV-DRV | HTLV-UM6 | HTLV-ex.7 | HIV-ex.7 |
|---|---|---|---|---|
| PDB ID | 6W6Q | 6W6R | 6W6S | 6W6T |
| Data Collection | | | | |
| Space group | $P6_322$ | $P6_322$ | $P6_322$ | $P2_12_12_1$ |
| Cell dimensions: | | | | |
| $a$ (Å) | 78.5 | 77.9 | 76.6 | 51.1 |
| $b$ (Å) | 78.5 | 77.9 | 76.6 | 58.0 |
| $c$ (Å) | 160.6 | 160.1 | 157.3 | 61.7 |
| $\alpha, \beta, \gamma$ (°) | 90, 90, 120 | 90, 90, 120 | 90, 90, 120 | 90, 90, 90 |
| Resolution (Å) | 40.1 - 2.10 (2.18 - 2.10) | 41.9 - 2.05 (2.12 - 2.05) | 39.3 - 2.29 (2.37 - 2.29) | 21.9 - 1.84 (1.91 - 1.84) |
| Unique reflections | 17823 (1728) | 18768 (1804) | 12954 (1244) | 16226 (1420) |
| Total reflections | 162887 (16621) | 173500 (15456) | 114508 (11155) | 104007 (4828) |
| $R_{merge}{}^a$ | 0.09 (2.00) | 0.10 (3.49) | 0.24 (3.89) | 0.06 (0.29) |
| $R_{pim}$ | 0.03 (0.68) | 0.04 (1.25) | 0.09 (1.36) | - |
| CC1/2 | 1.00 (0.37) | 1.00 (0.23) | 0.99 (0.15) | - |
| CC* | 1.00 (0.73) | 1.00 (0.62) | 1.00 (0.50) | - |
| Completeness (%) | 99.8 (100) | 99.8 (99.6) | 99.9 (99.9) | 98.4 (88.0) |
| Redundancy | 9.1 (9.6) | 9.2 (8.6) | 8.8 (9.0) | 6.4 (3.4) |
| Average I/σ | 12.6 (1.2) | 12.2 (0.7) | 5.9 (0.9) | 22.7 (3.3) |
| Wilson B-factors (Å²) | 55.2 | 50.6 | 61.3 | 25.2 |
| Refinement | | | | |
| $R_{factor}$ (%)$^c$ | 22.9 | 22.1 | 26.6 | 20.0 |
| $R_{free}$ (%)$^d$ | 26.2 | 24.3 | 30.5 | 22.7 |
| RMSD$^b$ in: | | | | |
| Bond lengths (Å) | 0.007 | 0.012 | 0.006 | 0.003 |
| Bond angles (°) | 0.81 | 1.32 | 0.82 | 0.59 |
| Ramachandran: | | | | |
| Favored | 96.05 | 96.49 | 96.05 | 99.48 |
| Allowed | 3.95 | 3.07 | 3.95 | 0.52 |
| Outliers | 0.00 | 0.44 | 0.00 | 0.00 |

$^a R_{sym} = \Sigma |I - \langle I \rangle| / \Sigma I$, where $I$ = observed intensity, $\langle I \rangle$ = average intensity over symmetry equivalent; values in parentheses are for the highest resolution shell.
$^b$ RMSD, root mean square deviation.
$^c R_{factor} = \Sigma ||F_o| - |F_c|| / \Sigma |F_o|$.
$^d R_{free}$ was calculated from 5% of reflections, chosen randomly, which were omitted from the refinement process.

FIG. 11

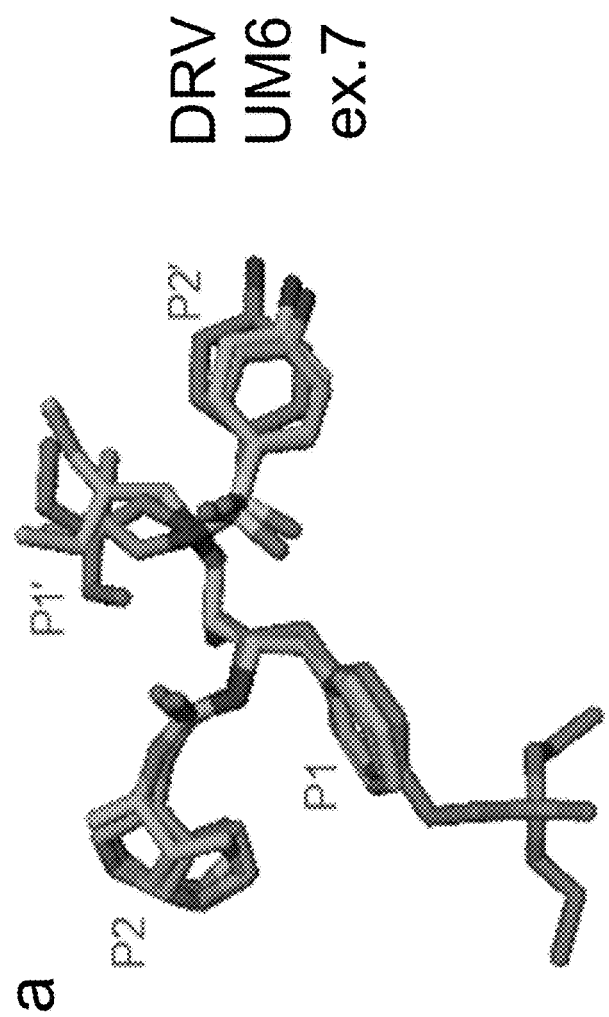
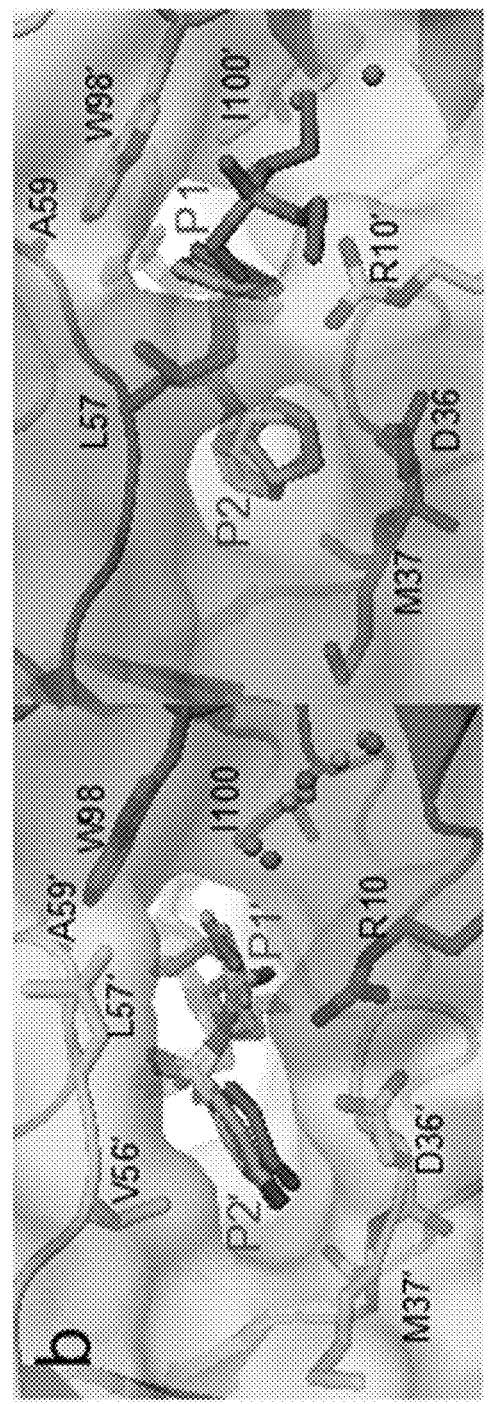
FIG. 12

| H-bond | 1 | 2 | 3 | 4 | 5 | 6 | 7 | 8 | 9 |
|---|---|---|---|---|---|---|---|---|---|
| HIV | 96% | 97% | 99% | 98% | 98% | 98% | 83% | 98% | 30% |
| HTLV | 47% | 68% | 11% | 99% | 58% | 68% | 0% | 83% | 0% |

FIG. 18

ANTIVIRAL COMPOUNDS

CLAIM OF PRIORITY

This application claims priority to U.S. Provisional Patent Application Ser. No. 63/032,902, filed on Jun. 1, 2020, the entire contents of which are hereby incorporated by reference.

FEDERALLY SPONSORED RESEARCH OR DEVELOPMENT

This invention was made with Government support under Grant No. GM109767 awarded by the National Institutes of Health. The Government has certain rights in the invention.

TECHNICAL FIELD

This invention relates to organic compounds useful in treating viral infections, and in particular HIV and HTLV infections.

BACKGROUND

Human immunodeficiency virus ("HIV") and human T-cell lymphotropic virus ("HTLV") are retroviruses that can cause immune disorders as well as cancer. There are approximately 38 million people across the globe with HIV/AIDS, and about 1.7 million individuals worldwide become infected with HIV annually. Similarly, an estimated 20 million people worldwide are infected with HTLV, with prevalence reaching 30% in some parts of the world.

SUMMARY

The present disclosure provides potent inhibitors of human HIV protease, including enhanced potency against multidrug-resistant HIV strains. Compared to the most potent FDA approved HIV protease inhibitor darunavir, the compounds of the present disclosure exhibit significantly improved potency and resistance profiles. What is more, the compounds of the present disclosure are significantly more active against HTLV than darunavir.

In one general aspect, the present disclosure provides a compound of Formula (I):

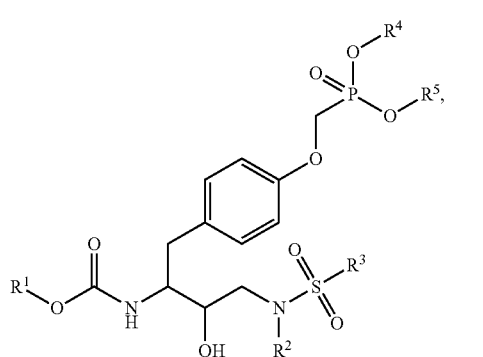

or a pharmaceutically acceptable salt thereof, wherein $R^1$, $R^2$, $R^3$, $R^4$, and $R^5$ are as described herein.

In another general aspect, the present disclosure provides a pharmaceutical composition comprising a compound of Formula (I), or a pharmaceutically acceptable salt thereof, and a pharmaceutically acceptable carrier.

In yet another general aspect, the present disclosure provides a method of treating a human immunodeficiency virus (HIV) infection, the method comprising administering to a subject in need thereof a therapeutically effective amount of a compound of Formula (I), or a pharmaceutically acceptable salt thereof, or a pharmaceutical composition of comprising same.

In yet another general aspect, the present disclosure provides a method of treating a human T-cell leukemia-lymphoma virus (HTLV) infection, the method comprising administering to a subject in need thereof a therapeutically effective amount of a compound of Formula (I), or a pharmaceutically acceptable salt thereof, or a pharmaceutical composition comprising same.

In yet another general aspect, the present disclosure provides a method of treating a human T-cell leukemia-lymphoma virus (HTLV) infection, the method comprising administering to a subject in need thereof a therapeutically effective amount of darunavir, or a pharmaceutically acceptable salt thereof.

In yet another general aspect, the present disclosure provides a method of treating a human T-cell leukemia-lymphoma virus (HTLV) infection, the method comprising administering to a subject in need thereof a therapeutically effective amount of indinavir, or a pharmaceutically acceptable salt thereof.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and figures, and from the claims.

DESCRIPTION OF DRAWINGS

FIG. 2 shows mutations in HIV-1 protease selected to confer resistance against highly potent inhibitors in viral cultures. Pathways to resistance as a function of increasing drug concentration (scale on top, in nM) during three DRV viral selections (top to bottom) underlined mutations reach fixation.

FIG. 4 contains a table of HIV-1 protease variants from DRV viral passaging

FIG. 6A contains a table showing HIV-1 protease and HTLV-1 protease viral polyprotein cleavage sites.

FIG. 6B contains a table showing enzymatic activity of HTLV-1 protease measured using natural substrate sequences.

FIG. 7 contains a table showing inhibition constants (Ki) against HTLV-1 protease by selected exemplified compounds.

FIG. 9 contains images showing HTLV-1 Gag cleavage by protease in VPLs. (top) Gag cleavage by HTLV-1 protease (1 μM) at 37° C. without inhibitor as a function of time. Cleavage products visualized with anti-HTLV-1 p24 (capsid). (bottom) Gag cleavage after 60 min with decreasing molar ratio of inhibitor to protease. At a 1:1 ratio (1 no Gag cleavage products are observed for any inhibitor, while below 1:10 ratio (100 nM inhibitor) some p24 capsid is observed after 60 min.

FIG. 11 contains a table showing X-ray data collection and crystallographic refinement statistics.

FIG. 12 contains images showing comparison of DRV and DRV analogs when bound to HTLV-1 protease. (a) Alignment of inhibitors. (b) Close-up view of P2'-P1' moiety in the S2'-S1' subsite, and P2-P1 moieties in the S2-S1 subsite. The phosphonate moiety of example 7 extends into the Si subsite, displacing conserved crystallographic waters.

FIG. 18 contains images showing binding of DRV to HIV-1 versus HTLV-1 protease active site. H-bonds between DRV and protease (numbered dashed lines) along with % stability from MD.

DETAILED DESCRIPTION

Figure 1:
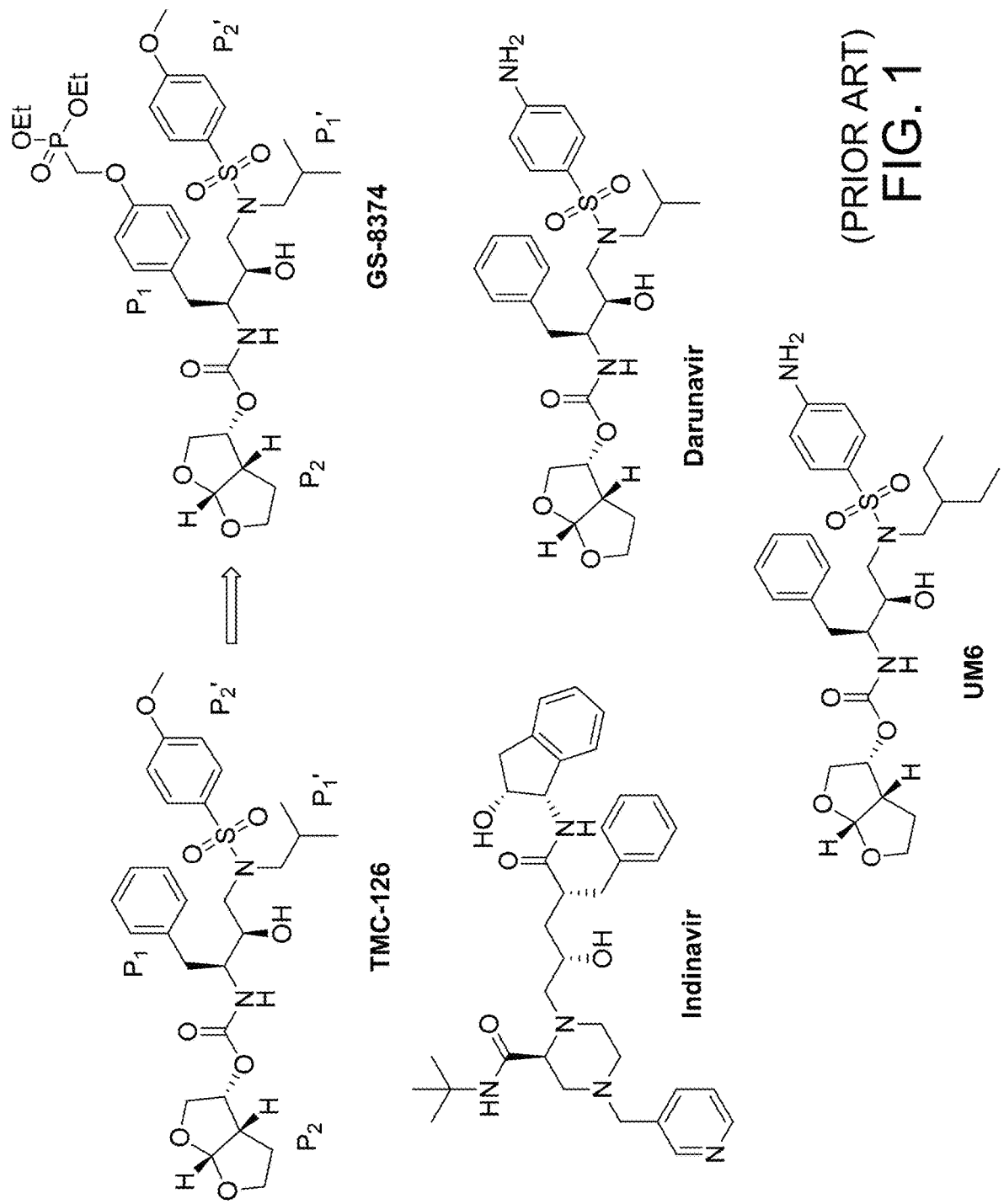
FIG. 1 contains chemical structures of TMC-126, GS-8374, indinavir, darunavir, and compound UM6 (parent compound for Example 7).

HIV-1 protease is a major target for developing antiviral therapeutics against HIV-AIDS. However, drug resistance remains a major challenge for the long-term effectiveness of protease inhibitor ("PI")-based combination antiretroviral therapies ("cART") regimens. Darunavir ("DRV") is the most potent HIV-1 protease inhibitor with the highest barrier to resistance and efficacy against multidrug-resistant HIV-1 strains. Incorporating a polar phosphonate moiety at the P1 position significantly improved the resistance profile of a known DRV analogue TMC-126. The resulting phosphonate analogue GS-8374 (see compound of Example 2, see also FIG. 1) was shown to retain activity against several multi-drug-resistant variants of HIV-1. However, introduction of a phosphonate group at the P1 position of DRV itself resulted in loss of potency. In contrast, the compounds described in this disclosure, containing the phosphonate moiety in their structure, retained potency against clinically relevant multidrug-resistant protease variants and HIV strains, showing improved potency and resistance profiles compared to DRV. The aspartyl protease of HTLV-1 is a dimer similar to that of HIV-1 and processes the viral polyprotein to permit viral maturation. HIV-1 protease inhibitors DRV and IDV only weakly inhibit the enzyme with $K_i$ of 0.8 μM and 60 respectively. In contrast, the compounds of the present disclosure achieve sub-micromolar inhibition against HTLV-1 protease and inhibited Gag processing in viral maturation assays. Hence, the compounds described herein are useful as therapeutic agents against HIV and HTLV infections.

Antiviral Compounds

In some embodiments, the present application provides a compound of Formula

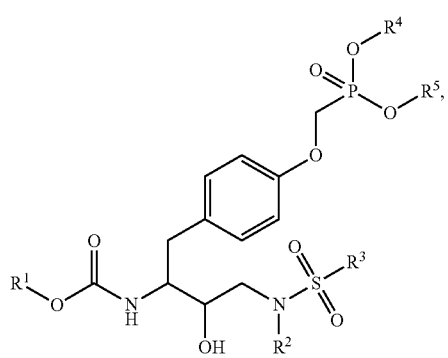

(I)

or a pharmaceutically acceptable salt thereof, wherein $R^1$, $R^2$, $R^3$, $R^4$, and $R^5$ are as described herein.

In some embodiments:

$R^1$ is a 5-11-membered saturated heterocycloalkyl group comprising 1, 2, or 3 oxygen atoms, which is optionally substituted with 1, 2, or 3 substituents independently selected from halo, $C_{1-3}$ alkyl, $C_{1-3}$ haloalkyl, $C_{1-3}$ alkoxy, and $C_{1-3}$ haloalkoxy;

$R^2$ is $C_{1-8}$ alkyl, which is optionally substituted with 1 or 2 substituents independently selected from halo, $C_{1-3}$ haloalkyl, $C_{1-3}$ alkoxy, $C_{1-3}$ haloalkoxy, and $Cy^1$;

each $Cy^1$ is independently selected from $C_{6-10}$ aryl, $C_{3-10}$ cycloalkyl, 5-10 membered heteroaryl, and 4-10 membered heterocycloalkyl, each of which is optionally substituted with 1 or 2 substituents independently selected from halo, $C_{1-3}$ alkyl, $C_{1-3}$ haloalkyl, $C_{1-3}$ alkoxy, and $C_{1-3}$ haloalkoxy;

$R^3$ is selected from $C_{6-10}$ aryl and 5-10 membered heteroaryl, each of which is optionally substituted with 1 or 2 substituents independently selected from OH, halo, $C_{1-3}$ alkyl, $C_{1-3}$ haloalkyl, $C_{1-3}$ alkoxy, $C_{1-3}$ haloalkoxy, HO—$C_{1-3}$ alkylene, $NH_2$—$C_{1-3}$ alkylene, amino, $C_{1-6}$ alkylamino, and di($C_{1-6}$ alkyl)amino; and $R^4$ and $R^5$ are each independently selected from $C_{1-6}$ alkyl and $C_{1-6}$ haloalkyl.

In some embodiments, if $R^2$ is sec-butyl, then $R^3$ is not p-methoxyphenyl.

In some embodiments, if $R^3$ is p-methoxyphenyl, then $R^2$ is not sec-butyl.

In some embodiments, if $R^2$ is sec-butyl, then $R^3$ is a 5-10 membered heteroaryl, optionally substituted as described above.

In some embodiments, the compound of Formula (I) is not:

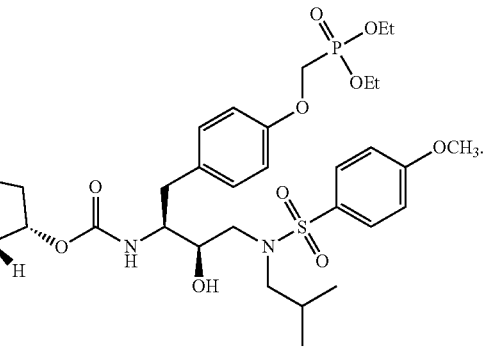

In some embodiments, $R^1$ is selected from tetrahydrofuran, hexahydropyran, hexahydrofurofuran, hexahydrofuropyran, octahydrofurooxepine, dioxabicyclodecane, and hexahydro-3,5-methanofuro[2,3-b]pyran, each of which is optionally substituted with 1 or 2 independently selected $C_{1-3}$ alkyl.

In some embodiments, $R^1$ is hexahydrofurofuran, which is optionally substituted with $C_{1-3}$ alkyl.

In some embodiments, $R^1$ is selected from any one of the following groups:

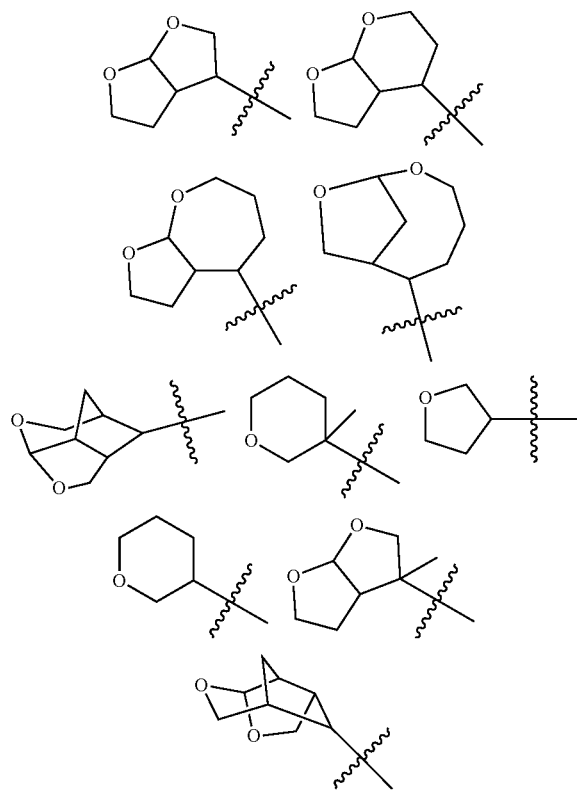

In some aspects of these embodiments, any of the groups is optionally substituted with 1 or 2 independently selected $C_{1-3}$ alkyl.

In some embodiments, R¹ is a group of formula:

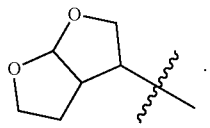 [SMILES: *C1COC2OCCC12]

In some embodiments, R¹ is a group of formula:

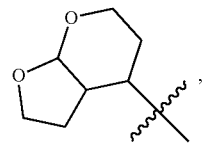

which is optionally substituted with 1 or 2 independently selected $C_{1-3}$ alkyl.

In some embodiments, R¹ is a group of formula:

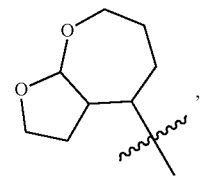 [SMILES: *C1CCCOC2OCCC12]

which is optionally substituted with 1 or 2 independently selected $C_{1-3}$ alkyl.

In some embodiments, R¹ is a group of formula:

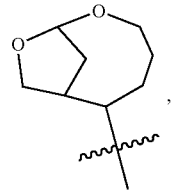 [SMILES: *C1CCCOC2CC1CO2]

which is optionally substituted with 1 or 2 independently selected $C_{1-3}$ alkyl.

In some embodiments, R¹ is a group of formula:

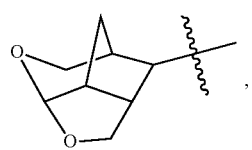

which is optionally substituted with 1 or 2 independently selected $C_{1-3}$ alkyl.

In some embodiments, R¹ is a group of formula:

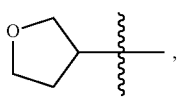

which is optionally substituted with 1 or 2 independently selected $C_{1-3}$ alkyl.

In some embodiments, R¹ is a group of formula:

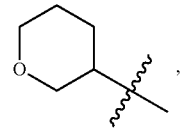 [SMILES: *C1CCCOC1]

which is optionally substituted with 1 or 2 independently selected $C_{1-3}$ alkyl.

In some embodiments, R¹ is a group of formula:

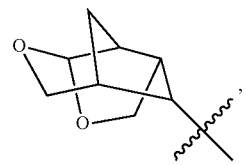 [SMILES: *C1C2COC3OCC1C3C2]

which is optionally substituted with 1 or 2 independently selected $C_{1-3}$ alkyl.

In some embodiments, the compound of Formula (I) has formula:

![Structure with R³, R⁴, R⁵ groups]

or a pharmaceutically acceptable salt thereof.

R² is $C_{5-8}$ alkyl, which is optionally substituted with 1 or 2 substituents independently selected from halo, $C_{1-3}$ haloalkyl, $C_{1-3}$ alkoxy, $C_{1-3}$ haloalkoxy, and $Cy^1$.

In some embodiments, R² is any one of the following groups:

![R2 group structures]

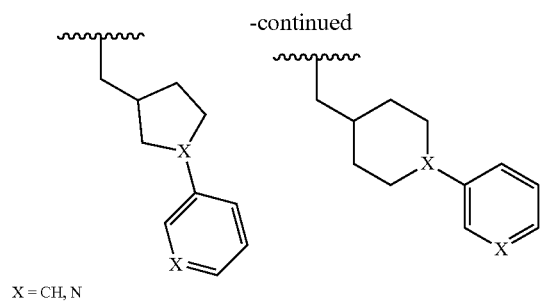

X = CH, N

In some embodiments, $R^2$ is $C_{1-8}$ alkyl, optionally substituted with halo.

In some embodiments, $R^2$ is selected from 2-methylbutyl, 2-ethylbutyl, 3-methylbutyl, 2-ethylpentyl, 2-ethyl-4-F-butyl, and sec-butyl.

In some embodiments, $R^2$ is selected from 2-methylbutyl, 2-ethylbutyl, 3-methylbutyl, 2-ethylpentyl, and 2-ethyl-4-F-butyl, sec-butyl.

In some embodiments, $R^2$ is $C_{1-8}$ alkyl optionally substituted with halo or $Cy^1$.

In some embodiments, $R^2$ is $C_{1-8}$ alkyl substituted with $Cy^1$.

In some embodiments, $R^2$ is $C_{1-8}$ alkyl substituted with $C_{6-10}$ aryl, which is optionally substituted with halo or $C_{1-3}$ alkyl.

In some embodiments, $R^2$ is methyl substituted with phenyl.

In some embodiments, $R^2$ is ethyl substituted with phenyl.

In some embodiments, $R^2$ is $C_{1-8}$ alkyl substituted with $C_{3-10}$ cycloalkyl, which is optionally substituted with halo or $C_{1-3}$ alkyl.

In some embodiments, $R^2$ is methyl substituted with cyclopropyl, cyclobutyl, cyclopentyl, or cyclohexyl.

In some embodiments, $R^2$ is ethyl substituted with cyclopropyl, cyclobutyl, cyclopentyl, or cyclohexyl.

In some embodiments, $R^2$ is $C_{1-8}$ alkyl substituted with 5-10 membered heteroaryl, which is optionally substituted with halo or $C_{1-3}$ alkyl.

In some embodiments, $R^2$ is methyl substituted with pyridinyl.

In some embodiments, $R^2$ is ethyl substituted with pyridinyl.

In some embodiments, $R^2$ is $C_{1-8}$ alkyl substituted with 4-10 membered heterocycloalkyl, which is optionally substituted with halo or $C_{1-3}$ alkyl.

In some embodiments, $R^2$ is methyl substituted with oxiranyl or oxetanyl.

In some embodiments, $R^2$ is ethyl substituted with oxiranyl or oxetanyl.

In some embodiments, $R^2$ is selected from cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene In some embodiments, $R^2$ is selected from 2-methylbutyl, 2-ethylbutyl, 3-methylbutyl, 2-ethylpentyl, 2-ethyl-4-F-butyl, sec-butyl, cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene.

In some embodiments, $R^2$ is selected from 2-methylbutyl, 2-ethylbutyl, 3-methylbutyl, 2-ethylpentyl, 2-ethyl-4-F-butyl, cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene.

In some embodiments, $R^3$ is $C_{6-10}$ aryl, optionally substituted with $C_{1-3}$ alkoxy, HO—$C_{1-3}$ alkylene, $NH_2$-$C_{1-3}$ alkylene, amino, or $C_{1-3}$ alkylamino.

In some embodiments, $R^3$ is any one of the following groups:

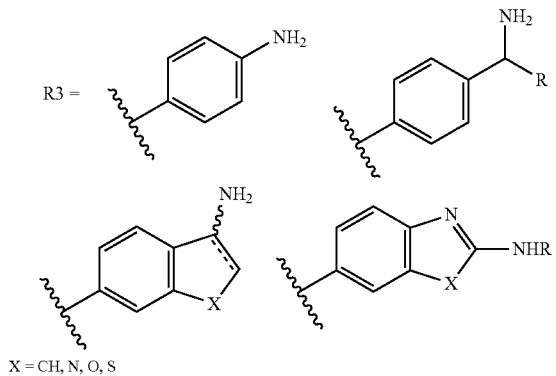

X = CH, N, O, S

In some embodiments, $R^3$ is $C_{6-10}$ aryl, optionally substituted with HO—$C_{1-3}$ alkylene, $NH_2$—$C_{1-3}$ alkylene, amino, or $C_{1-3}$ alkylamino.

In some embodiments, $R^3$ is phenyl, optionally substituted with $C_{1-3}$ alkoxy, HO—$C_{1-3}$ alkylene, $NH_2$—$C_{1-3}$ alkylene, amino, or $C_{1-3}$ alkylamino.

In some embodiments, $R^3$ is phenyl, optionally substituted with HO—$C_{1-3}$ alkylene, $NH_2$—$C_{1-3}$ alkylene, amino, or $C_{1-3}$ alkylamino.

In some embodiments, $R^3$ is 5-10 membered heteroaryl, optionally substituted with $C_{1-3}$ alkoxy, HO—$C_{1-3}$ alkylene, $NH_2$—$C_{1-3}$ alkylene, amino, or $C_{1-3}$ alkylamino.

In some embodiments, $R^3$ is selected from benzodioxolyl, benzofuranyl, benzothiophenyl, indolyl, benzooxazolyl, and benzothiazolyl, each of which is optionally substituted with $C_{1-3}$ alkoxy, HO—$C_{1-3}$ alkylene, $NH_2$—$C_{1-3}$ alkylene, amino, or $C_{1-3}$ alkylamino.

In some embodiments, $R^4$ is $C_{1-3}$ alkyl.

In some embodiments, $R^4$ is $C_{1-3}$ haloalkyl.

In some embodiments, $R^5$ is $C_{1-3}$ alkyl.

In some embodiments, $R^5$ is $C_{1-3}$ haloalkyl.

In some embodiments:

$R^2$ is $C_{1-8}$ alkyl optionally substituted with halo or $Cy^1$;

$R^3$ is selected from $C_{6-10}$ aryl and 5-10 membered heteroaryl, each of which is optionally substituted with $C_{1-3}$ alkoxy, HO—$C_{1-3}$ alkylene, $NH_2$—$C_{1-3}$ alkylene, amino, or $C_{1-3}$ alkylamino;

$R^4$ is $C_{1-3}$ alkyl; and $R^5$ is $C_{1-3}$ alkyl.

In some embodiments:

$R^2$ is selected from 2-methylbutyl, 2-ethylbutyl, 3-methylbutyl, 2-ethylpentyl, 2-ethyl-4-F-butyl, sec-butyl, cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene;

$R^3$ is selected from phenyl, benzodioxolyl, benzofuranyl, benzothiophenyl, indolyl, benzooxazolyl, and benzothiazolyl, each of which is optionally substituted with $C_{1-3}$ alkoxy, HO—$C_{1-3}$ alkylene, $NH_2$—$C_{1-3}$ alkylene, amino, or $C_{1-3}$ alkylamino;

R⁴ is $C_{1-3}$ alkyl; and

R⁵ is $C_{1-3}$ alkyl.

In some embodiments:

R² is selected from 2-methylbutyl, 2-ethylbutyl, 3-methylbutyl, 2-ethylpentyl, 2-ethyl-4-F-butyl, cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene;

R³ is selected from phenyl, benzodioxolyl, benzofuranyl, benzothiophenyl, indolyl, benzooxazolyl, and benzothiazolyl, each of which is optionally substituted with $C_{1-3}$ alkoxy, HO—$C_{1-3}$ alkylene, NH₂—$C_{1-3}$ alkylene, amino, or $C_{1-3}$ alkylamino;

R⁴ is $C_{1-3}$ alkyl; and

R⁵ is $C_{1-3}$ alkyl.

In some embodiments, the compound of Formula (I) is selected from any one of the following compounds, or a pharmaceutically acceptable salt thereof:

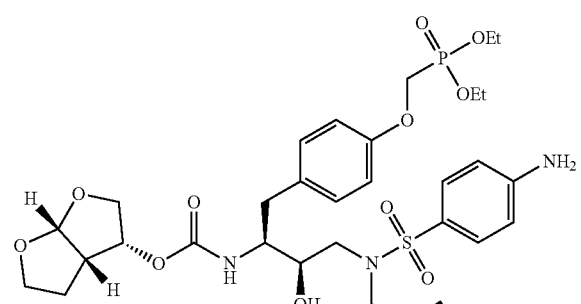

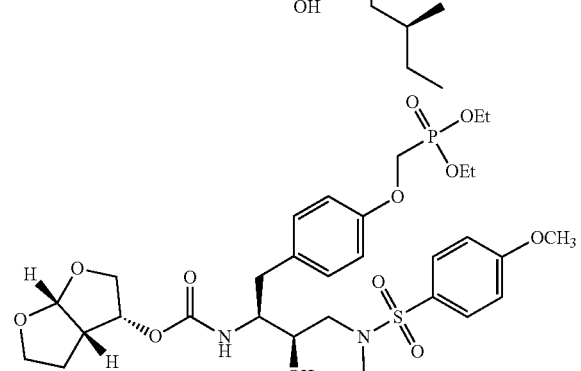

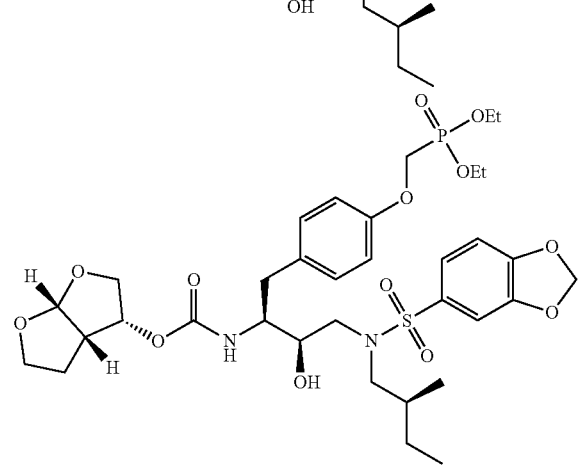

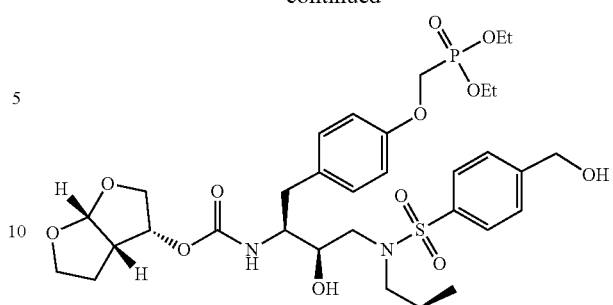

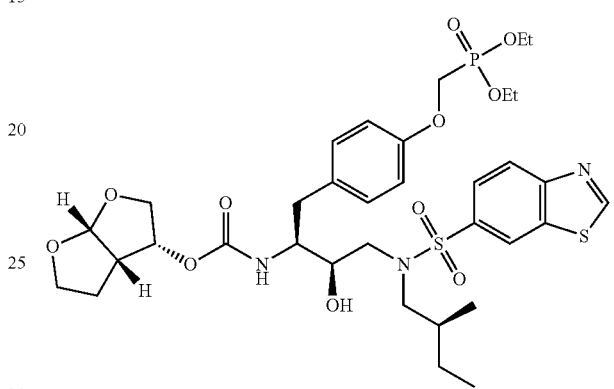

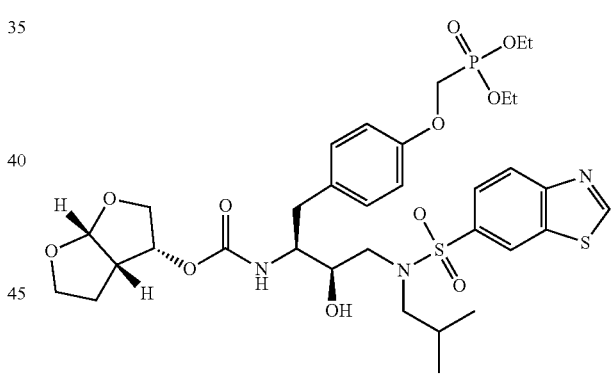

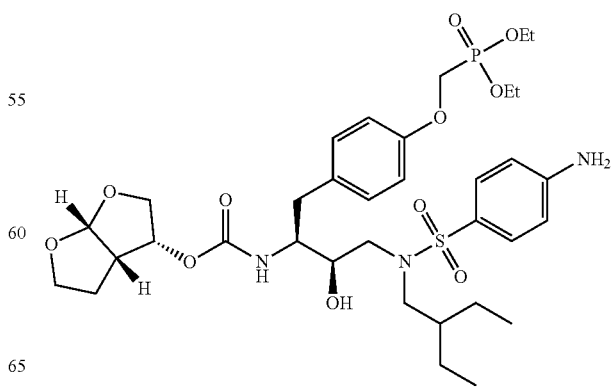

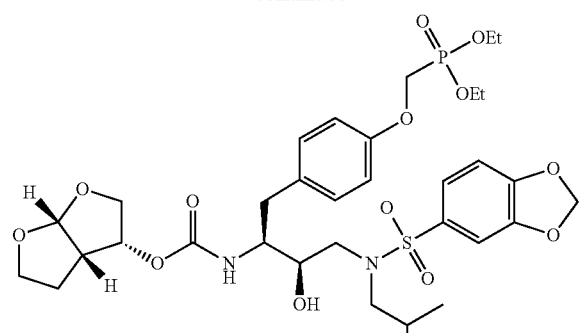

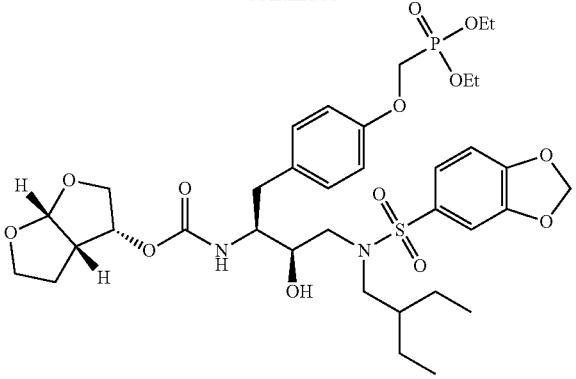

In some embodiments, the compound of Formula (I) is:

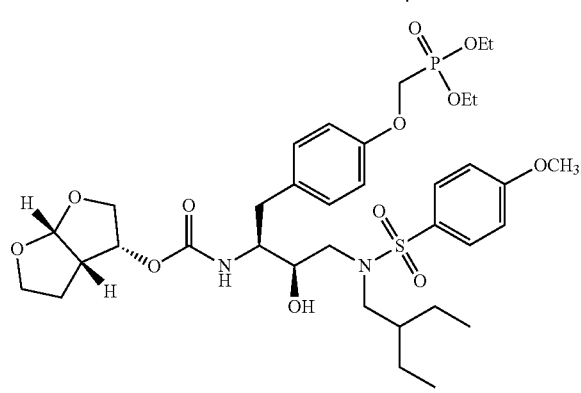

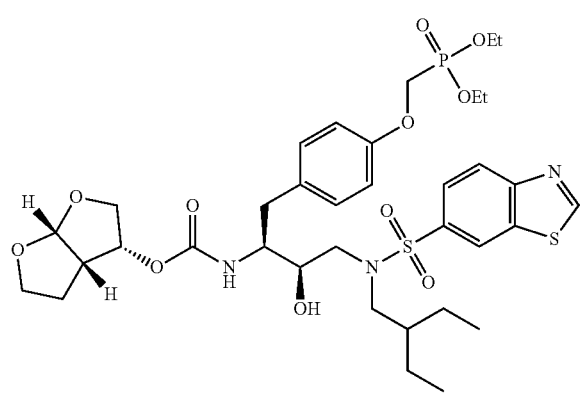

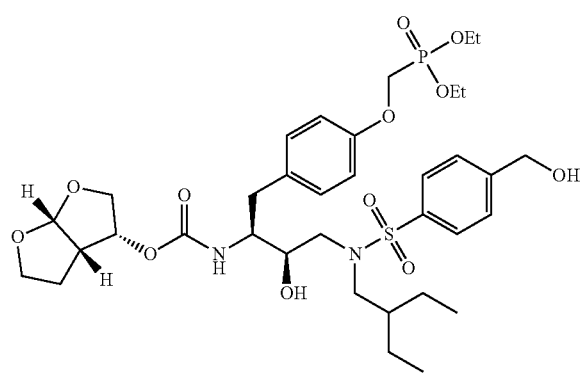

or a pharmaceutically acceptable salt thereof.

Pharmaceutically Acceptable Salts

In some embodiments, a salt of any one of the compounds of the present disclosure is formed between an acid and a basic group of the compound, such as an amino functional group, or a base and an acidic group of the compound, such as a carboxyl functional group. According to another embodiment, the compound is a pharmaceutically acceptable acid addition salt.

In some embodiments, acids commonly employed to form pharmaceutically acceptable salts of the compounds include inorganic acids such as hydrogen bisulfide, hydrochloric acid, hydrobromic acid, hydroiodic acid, sulfuric acid and phosphoric acid, as well as organic acids such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1, 4-dioate, hexyne-1,6-dioate, benzoate, chlorobenzoate, methylbenzoate, dinitrobenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts. In one embodiment, pharmaceutically acceptable acid addition salts include those formed with mineral acids such as hydrochloric acid and hydrobromic acid, and especially those formed with organic acids such as maleic acid.

In some embodiments, bases commonly employed to form pharmaceutically acceptable salts of the compounds include hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or trialkylamines, dicyclohexylamine; tributyl amine; pyridine; N-methyl, N-ethylamine; diethylamine; triethylamine; mono-, bis-, or tris-(2-OH—(C1-C6)-alkylamine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like.

Methods of Use

The compounds of Formula (I) described herein are inhibitors of viral proteases (e.g., HIV-1 protease and HTLV-1 protease). As such, the compounds are useful in inhibiting the viral life-cycle and concomitantly treating the viral infections (e.g., viral infections caused by HIV-1 and HTLV-1 viruses).

Inhibition of HIV Protease

HIV is a deadly infection, which, if left untreated, leads to acquired immune deficiency syndrome (AIDS) and ultimate death of the patient. HIV-1 protease is a retroviral aspartyl protease (retropepsin), an enzyme involved with peptide bond hydrolysis in retroviruses and is essential for the life-cycle of the virus. Inhibiting the protease disrupts this life cycle and prevents the spread of the infection. HIV-1 protease inhibitors (PIs) have continued to play a prominent role in the treatment of HIV infection since their first introduction in 1995. Protease inhibitors (alone or in combination with other antiretrovirals) can produce a rapid and sustained decline of plasma viral RNA and a concomitant increase in CD4 T cell count in HIV-infected individuals, and prevent the progression of HIV related disease.

Figure 3:
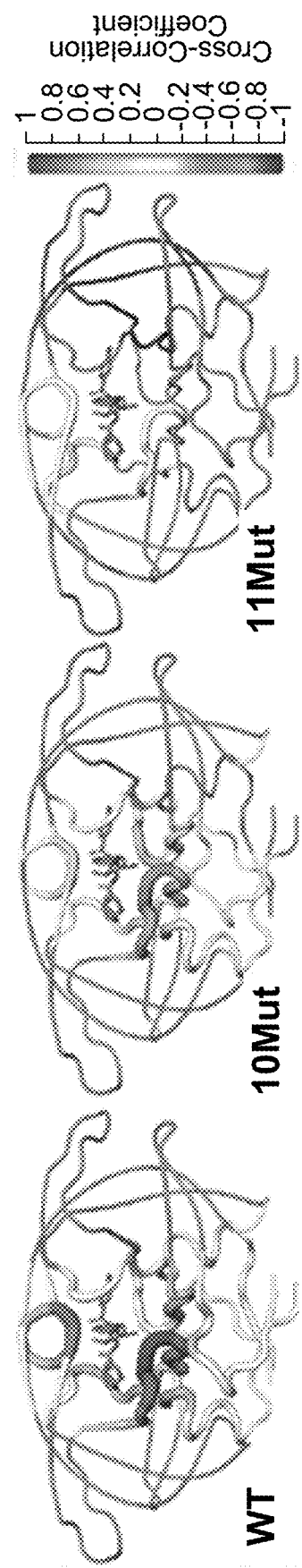
FIG. 3 contains images showing that cross-correlation decreases with resistance: pMD reveals in resistant variants (10 Mut and 11 Mut) loss of protease-inhibitor correlated motions.

In some embodiments, the present disclosure provides a method of treating a human immunodeficiency virus (HIV) infection, the method comprising administering to a subject in need thereof a therapeutically effective amount of a compound of Formula (I), or a pharmaceutically acceptable salt thereof, or a pharmaceutical composition of comprising same. In one example, the HIV infection is caused by HIV-1 virus or HIV-2 virus. Without being bound by a theory, it is believed that administering of the compound to the patient results in inhibition of the HIV protease (e.g., HIV-1 protease). Hence, in some embodiments, the present disclosure provides a method of inhibiting an HIV protease in a subject, the method comprising administering to the subject in need thereof a therapeutically effective amount of a compound of Formula (I), or a pharmaceutically acceptable salt thereof, or a pharmaceutical composition comprising same. In some embodiments, the HIV infection is resistant to treatment with one or more of the other antiviral agents. Examples of antiviral agents to which HIV infection may be resistant include HIV protease inhibitors (e.g., saquinavir, darunavir, ritonavir, indinavir, nelfinavir, or amprenavir). The resistant HIV infection may be 2-fold, 4-fold, 10-fold, or 16-fold less sensitive or susceptible to the antiviral agent compared to the infection caused by the viral strain that is not resistant to that antiviral agent. In some embodiments, a mutation in the HIV protease causes the viral infection to be resistant to the antiviral agent. In one example, the protease may have 2, 3, 4, 8, 10, or 11 amino acid mutations that cause the protease to lose sensitivity to the inhibitor. Examples of these protease mutations include 150, 184, 154, A71, L76, V82, and other mutations described in Example 14 and FIGS. 2-4. In some embodiments, the present disclosure provides a method of treating or preventing an AIDS in a subject, the method comprising administering to the subject having an HIV infection an effective amount of a compound of Formula (I), or a pharmaceutically acceptable salt thereof, or a pharmaceutical composition comprising same.

Inhibition of HTLV Pprotease

Figure 17A:
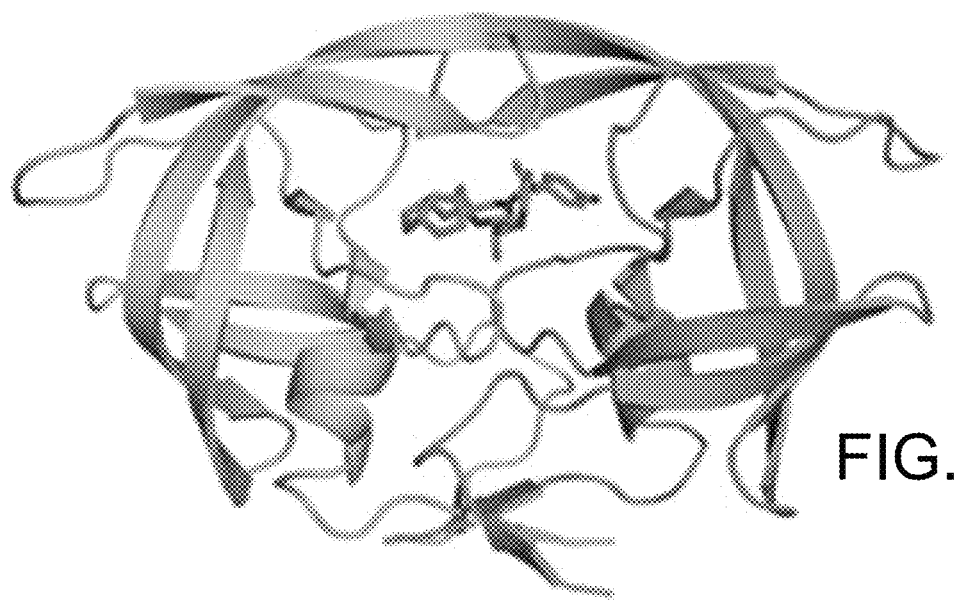
FIGS. 17A-17C contain images showing (A) Crystal structure of HIV-1 protease bound to DRV (PDB ID: 1T3R); (B) HIV-1 protease substrate envelope calculated from substrate-bound crystal structures. (C) crystal structure of HTLV-1 protease bound to DRV, 2.1 Å resolution.
Figure 17B:
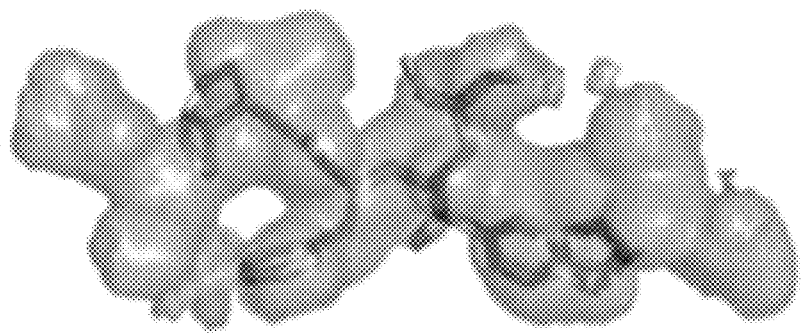
Figure 17C:

Human T-cell lymphotropic viruses type 1 and type 2 (HTLV-1/2) were the first human retroviruses described nearly 40 years ago. For decades HTLV-1 has been known to be highly carcinogenic and cause severe paralytic neurologic disease as well as immune disorders that can increase susceptibility to bacterial infections. HTLV-1 infection can lead to adult T-cell leukemia/lymphoma (ATL), HTLV-associated myelopathy/tropical spastic paraparesis (HAM/TSP), uveitis and infective dermatitis. HTLV-1 is transmitted via the same routes as HIV-1 (sexually, via blood or mother-to-child) with significant HIV/HTLV co-infections reported in Europe, America, and Africa. About 20 million people worldwide are infected with HTLV-1, reaching endemic rates of 30% in some parts of the world. According to a recent report, up to 45% of the adult population among five Aboriginal communities in central Australia tested positive for HTLV-1. With global human movement, HTLV-1 infections are starting to expand into previously non-endemic regions as recently reported for Spain from Latin American immigrants. HTLV-1 utilizes a similar viral machinery as HIV-1, and inhibiting the viral protease would prevent viral maturation. HTLV-1 protease is a 28 kDa homodimeric aspartyl protease that is 28% identical to HIV-1 protease with 45% identity between active site residues, yet HTLV-1 protease has considerably distinct substrate specificity (See FIGS. 6A and 17). This prevents the current HIV-1 protease inhibitors from being effective against HTLV-1, although some have very weak binding (e.g., DRV). A single therapeutic agent that inhibits both HIV and HTLV proteases could be used to treat the widely reported HIV/HTLV co-infections.

Although HTLV-1 replication is low in dormant phase, viral replication does occur when the virus is transmitted cell-to-cell, upon infection, and is activated prior to ATL development. In HTLV-1, the fidelity of RT and the mutation rates are very similar to HIV-1, BLV, RSV and MLV, which range from $0.5\times10^{-5}$ to $3.4\times10^{-5}$ mutations/base/cycle for BLV to HIV-1. In addition, APOBEC3s may contribute to viral heterogeneity. Under selective pressure of an inhibitor, the virus would likely acquire drug resistance.

In some embodiments, the present disclosure provides a method of treating a Human T-cell lymphotropic viruses type (e.g., HTLV-1 or HTLV-2) infection, the method comprising administering to a subject in need thereof a therapeutically effective amount of a compound of Formula (I), or a pharmaceutically acceptable salt thereof, or a pharmaceutical composition of comprising same. In one example, the HTLV infection is caused by HTLV-1 virus or HTLV-2 virus. Without being bound by a theory, it is believed that administering of the compound to the patient results in inhibition of the HTLV protease (e.g., HTLV-1 protease or HTLV-2 protease). Hence, in some embodiments, the present disclosure provides a method of inhibiting an HTLV protease in a subject, the method comprising administering to the subject in need thereof a therapeutically effective amount of a compound of Formula (I), or a pharmaceutically acceptable salt thereof, or a pharmaceutical composition comprising same. In some embodiments, the HTLV infection is resistant to treatment with one or more of the other antiviral agents. The resistant HTLV infection may be 2-fold, 4-fold, 10-fold, or 16-fold less sensitive or susceptible to the antiviral agent compared to the infection caused by the viral strain that is not resistant to that antiviral agent. In some embodiments, the present disclosure provides a method of treating or preventing an adult T-cell leukemia/lymphoma (ATL) in a subject, the method comprising administering to the subject having an HTLV infection an effective amount of a compound of Formula (I), or a pharmaceutically acceptable salt thereof, or a pharmaceutical composition comprising same. In some embodiments, the present disclosure provides a method of treating a human T-cell leukemia-lymphoma virus (HTLV) infection, the method comprising administering to a subject in need thereof a therapeutically effective amount of darunavir or indinavir, or a pharmaceutically acceptable salt thereof.

Compositions, formulations, and routes of administration

The present application also provides pharmaceutical compositions comprising an effective amount of a compound of the present disclosure (e.g., Formula (I)) disclosed herein, or a pharmaceutically acceptable salt thereof; and a pharmaceutically acceptable carrier. The pharmaceutical composition may also comprise any one of the additional therapeutic agents described herein. In certain embodiments, the application also provides pharmaceutical compositions and dosage forms comprising any one the additional therapeutic agents described herein. The carrier(s) are "acceptable" in the sense of being compatible with the other ingredients of the formulation and, in the case of a pharmaceutically acceptable carrier, not deleterious to the recipient thereof in an amount used in the medicament.

Pharmaceutically acceptable carriers, adjuvants and vehicles that may be used in the pharmaceutical compositions of the present application include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol, and wool fat.

The compositions or dosage forms may contain any one of the compounds and therapeutic agents described herein in the range of 0.005% to 100% with the balance made up from the suitable pharmaceutically acceptable excipients. The contemplated compositions may contain 0.001%400% of any one of the compounds and therapeutic agents provided herein, in one embodiment 0.1-95%, in another embodiment 75-85%, in a further embodiment 20-80%, wherein the balance may be made up of any pharmaceutically acceptable excipient described herein, or any combination of these excipients.

Routes of Administration and Dosage Forms

The pharmaceutical compositions of the present application include those suitable for any acceptable route of administration. Acceptable routes of administration include, but are not limited to, buccal, cutaneous, endocervical, endosinusial, endotracheal, enteral, epidural, interstitial, intra-abdominal, intra-arterial, intrabronchial, intrabursal, intracerebral, intracisternal, intracoronary, intradermal, intraductal, intraduodenal, intradural, intraepidermal, intraesophageal, intragastric, intragingival, intraileal, intralymphatic, intramedullary, intrameningeal, intramuscular, intranasal, intraovarian, intraperitoneal, intraprostatic, intrapulmonary, intrasinal, intraspinal, intrasynovial, intratesticular, intrathecal, intratubular, intratumoral, intrauterine, intravascular, intravenous, nasal, nasogastric, oral, parenteral, percutaneous, peridural, rectal, respiratory (inhalation), subcutaneous, sublingual, submucosal, topical, transdermal, transmucosal, transtracheal, ureteral, urethral and vaginal.

Compositions and formulations described herein may conveniently be presented in a unit dosage form, e.g., tablets, sustained release capsules, and in liposomes, and may be prepared by any methods well known in the art of pharmacy. See, for example, Remington: The Science and Practice of Pharmacy, Lippincott Williams & Wilkins, Baltimore, MD (20th ed. 2000). Such preparative methods include the step of bringing into association with the molecule to be administered ingredients such as the carrier that constitutes one or more accessory ingredients. In general, the compositions are prepared by uniformly and intimately bringing into association the active ingredients with liquid carriers, liposomes or finely divided solid carriers, or both, and then, if necessary, shaping the product.

In some embodiments, any one of the compounds and therapeutic agents disclosed herein are administered orally. Compositions of the present application suitable for oral administration may be presented as discrete units such as capsules, sachets, granules or tablets each containing a predetermined amount (e.g., effective amount) of the active ingredient; a powder or granules; a solution or a suspension in an aqueous liquid or a non-aqueous liquid; an oil-in-water liquid emulsion; a water-in-oil liquid emulsion; packed in liposomes; or as a bolus, etc. Soft gelatin capsules can be useful for containing such suspensions, which may beneficially increase the rate of compound absorption. In the case of tablets for oral use, carriers that are commonly used include lactose, sucrose, glucose, mannitol, and silicic acid and starches. Other acceptable excipients may include: a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. For oral administration in a capsule form, useful diluents include lactose and dried corn starch. When aqueous suspensions are administered orally, the active ingredient is combined with emulsifying and suspending agents. If desired, certain sweetening and/or flavoring and/or coloring agents may be added. Compositions suitable for oral administration include lozenges comprising the ingredients in a flavored basis, usually sucrose and acacia or tragacanth; and pastilles comprising the active ingredient in an inert basis such as gelatin and glycerin, or sucrose and acacia.

Compositions suitable for parenteral administration include aqueous and non-aqueous sterile injection solutions or infusion solutions which may contain antioxidants, buffers, bacteriostats and solutes which render the formulation isotonic with the blood of the intended recipient; and aqueous and non-aqueous sterile suspensions which may include suspending agents and thickening agents. The formulations may be presented in unit-dose or multi-dose containers, for example, sealed ampules and vials, and may be stored in a freeze dried (lyophilized) condition requiring only the addition of the sterile liquid carrier, for example water for injections, saline (e.g., 0.9% saline solution) or 5% dextrose solution, immediately prior to use. Extemporaneous injection solutions and suspensions may be prepared from sterile powders, granules and tablets. The injection solutions may be in the form, for example, of a sterile injectable aqueous or oleaginous suspension. This suspension may be formulated according to techniques known in the art using suitable dispersing or wetting agents and suspending agents. The sterile injectable preparation may also be a sterile injectable solution or suspension in a non-toxic parenterally-acceptable diluent or solvent, for example, as a solution in 1,3-butanediol. Among the acceptable vehicles and solvents that may be employed are mannitol, water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant.

The pharmaceutical compositions of the present application may be administered in the form of suppositories for rectal administration. These compositions can be prepared by mixing a compound of the present application with a suitable non-irritating excipient which is solid at room temperature but liquid at the rectal temperature and therefore will melt in the rectum to release the active components. Such materials include, but are not limited to, cocoa butter, beeswax, and polyethylene glycols.

The pharmaceutical compositions of the present application may be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other solubilizing or dispersing agents known in the art. See, for example, U.S. Pat. No. 6,803,031. Additional formulations and methods for intranasal administration are found in Ilium, L., *J Pharm Pharmacol*, 56:3-17, 2004 and Ilium, L., *Eur Pharm Sci* 11:1-18, 2000.

The topical compositions of the present disclosure can be prepared and used in the form of an aerosol spray, cream, emulsion, solid, liquid, dispersion, foam, oil, gel, hydrogel, lotion, mousse, ointment, powder, patch, pomade, solution, pump spray, stick, towelette, soap, or other forms commonly employed in the art of topical administration and/or cosmetic and skin care formulation. The topical compositions can be in an emulsion form. Topical administration of the pharmaceutical compositions of the present application is especially useful when the desired treatment involves areas or organs readily accessible by topical application. In some embodiments, the topical composition comprises a combination of any one of the compounds and therapeutic agents disclosed herein, and one or more additional ingredients, carriers, excipients, or diluents including, but not limited to, absorbents, anti-irritants, anti-acne agents, preservatives, antioxidants, coloring agents/pigments, emollients (moisturizers), emulsifiers, film-forming/holding agents, fragrances, leave-on exfoliants, prescription drugs, preservatives, scrub agents, silicones, skin-identical/repairing agents, slip agents, sunscreen actives, surfactants/detergent cleansing agents, penetration enhancers, and thickeners.

Dosages and Regimens

In the pharmaceutical compositions of the present application, a compound of the present disclosure (e.g., a compound of Formula (I)) is present in an effective amount (e.g., a therapeutically effective amount). Effective doses may vary, depending on the diseases treated, the severity of the disease, the route of administration, the sex, age and general health condition of the subject, excipient usage, the possibility of co-usage with other therapeutic treatments such as use of other agents and the judgment of the treating physician.

In some embodiments, an effective amount of the compound (e.g., Formula (I)) can range, for example, from about 0.001 mg/kg to about 500 mg/kg (e.g., from about 0.001 mg/kg to about 200 mg/kg; from about 0.01 mg/kg to about 200 mg/kg; from about 0.01 mg/kg to about 150 mg/kg; from about 0.01 mg/kg to about 100 mg/kg; from about 0.01 mg/kg to about 50 mg/kg; from about 0.01 mg/kg to about 10 mg/kg; from about 0.01 mg/kg to about 5 mg/kg; from about 0.01 mg/kg to about 1 mg/kg; from about 0.01 mg/kg to about 0.5 mg/kg; from about 0.01 mg/kg to about 0.1 mg/kg; from about 0.1 mg/kg to about 200 mg/kg; from about 0.1 mg/kg to about 150 mg/kg; from about 0.1 mg/kg to about 100 mg/kg; from about 0.1 mg/kg to about 50 mg/kg; from about 0.1 mg/kg to about 10 mg/kg; from about 0.1 mg/kg to about 5 mg/kg; from about 0.1 mg/kg to about 2 mg/kg; from about 0.1 mg/kg to about 1 mg/kg; or from about 0.1 mg/kg to about 0.5 mg/kg). In some embodiments, an effective amount of a compound of Formula (I) is about 0.1 mg/kg, about 0.5 mg/kg, about 1 mg/kg, about 2 mg/kg, or about 5 mg/kg.

The foregoing dosages can be administered on a daily basis (e.g., as a single dose or as two or more divided doses, e.g., once daily, twice daily, thrice daily) or non-daily basis (e.g., every other day, every two days, every three days, once weekly, twice weekly, once every two weeks, once a month).

Kits

The present invention also includes pharmaceutical kits useful, for example, in the treatment of disorders, diseases and conditions referred to herein, which include one or more containers containing a pharmaceutical composition comprising a therapeutically effective amount of a compound of the present disclosure. Such kits can further include, if desired, one or more of various conventional pharmaceutical kit components, such as, for example, containers with one or more pharmaceutically acceptable carriers, additional containers, etc. Instructions, either as inserts or as labels, indicating quantities of the components to be administered, guidelines for administration, and/or guidelines for mixing the components, can also be included in the kit. The kit may optionally include an additional therapeutic agent as described herein.

Combination Therapies

In some embodiments, the compound of Formula (I), or a pharmaceutically acceptable salt thereof, can be administered to the subject in combination with at least one additional antiviral therapeutic agent (e.g., 1, 2, 3, or 4 additional antiviral therapeutic agents), or a pharmaceutically acceptable salt thereof. The compound of Formula (I) can be administered to the subject in the same pharmaceutical composition or dosage form as the additional antiviral therapeutic agent(s), or in separate compositions and dosage forms, which could be administered to the subject simultaneously or sequentially (e.g., before or after) with the compound of Formula (I).

Examples of antiviral therapeutic agents which can be administered to the subject to treat or prevent an HIV or an HTLV infection include any clinically available antiretroviral therapy (e.g., HAART). In some embodiments, the antiviral therapeutic agent is a drug that is useful in treating an HIV infection. Such a drug may be selected from a non-nucleoside reverse transcriptase inhibitor (NNRTI), a nucleoside analog reverse transcriptase inhibitor (NRTI), an HIV integrase inhibitor, and a protease inhibitor. Suitable examples of non-nucleoside reverse transcriptase inhibitors include efavirenz, nevirapine, delavirdine, etravirine, rilpivirine, and doravirine, or a pharmaceutically acceptable salt thereof. Suitable examples of nucleoside analog reverse transcriptase inhibitors include zidovudine (AZT), didanosine, zalcitabine, stavudine, lamivudine, abacavir, emtricitabine, and entecavir, or a pharmaceutically acceptable salt thereof. Suitable examples of HIV integrase inhibitors include raltegravir, elvitegravir, dolutegravir, bictegravir, and cabotegravir. Other examples of HIV integrase inhibitors are described, for example, in Barski et al., Inhibition of HTLV-1 Infection by HIV-1 First- and Second-Generation Integrase Strand Transfer Inhibitors, *Frontiers in Microbiology*, 2019, 10, 1877, 1-11, which is incorporated herein by reference in its entirety. Suitable examples of protease inhibitors include amprenavir, atazanavir, darunavir, fosamprenavir, indinavir, lopinavir, nelfinavir, ritonavir, saquinavir, tipranavir, and brecanavir, or a pharmaceutically acceptable salt thereof. In some embodiments, the antiviral therapeutic agent is a drug that is useful in treating an HTLV infection. Such a drug may be selected from prosultiamine, azacytidine, tenofovir disoproxil, and cepharanthine, or a pharmaceutically acceptable salt thereof.

Definitions

As used herein, the term "about" means "approximately" (e.g., plus or minus approximately 10% of the indicated value).

At various places in the present specification, substituents of compounds of the invention are disclosed in groups or in ranges. It is specifically intended that the invention include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

At various places in the present specification various aryl, heteroaryl, cycloalkyl, and heterocycloalkyl rings are described. Unless otherwise specified, these rings can be attached to the rest of the molecule at any ring member as permitted by valency. For example, the term "a pyridine ring" or "pyridinyl" may refer to a pyridin-2-yl, pyridin-3-yl, or pyridin-4-yl ring.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. The substituents are independently selected, and substitution may be at any chemically accessible position. As used herein, the term "substituted" means that a hydrogen atom is removed and replaced by a substituent. A single divalent substituent, e.g., oxo, can replace two hydrogen atoms. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include, but are not limited to, methoxy, ethoxy, propoxy (e.g., n-propoxy and isopropoxy), butoxy (e.g., n-butoxy and tert-butoxy), and the like. In some embodiments, the alkyl group has 1 to 6, 1 to 4, or 1 to 3 carbon atoms.

As used herein, "$C_{n-m}$ haloalkoxy" refers to a group of formula —O-haloalkyl having n to m carbon atoms. An example haloalkoxy group is $OCF_3$. In some embodiments, the haloalkoxy group is fluorinated only. In some embodiments, the alkyl group has 1 to 6, 1 to 4, or 1 to 3 carbon atoms.

As used herein, the term "amino" refers to a group of formula —$NH_2$.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (e.g., N-(n-propyl) amino and N-isopropylamino), N-butylamino (e.g., N-(n-butyl)amino and N-(tert-butyl)amino), and the like.

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "HO—$C_{1-3}$ alkyl" refers to a group of formula —($C_{1-3}$ alkylene)-OH.

As used herein, the term "NH$_2$-$C_{1-3}$ alkyl" refers to a group of formula —($C_{1-3}$ alkylene)-NH$_2$.

As used herein, "halo" refers to F, Cl, Br, or I. In some embodiments, a halo is F, Cl, or Br.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to 10 carbon atoms. In some embodiments, the aryl group is phenyl or naphtyl.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Ring-forming carbon atoms of a cycloalkyl group can be optionally substituted by 1 or 2 independently selected oxo or sulfide groups (e.g., C(O) or C(S)). Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring. Cycloalkyl groups can have 3, 4, 5, 6, 7, 8, 9, or 10 ring-forming carbons ($C_{3-10}$). In some embodiments, the cycloalkyl is a $C_{3-10}$ monocyclic or bicyclic cyclocalkyl. In some embodiments, the cycloalkyl is a $C_{3-7}$ monocyclic cyclocalkyl. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl, and the like. In some embodiments, cycloalkyl is cyclopropyl, cyclobutyl, cyclopentyl, or cyclohexyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, 7-, 8-, 9- or 10-membered heterocycloalkyl groups. Heterocycloalkyl groups can also include spirocycles. Example heterocycloalkyl groups include pyrrolidin-2-one, 1,3-i soxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by 1 or 2 independently selected oxo or sulfido groups (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl is a monocyclic 4-6 membered heterocycloalkyl having 1 or 2 heteroatoms independently selected from nitrogen, oxygen, or sulfur and having one or more oxidized ring members. In some embodiments, the heterocycloalkyl is a monocyclic or bicyclic 4-10 membered heterocycloalkyl having 1, 2, 3, or 4 heteroatoms independently selected from nitrogen, oxygen, or sulfur and having one or more oxidized ring members.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl is a 5-10 membered monocyclic or bicyclic heteroaryl having 1, 2, 3 or 4 heteroatom ring members independently selected from nitrogen, sulfur and oxygen. In some embodiments, the heteroaryl is a 5-6 monocyclic heteroaryl having 1 or 2 heteroatom ring members independently selected from nitrogen, sulfur, and oxygen. In some embodiments, the heteroaryl is a five-membered or six-membereted heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

The compounds described herein can be asymmetric (e.g., having one or more stereocenters). All stereoisomers, such as enantiomers and diastereomers, are intended unless otherwise indicated. Compounds of the present invention that contain asymmetrically substituted carbon atoms can be isolated in optically active or racemic forms. Methods on how to prepare optically active forms from optically inactive starting materials are known in the art, such as by resolution of racemic mixtures or by stereoselective synthesis. Many geometric isomers of olefins, C=N double bonds, N=N double bonds, and the like can also be present in the compounds described herein, and all such stable isomers are contemplated in the present invention. Cis and trans geometric isomers of the compounds of the present invention are described and may be isolated as a mixture of isomers or as separated isomeric forms. In some embodiments, the compound has the (R)-configuration. In some embodiments, the compound has the (S)-configuration.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal.

As used herein, the term "contacting" refers to the bringing together of indicated moieties in an in vitro system or an in vivo system. For example, "contacting" the viral protease with a compound of the invention includes the administration of a compound of the present invention to an individual or patient, such as a human, having a viral infection, as well as, for example, introducing a compound of the invention into a sample containing a cellular or purified preparation containing the viral protease.

As used herein, the term "individual", "patient", or "subject" used interchangeably, refers to any animal, including mammals, preferably mice, rats, other rodents, rabbits, dogs, cats, swine, cattle, sheep, horses, or primates, and most preferably humans.

As used herein, the phrase "effective amount" or "therapeutically effective amount" refers to the amount of active compound or pharmaceutical agent that elicits the biological or medicinal response in a tissue, system, animal, individual or human that is being sought by a researcher, veterinarian, medical doctor or other clinician.

As used herein the term "treating" or "treatment" refers to 1) inhibiting the disease; for example, inhibiting a disease, condition or disorder in an individual who is experiencing or displaying the pathology or symptomatology of the disease, condition or disorder (i.e., arresting further development of the pathology and/or symptomatology), or 2) ameliorating the disease; for example, ameliorating a disease, condition or disorder in an individual who is experiencing or displaying the pathology or symptomatology of the disease, condition or disorder (i.e., reversing the pathology and/or symptomatology).

As used herein, the term "preventing" or "prevention" of a disease, condition or disorder refers to decreasing the risk of occurrence of the disease, condition or disorder in a subject or group of subjects (e.g., a subject or group of subjects predisposed to or susceptible to the disease, condition or disorder). In some embodiments, preventing a disease, condition or disorder refers to decreasing the possibility of acquiring the disease, condition or disorder and/or its associated symptoms. In some embodiments, preventing a disease, condition or disorder refers to completely or almost completely stopping the disease, condition or disorder from occurring.

EXAMPLES

General synthetic methods. All reactions were performed in oven-dried round-bottom flasks fitted with rubber septa under argon atmosphere unless otherwise noted. All reagents and solvents, including anhydrous solvents, were purchased from commercial sources and used as received. Flash column chromatography was performed on an automated Teledyne ISCO CombiFlash Rf+ system equipped with a UV-vis detector using disposable Redisep Gold high performance silica gel columns or was performed manually using silica gel (230-400 mesh, EMD Millipore). Thin-layer chromatography (TLC) was performed using silica gel (60 $F_{254}$) coated aluminum plates (EMD Millipore), and spots were visualized by exposure to ultraviolet light (UV), exposure to iodine adsorbed on silica gel, and/or staining with alcohol solutions of phosphomolybdic acid (PMA) and ninhydrin followed by brief heating. $^1$H NMR and $^{13}$C NMR spectra were acquired on Varian Mercury 400 MHz and Bruker Avance III HD 500 MHz NMR instruments. Chemical shifts are reported in ppm (δ scale) with the residual solvent signal used as a reference and coupling constant (J) values are reported in hertz (Hz). Data are presented as follows: chemical shift, multiplicity (s=singlet, d=doublet, dd=doublet of doublet, dd=doublet of triplet, t=triplet, m=multiplet, br s=broad singlet), coupling constant in Hz, and integration. High-resolution mass spectra (HRMS) were recorded on a Thermo Scientific Orbitrap Velos Pro mass spectrometer coupled with a Thermo Scientific Accela 1250 UPLC and an autosampler using electrospray ionization (ESI) in the positive mode. The purity of final compounds was determined by analytical HPLC and was found to be ≥95% pure. HPLC was performed on a Agilent 1200 system equipped with a multiple wavelength detector and a manual injector under the following conditions: column, Phenomenex Hypersil-BDS-5u-C18 (5 μm, 4.6 mm×250 mm, 130 Å); solvent A, H$_2$O containing 0.1% trifluoroacetic acid (TFA); solvent B, CH$_3$CN containing 0.1% TFA; gradient, 20% B to 100% B over 15 min followed by 100% B over 5 min; injection volume, 20 μL; flow rate, 1 mL/min. The wavelengths of detection were 254 nm and 280 nm.

Protease Gene Construction. Protease gene construction was carried out as previously described. The NL4-3 strain has four naturally occurring polymorphisms in the protease relative to the SF2 strain. In short, the protease variant genes (I84V, I50V/A71V) were constructed using QuikChange site-directed mutagenesis (Genewiz) onto NL4-3 wild-type protease on a pET11a plasmid with codon optimization for protein expression in *Escherichia coli*. A Q7K mutation was included to prevent autoproteolysis.

Protein Expression and Purification. The expression, isolation, and purification of WT and mutant HIV-1 proteases used for the kinetic assays and crystallization were carried out as previously described. Briefly, the gene encoding the HIV protease was subcloned into the heat-inducible pXC35 expression vector (ATCC) and transformed into *E. coli* TAP-106 cells. Cells grown in 6 L of Terrific Broth were lysed with a cell disruptor and the protein was purified from inclusion bodies. The inclusion body centrifugation pellet was dissolved in 50% acetic acid followed by another round of centrifugation to remove impurities. Size exclusion chromatography was used to separate high molecular weight proteins from the desired protease. This was carried out on a 2.1 L Sephadex G-75 superfine column (Millipore Sigma) equilibrated with 50% acetic acid. The cleanest fractions of HIV protease were refolded into a 10-fold dilution of 0.05 M sodium acetate at pH 5.5, 5% ethylene glycol, 10% glycerol, and 5 mM DTT. Folded protein was concentrated down to 1-2 mg/mL and stored. This stored protease was used in Ki assays. For crystallography, a final purification was performed with a Pharmacia Superdex 75 FPLC column equilibrated with 0.05 M sodium acetate at pH 5.5, 5% ethylene glycol, 10% glycerol, and 5 mM DTT. Protease fractions purified from the size exclusion column were concentrated to 1-2 mg/mL using an Amicon Ultra-15 10-kDa device (Millipore) for crystallization. The expression, isolation, and purification of HTLV-1 protease used for the kinetic assays and crystallization was carried out as previously described for HIV-1 protease. Freshly purified protease was used for crystallization and the rest was stored at −80° C. This stored protease was used for $K_M$ and $K_i$ assays.

HIV Enzyme Inhibition Assays. The enzyme inhibition assays were carried out as previously described. To determine the enzyme inhibition constant (Ki), in a 96-well plate, each inhibitor was serially diluted, including a no drug control, and incubated with 0.35 nM protein for 1 hour. A 10-amino acid substrate containing an optimized protease cleavage site with an EDANS/DABCYL FRET pair was dissolved in 4% DMSO at 120 µM. Using the Envision plate reader, 5 µL of the 120 µM substrate was added to the 96-well plate to a final concentration of 10 µM. The fluorescence was observed with an excitation at 340 nm and emission at 492 nm and monitored for 200 counts, for approximately 60 min. Data was analyzed with Prism7. DRV was used as a control in all assays.

HIV Antiviral Assays. 293T and TZM-BL cells (NIH AIDS Research and Reference Reagent Program) were maintained in Dulbecco's modified Eagle's medium supplemented with 10% fetal calf serum in the presence of penicillin and streptomycin at 37° C. with 5% $CO_2$. To determine the concentration of drugs achieving 50% inhibition of infection compared with the drug-free control, $4.5 \times 10^6$ 293T cells were seeded onto a 10-cm plate 24 h before transfection. Cells were transfected with 8 µg of either the wild-type plasmid, infectious molecular clone pNL-CH derived from the pNL4-3 clone of HIV-1 using FuGENE 6 transfection reagent (Roche). The culture supernatant of 293T cells transfected with wild-type or PI-resistant HIV-1 variant was removed 18 h after transfection and the cells were washed with 1× PBS. The 293T cells were collected and transferred to wells of a 24-well plate. Briefly, each drug was serially diluted in the culture medium and the dilutions were added to the wells of a 24-well plate. The 293T cells ($0.5 \times 10^6$ per well) collected from the transfection were added to wells containing various concentrations of drug. The culture supernatant containing virus particles was harvested 18 h after the 293T cells were reseeded in the presence of drug. This supernatant was filtered through a 0.45-µm-pore-size membrane (Millipore) to remove cell debris then used to infect $2 \times 10^4$ TZM-BL cells in a 96-well plate following a procedure previously described. The culture supernatant was removed from each well 48 h post-infection, and the cells were washed with 1× PBS. For the luciferase assay, infected TZM-BL cells were lysed in 1× reporter lysis buffer (Promega) and the cells were kept at −80° C. After one freeze-thaw cycle, the cell lysates were transferred into a 96-well assay plate (Costar), and luciferase activity was measured using a luminometer (Promega). The culture supernatant harvested from 293T cells reseeded in the absence of drugs was used as a drug-free control. $EC_{50}$ was determined based on a dose-response curve generated using GraphPad Prism (version 7.0).

HTLV Enzyme Binding Assays to Determine $K_M$: To determine the enzyme activity, in a 96-well plate, purified protease was provided a 10-amino acid substrate containing the natural cleavage site (MA/CA or CA/NC) with an EDANS/DABCYL FRET pair dissolved in 8% DMSO was 2/3 serially diluted from 0 to 40 µM for MA/CA and 0 to 100 µM to CA/NC. Using a PerkinElmer Envision plate reader, 5 µL of HTLV-1 protease were added to the 96-well plate to obtain a final concentration of 1 µM. Fluorescence was observed with an excitation at 340 nm and emission at 492 nm and monitored for 200 counts. FRET inner filter effect correction was applied as previously described.[43] Data corrected for the inner filter effect was analyzed with Prism8.

HTLV Enzyme Inhibition Assays to Determine $K_i$: To determine the enzyme inhibition constant ($K_i$), in a 96-well plate, each inhibitor was 2/3 serially diluted from 400 µM to 6.9 µM for IDV, 30 µM to 0.5 µM for DRV and UM6 or 2 µM to 0.03 µM for example 7. All assays included a 0 µM control, and incubated with 1 µM protein for 1 hour. A 10-amino acid substrate containing a solubility enhanced HTLV-1 MA/CA protease cleavage site (Ac-R-E(EDANS)-APQVLPVMHPK(DABCYL)-R-NH2) with an EDANS/DABCYL FRET pair (BAChem) was dissolved in 4% DMSO. Using the Envision plate reader, 5 µL of the substrate was added to the 96-well plate to a final concentration of 10 µM. The fluorescence was observed with an excitation at 340 nm and emission at 492 nm and monitored for 200 counts. Data was analyzed with Prism8. UM6 was used as a control in all assays.

Protein Crystallization. HIV: The condition reliably producing cocrystals of NL4-3 WT protease bound to PIs was discovered and optimized as previously described. Briefly, all cocrystals were grown at room temperature by hanging drop vapor diffusion method in a 24-well VDX hanging-drop trays (Hampton Research) with a protease concentration of 1.4-1.7 mg/mL with 3-fold molar excess of inhibitors and mixed with the precipitant solution at a 1:2 ratio. The reservoir solution was 23-27% (w/v) ammonium sulfate with 0.1 M bis-Tris-methane buffer at pH 5.5, and the crystallization drops were set with 2 µL of well solution and 1 µL of protein-inhibitor solution and micro-seeded with a cat whisker. Diffraction quality crystals were obtained within 1 week. As data were collected at 100 K, cryogenic conditions contained the precipitant solution supplemented with 25% glycerol. HTLV: Many crystallization conditions produced HTLV-1 protease cocrystals with a hexagonal plate morphology, but the condition most reliably producing larger crystals in three dimensions was discovered using the JCSG+ sparse screen, well C6, containing 40% (v/v) PEG 300, 0.1M Phosphate/Citrate pH 4.2. All cocrystals were grown at room temperature by hanging drop vapor diffusion method in a 24-well VDX hanging-drop trays (Hampton Research) with a protease concentration of 4.0 mg/mL with 5-fold molar excess of inhibitor and mixed with the precipitant solution at a 1:1 ratio. The precipitant solution consisted of 39-41% (v/v) PEG 300 with 0.1 M Phosphate/Citrate buffer at pH 4.2 and the crystallization drops were set with 1 µL of precipitant solution and 1 µL protein-inhibitor solution and micro-seeded with a cat whisker and dried over a well solution of 3.0-4.0 M NaCl. Diffraction quality crystals were obtained within 2 weeks. Data were collected at 100 K and due to the high percentage of low molecular weight PEG there was no need for supplemental cryoprotectant. The cocrystal of compound of Example 7 bound to HIV-1 protease was generated as previously described.

Construction of the HTLV-1 Protease Expression Plasmid: the 116 amino acid HTLV-1 variant (Uniprot Accession ID: Q82134) was ordered from Genscript on a pET11a plasmid with codon optimization for protein expression in *Escherichia coli*. A L401 mutation was included to prevent autoproteolysis.

HIV X-Ray Data Collection and Structure Solution. X-ray diffraction data were collected and solved as previously described. Diffraction quality crystals were flash frozen under a cryostream when mounting the crystals either at our in-house Rigaku_Saturn944 X-ray system or the Chicago APS Synchrotron Beamline 23-1D-D. The cocrystal diffraction intensities from the Rigaku system were indexed, integrated, and scaled using HKL3000. Structures were solved using molecular replacement with PHASER. Model building and refinement were performed using Coot and Phenix. Ligands were designed in Maestro and the output sdf files were used in the Phenix program eLBOW to generate cif files containing atomic positions and constraints necessary for ligand refinement. Iterative rounds of crystallographic refinement were carried out until convergence was achieved. To limit bias throughout the refinement process, five percent of the data were reserved for the free R-value calculation. MolProbity was applied to evaluate the final structures before deposition in the PDB. Structure analysis, superposition and figure generation was done using PyMOL. The cocrystal structures of all compounds were solved in the $P2_12_12_1$ space group with one protease homodimer in the asymmetric unit and only one orientation of the bound inhibitor in the active site, which was crucial for direct comparison of inhibitor structures.

HTLV Data Collection and Structure Solution: The three HTLV-1 protease cocrystals were shot at the Chicago APS Synchrotron Beamline 23-ID-D using beamline control software JBluIce. The diffraction images were indexed, integrated, and scaled using the GM/CA autoprocessing pipeline which utilizes XDS, POINTLESS, and AIMLESS. X-rays diffracted through a cocrystal of example 7 bound to HIV-1 protease were collected by our in-house Rigaku Saturn944 system and intensities were indexed, integrated, and scaled using HKL3000.

Structures were solved by molecular replacement in the program PHASER using an HTLV-1 protease monomer (PDB: 3WSJ) or a WT HIV-1 protease monomer (PDB: 6DGX). Model building and refinement was performed using Coot and Phenix. Ligands were designed in Maestro and the output sdf file was used in the Phenix program eLBOW to generate the cif file containing atomic positions and constraints necessary for ligand refinement. Iterative rounds of crystallographic refinement were carried out until convergence was achieved. To limit bias throughout the refinement process, five percent of the data were reserved for the free R-value calculation. MolProbity was applied to evaluate the final structures before deposition in the PDB. Structure analysis, superposition and figure generation was done using PyMOL.

Intermolecular VdW Contact Analysis of Crystal Structures. To calculate the intermolecular VdW interaction energies the crystal structures were prepared using the Schrodinger Protein Preparation Wizard. Hydrogen atoms were added, protonation states were determined, and the structures were minimized. The HIV protease active site was monoprotonated at Asp25. Subsequently, force field parameters were assigned using the OPLS3 force field. Interaction energies between the inhibitor and protease were estimated using a simplified Lennard-Jones potential, as previously described in detail. Briefly, the VdW energy was calculated for pairwise interactions depending on the types of atoms interacting and the distance between them. For each protease residue, the change in VdW interactions relative to a reference complex in the same space group was also calculated for each variant structure.

HTLV Molecular Dynamics Simulations: High resolution HTLV-1 cocrystal structures with DRV, UM6, and example 7 (PDB: 6W6Q, 6W6R, 6W6S) were used as starting coordinates for molecular dynamics simulations. All starting structures were prepared using the Protein Preparation Wizard from Schrodinger. Crystallographic water molecules were retained, missing atoms were added using Prime, and PROPKA was used to determine the protonation state of side chains at pH 7.0. The resulting structure was minimized under restraint to a convergence criterion of 0.3 Å using Impref.

All molecular dynamics simulations were carried out using Desmond, within Schrodinger, with the OPLS3e force field for the inhibitor and protein. The systems were prepared as previously discussed. Briefly, the cocrystal structures were placed within a cubic TIP3P water box measuring 15 Å on each side. Chloride ions were first used to neutralize the system and sodium and chloride atoms were added to reach a physiological 0.15 M salt concentration. Prior to simulation, each solvated system was relaxed using a series of restrained minimization stages as previously described. These stages consisted of successive minimizations with restraints on i) the heavy protein atoms, ii-iii) the protein backbone atoms and finally iv) no restraints. The restraining force constants were 1000, 1000 and 5 kcal mol$^{-1}$ Å$^{-2}$ for stages i), ii) and iii), respectively and the minimization was done using steepest descent followed with the limited-memory BFGS method to a tolerance of 0.5 kcal mol$^{-1}$. During unrestrained minimization, this tolerance was further reduced to 0.05 kcal mol$^{-1}$ Å$^{-1}$. Molecular dynamics for each system was carried out in triplicate, with each of the three 100 ns simulations starting with different randomized velocities.

HTLV-1 Immature Gag Viruslike Particle Production and Purification. Hek293T cells were grown to ~70% confluency and maintained in DMEM supplemented with 10% HyClone FetalClone III (FC3) (GE Healthcare Life Sciences, USA) and penicillin/streptomycin (Invitrogen, USA) at 37° C. and 5% $CO_2$. Cells were then transfected with a human codon optimized pN3 HTLV-1 Gag and a HTLV-1 envelope (Env) expression construct at a 10:1 molar ratio (4 µg total DNA) by using GenJet Plus (SignaGen Laboratories, USA) to generate immature HTLV-1 particles.45,46 Cell culture supernatants were collected 48 h post-transfection, and cellular debris was cleared by low speed centrifugation (3000×g) for 5 min at 20° C. and then passed through a 0.22 µtm filter. To purify the particles, cell culture supernatants were subjected to ultracentrifugation over an 8% Optiprep cushion (Millipore Sigma, USA) (109,000 g for 1.5 hat 4° C.) in a 50.1 Ti rotor (Beckman Coulter, USA), and virus particle pellets were resuspended in STE buffer (100 mM NaCl, 50 mM Tris-HCl pH 7.4, 1 mM ethylenediaminetetraacetic acid (EDTA)). Particles were then layered over a 10-30% Optiprep step gradient (10% steps) and subjected to ultracentrifugation for 3 h at 250,000×g in a SW55 Ti rotor (Beckman Coulter, USA) at 4° C. Virus particles were removed from the gradient between the 20 and 30% Optiprep layers by using a hypodermic syringe. The isolated fraction was diluted to a final volume of 5 mL in STE buffer and pelleted by ultracentrifugation (195,000×g) for 1 h at 4° C. Pellets were resuspended in 50 μL of STE buffer and stored at −80° C.

In Vitro Immature Virus Particle Protease Inhibition Reactions. Purified immature HTLV-1 particles were dialyzed into protease cleavage buffer (CB) composed of 100 mM NaCl, 50 mM sodium acetate pH 5.3, 2 mM DTT, and 1% glycerol. To solubilize the virus particle membrane, Triton X-100 was added to a final concentration of 1% (v/v) 20 min prior to the HTLV-1 protease cleavage reaction. Protein concentration of the solubilized particles was determined by using a BCA assay (Thermo Fisher Scientific, USA). Time course analysis cleavage reaction of HTLV-1 protease with immature HTLV-1 particles was done over 60 min in the presence of 1 μM protease at 37° C. For each time point, 20 μg of HTLV-1 Gag was removed, and the reaction was quenched by addition of 4×SDS-PAGE loading buffer and heat denatured at 100° C. for 10 min. Each sample was analyzed by using SDS-PAGE and immunoblot analysis. Analysis of protease inhibitors was conducted using the same experimental strategy at the indicated concentration of inhibitor being added to the virus particle cleavage reaction prior to the addition of protease, and samples were quenched after a 60 min cleavage reaction. The control cleavage reaction was treated with the highest concentration of DMSO (0.01% v/v) as used for the sample with the highest inhibitor concentrations. Samples were run on Trisglycine SDS gels with a 4-20% acrylamide gradient (Bio-Rad, USA). The primary antibody for immunoblot was a monoclonal mouse anti HTLV-1 p24 (Santa Cruz Biotechnology, USA; P/N: sc-53891) at a 1:2,000 dilution in 2.5% (w/v) nonfat milk powder diluted in trisbuffered saline with Tween 20 (TBST). Secondary antibody goat antimouse IgG StarBright Blue 700 (Bio-Rad, USA; P/N: 12004158) at a 1:1,000 dilution in 2.5% (w/v) nonfat milk powder diluted in TBST was used for detection using a ChemiDoc imager (Bio-Rad, USA).

SP Cell Culture and Protease Inhibition Treatments. SP cells were cultured in RPMI (Invitrogen, Carlsbad, Calif., USA) containing 20% HyClone (FC3) from Thermo Scientific (Waltham, Mass.) and 1% penicillin-streptomycin from Life Technologies (Grand Island, N.Y., USA) and supplemented with human IL-2 (Roche Diagnostics, Indianapolis, Ind., USA) at a concentration of 10 U/mL. Cells were grown to a density of ~5.05 cells/mL, and the media was exchanged into media containing the drug treatment at the two concentrations tested (50 μM and 100 μM). DMSO was used as a treatment control at the max concentration (0.01% v/v) as used for the sample with the highest inhibitor concentrations. Cells were treated for 48 h in an incubator at 37° C. with 5% $CO_2$. To harvest the samples, the cell culture supernatant and cells were separated with a 5 min spin at 1000 g. The cell culture supernatant was filtered through a 0.22 μm syringe filter and ultracentrifuged over an 8% Optiprep cushion (Millipore Sigma, USA) (109,000 g for 1.5 h at 4° C.) in a 50.1 Ti rotor (Beckman Coulter, USA). The resulting viral pellet was resuspended in 200 μL of RIPA buffer (150 mM NaCl, 1% (v/v) Nonidet P-40, 0.5% sodium deoxycholate, 0.1% SDS, 25 mM Tris pH 7.4) supplemented with a cOmplete, Mini, EDTA-free cellular Protease Inhibitor Cocktail (Roche Diagnostics, Indianapolis, Ind., USA). The SP cell pellet was washed once with phosphate buffered saline (PBS) and resuspended in a final volume of 200 μL of a RIPA buffer cOmplete, Mini, EDTA-free cellular Protease Inhibitor Cocktail (Roche Diagnostics, Indianapolis, Ind., USA). Immunoblot samples were then prepared and detected as described in the previous method section. Gel band quantification analysis was performed using Fiji. A one-tailed t test for two independent means (95% confidence) was used to determine if the FL Gag band from the various drug treatments in the immunoblot analysis was statistically different from the DMSO controls.

Intermediate 1—Synthesis of (diethoxyphosphoryl) methyl trifluoromethanesulfonate

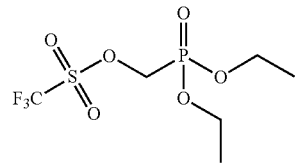 [SMILES: CCOP(=O)(COS(=O)(=O)C(F)(F)F)OCC]

Freshly distilled dichloromethane (25 mL) was cooled to −50° C. and diethyl(hydroxyethyl)phosphonate (2.28 g, 13.56 mmol) and extra dry 2,6-lutidine (1.74 g, 16.27 mmol) was added. Triflic anhydride (4.40 g, 15.60 mmol) was added slowly. When the addition was complete, the mixture was allowed to warm up to 0° C. over 2 h and the reaction was stirred at 0° C. for 1 h. The reaction was quenched with cold diethyl ether (150 mL) and stirred for 30 minutes at 0° C. The lutidium triflate precipitate was filtered off by gravity filtration and the filtrate was washed consecutively with water (50 mL), HCl (1M, 50 mL) and brine (50 mL), and dried over magnesium sulfate. The magnesium sulfate was filtered off and the filtrate was concentrated under reduced pressure to give the desired compound (3.19 g, 78%) as a yellow oil at 80% purity. The product was used in the next step without further purification. $^1$H NMR (500 MHz, $CDCl_3$) δ 4.58 (d, J=9.0 Hz, 2H), 4.25-4.18 (m, 4H), 1.35 (t, J=7.5 Hz, 6H) ppm; $^{31}$P NMR (202 MHz, $CDCl_3$) δ 12.17 ppm; $^{19}$F NMR (470 MHz, $CDCl_3$) −74.06 ppm.

Example 1

Synthesis of Compound (3R,3aS,6aR)-hexahydrofuro [2,3-b]furan-3-yl ((2S,3R)-1-(4-((diethoxyphosphoryl)methoxy)phenyl)-3-hydroxy-4-(N—((S)-2-methylbutyl)benzo [d][1,3]dioxole-5-sulfonamido) butan-2-yl)carbamate

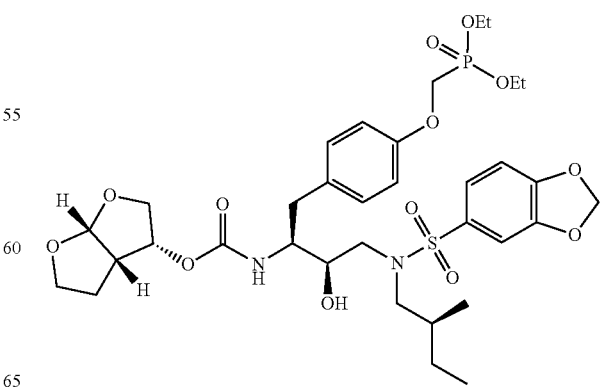

Step 1—Synthesis of tert-butyl ((2S,3R)-1-(4-(benzyloxy)phenyl)-3-hydroxy-4-(((S)-2-methylbutyl)amino)butan-2-yl)carbamate

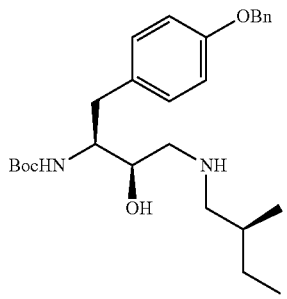 [SMILES: CC[C@H](C)CNC[C@@H](O)[C@H](Cc1ccc(OCc2ccccc2)cc1)NC(=O)OC(C)(C)C]

To a solution of tert-butyl ((S)-2-(4-(benzyloxy)phenyl)-1-((S)-oxiran-2-yl)ethyl)carbamate (0.347 g, 0.940 mmol) in isopropanol (20 mL) was added (S)-2-methylbutan-1-amine (0.098 g, 1.128 mmol). The reaction was stirred at 80° C. for 3 h and the reaction mixture was cooled to room temperature and concentrated under reduced pressure. The residue was recrystallized in EtOAc/hexanes to give the desired compound (0.29 g, 71%) as a white solid. $^1$H NMR (400 MHz, CDCl$_3$) δ 7.44-7.42 (m, 2H), 7.39-7.36 (m, 2H), 7.33-7.30 (m, 1H), 7.15 (d, J=8.5 Hz, 2H), 6.91 (d, J=8.5 Hz, 2H), 5.03 (s, 2H), 4.78 (d, J=9.0 Hz, 1H), 3.82-3.71 (m, 1H), 3.46 (q, J=6.5 Hz, 1H), 2.90 (dd, J=14.5, 5.0 Hz, 1H), 2.82 (dd, J=14.0, 7.5 Hz, 1H), 2.68 (d, J=5.0 Hz, 2H), 2.51 (dd, J=11.5, 6.0 Hz, 1H), 2.39 (dd, J=11.5, 7.5 Hz, 1H), 1.51-1.34 (m, 2H), 1.37 (s, 9H, overlapping), 1.19-1.09 (m, 1H), 0.91-0.87 (m, 6H) ppm; $^{13}$C NMR (125 MHz, CDCl$_3$) δ 157.67, 156.58, 137.23, 130.71, 130.23, 128.70, 128.06, 127.58, 115.04, 80.08, 70.23, 70.16, 55.63, 53.88, 52.07, 35.77, 33.84, 28.41, 17.52, 11.19 ppm; HRMS (ESI) m/z: [M+H]$^+$ calcd for C$_{27}$H$_{41}$N$_2$O$_4$, 457.3061.

Step 2—Synthesis of tert-butyl ((2S,3R)-1-(4-(benzyloxy)phenyl)-3-hydroxy-4-(N—((S)-2-methylbutyl)benzo[d][1,3]dioxole-5-sulfonamido)butan-2-yl)carbamate

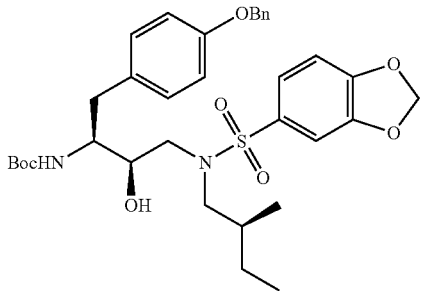 [SMILES: CC[C@H](C)CN(C[C@@H](O)[C@H](Cc1ccc(OCc2ccccc2)cc1)NC(=O)OC(C)(C)C)S(=O)(=O)c1ccc2c(c1)OCO2]

The same procedure was used as described for compound Example 3 (step 1). Amino alcohol obtained in the previous step (1.24 g, 2.71 mmol) was treated with sodium carbonate (0.57 g, 5.41 mmol) and benzo[d][1,3]dioxole-5-sulfonyl chloride (0.72 g, 3.25 mmol) to give the target compound (1.24 g, 72%) as a white solid. $^1$H NMR (500 MHz, CDCl$_3$) δ 7.44-7.41 (m, 2H), 7.40-7.36 (m, 2H), 7.34-7.30 (m, 2H), 7.19-7.14 (m, 3H), 6.92 (d, J=8.5 Hz, 2H), 6.88 (d, J=8.5 Hz, 1H), 6.06 (s, 2H), 5.04 (s, 2H), 4.63 (d, J=7.5 Hz, 1H), 3.84 (s, 1H), 3.79-3.68 (m, 2H), 3.11-2.97 (m, 3H), 2.95-2.85 (m, 2H), 2.80 (dd, J=13.0, 7.5 Hz, 1H), 1.64-1.56 (m, 1H), 1.53-1.44 (m, 1H), 1.36 (s, 9H), 1.12-1.01 (m, 1H), 0.88-0.82 (m, 6H) ppm; $^{13}$C NMR (125 MHz, CDCl$_3$) δ 157.63, 156.15, 151.54, 148.38, 137.20, 131.69, 130.66, 130.04, 128.67, 128.04, 127.54, 123.20, 114.99, 108.43, 107.68, 102.42, 79.80, 72.73, 70.11, 57.37, 54.75, 53.76, 34.69, 33.45, 28.39, 26.55, 17.01, 11.16 ppm; HRMS (ESI) m/z: [M+H]$^+$ calcd for C$_{34}$H$_{45}$N$_2$O$_8$S, 641.2891; found 641.2877.

Step 3—Synthesis of (3R,3aS,6aR)-hexahydrofuro[2,3-b]furan-3-yl ((2S, 3R)-1-(4-(benzyloxy)phenyl)-3-hydroxy-4-(N—((S)-2-methylbutyl)benzo[d][1,3]dioxole-5-sulfonamido)butan-2-yl)carbamate

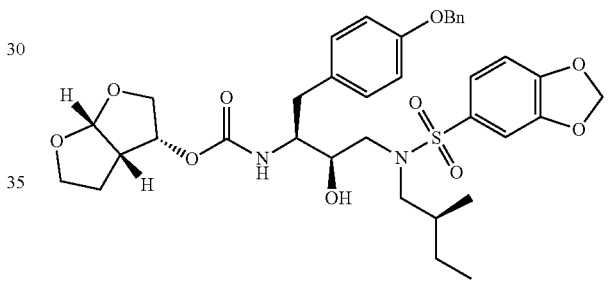

The same procedure was used as described for compound Example 3 (step 2). Compound obtained in the previous step (1.24 g, 1.94 mmol) was treated with trifluoroacetic acid (8 mL), and the resulting deprotected amine was treated with diisopropylethylamine (0.75 g, 5.81 mmol) and bis-THF activated carbonate (0.58 g, 2.13 mmol) to give the desired compound (0.95 g, 70%) as a white solid. $^1$H NMR (500 MHz, CDCl$_3$) δ 7.43-7.36 (m, 4H), 7.35-7.30 (m, 2H), 7.17 (d, J=1.5 Hz, 1H), 7.13 (d, J=8.5 Hz, 2H), 6.92-6.88 (m, 3H), 6.07 (s, 2H), 5.66 (d, J=5.0 Hz, 1H), 5.06-5.00 (m, 1H), 5.03 (s, 2H, overlapping), 4.89 (d, J=9.0 Hz, 1H), 3.97 (dd, J=9.5, 6.5 Hz, 1H), 3.88-3.79 (m, 3H), 3.75-3.68 (m, 2H), 3.55 (br s, 1H), 3.11 (dd, J=15.0, 8.5 Hz, 1H), 3.06-2.88 (m, 4H), 2.82-2.74 (m, 2H), 1.71-1.46 (m, 4H),), 1.14-1.04 (m, 1H), 0.89-0.84 (m, 6H) ppm; $^{13}$C NMR (125 MHz, CDCl$_3$) δ 157.76, 155.63, 151.71, 148.49, 137.07, 131.38, 130.51, 129.78, 128.75, 128.15, 127.55, 123.29, 115.06, 109.42, 108.54, 107.67, 102.53, 73.59, 72.84, 70.89, 70.14, 69.73, 57.61, 55.27, 53.93, 45.47, 34.93, 33.61, 26.54, 25.95, 17.07, 11.18 ppm; HRMS (ESI) m/z: [M+H]$^+$ calcd for C$_{36}$H$_{45}$N$_2$O$_{10}$S, 697.2790; found 697.2786.

Step 4—Synthesis of (3R,3aS,6aR)-hexahydrofuro[2,3-b]furan-3-yl ((2S,3R)-3-hydroxy-1-(4-hydroxyphenyl)-4-(N—((S)-2-methylbutyl)benzo[d][1,3]dioxole-5-sulfonamido)butan-2-yl)carbamate

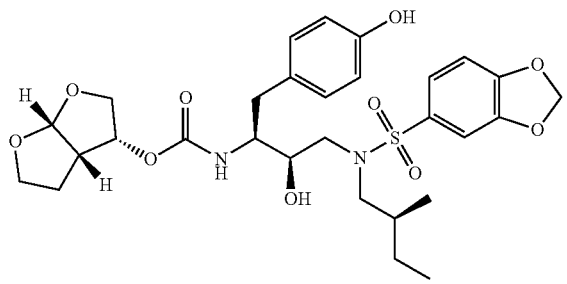 [SMILES: CC[C@H](C)CN(C[C@@H](O)[C@H](Cc1ccc(O)cc1)NC(=O)O[C@H]1CO[C@H]2OCC[C@H]21)S(=O)(=O)c1ccc2c(c1)OCO2]

The compound obtained in the previous step (0.92 g, 1.32 mmol) was treated with 10% palladium on activated charcoal (0.09 g) to give the target compound (0.69 g, 86%) as a white solid. $^1$H NMR (500 MHz, CDCl$_3$) δ 7.33 (dd, J=8.5, 2.0 Hz, 1H), 7.17 (d, J=1.5 Hz, 1H), 7.09 (d, J=8.0 Hz, 2H), 6.90 (d, J=8.0 Hz, 1H), 6.75 (d, J=8.5 Hz, 2H), 6.09 (s, 2H), 5.66 (d, J=5.0 Hz, 1H), 5.04 (q, J=6.0 Hz, 1H), 4.91 (d, J=8.5 Hz, 1H), 4.85 (br s, 1H), 3.98 (dd, J=9.5, 6.5 Hz, 1H), 3.89 (td, J=8.0, 2.5 Hz, 1H), 3.86-3.79 (m, 2H), 3.76-3.69 (m, 2H), 3.55 (br s, 1H), 3.10 (dd, J=15.5, 9.0 Hz, 1H), 3.06-2.90 (m, 4H), 2.81-2.73 (m, 2H), 1.76-1.66 (m, 1H), 1.64-1.46 (m, 3H), 1.14-1.04 (m, 1H), 0.90-0.83 (m, 6H) ppm; $^{13}$C NMR (125 MHz, CDCl$_3$) δ 155.69, 154.57, 151.74, 148.50, 131.36, 130.69, 129.60, 123.31, 115.61, 109.44, 108.58, 107.71, 102.55, 73.68, 72.88, 70.94, 69.75, 57.66, 55.32, 53.95, 45.50, 34.90, 33.64, 26.55, 25.98, 17.08, 11.18 ppm; HRMS (ESI) m/z: [M+H]$^+$ calcd for C$_{29}$H$_{39}$N$_2$O$_{10}$S, 607.2320; found 607.2319.

Step 5—Synthesis of the Title Compound

To a solution of phenol obtained in the previous step (0.69 g, 1.14 mmol) in anhydrous acetonitrile (20 mL) at 0° C. was added phosphoryl triflate intermediate 1 (0.44 g, 1.48 mmol). Cesium carbonate (0.56 g, 1.71 mmol) was added portion-wise (4 portions over 20 mins) and the reaction was stirred for another 40 minutes at 0° C. The reaction was allowed to warm up to room temperature and stirred for another hour. The reaction mixture was concentrated under low pressure and the residue was taken up in ethyl acetate (50 mL) and brine (50 mL). The phases were separated and the organic layer was dried over sodium sulfate, concentrated. The residue was purified by automated flash chromatography using a silica gel column (RediSep Gold, 24 g, gradient elution with 0-10% MeOH/DCM), to give compound the title compound (0.84 g, 98%) as a white solid. $^1$H NMR (500 MHz, CDCl$_3$) δ 7.32 (dd, J=8.0, 1.5 Hz, 1H), 7.18-7.13 (m, 3H), 6.91-6.86 (m, 3H), 6.09 (s, 2H), 5.66 (d, J=5.0 Hz, 1H), 5.04 (q, J=6.5 Hz, 1H), 4.91 (d, J=8.5 Hz, 1H), 4.27-4.20 (m, 6H), 3.98 (dd, J=9.5, 6.5 Hz, 1H), 3.88 (td, J=8.5, 2.5 Hz, 1H), 3.86-3.78 (m, 2H), 3.76-3.68 (m, 2H), 3.57 (br s, 1H), 3.10 (dd, J=15.0, 8.5 Hz, 1H), 3.05-2.90 (m, 4H), 2.83-2.75 (m, 2H), 1.75-1.65 (m, 1H), 1.64-1.56 (m, 2H), 1.54-1.45 (m, 1H), 1.37 (t, J=7.0 Hz, 6H), 1.14-1.04 (m, 1H), 0.90-0.83 (m, 6H) ppm; $^{13}$C NMR (125 MHz, CDCl$_3$) δ 157.77, 157.65, 155.61, 151.75, 148.52, 131.35, 130.88, 130.61, 123.30, 114.78, 109.41, 108.56, 107.66, 102.57, 73.64, 72.82, 70.90, 69.69, 63.12, 63.07, 63.02, 61.76, 57.64, 55.23, 53.96, 45.44, 34.86, 33.64, 26.55, 25.98, 17.08, 16.65, 16.61, 11.19 ppm; $^{31}$P NMR (202 MHz, CDCl$_3$) δ 19.23 ppm; HRMS (ESI) m/z: [M+H]$^+$ calcd for C$_{34}$H$_{50}$N$_2$O$_{13}$PS, 757.2766; found 757.2778.

Example 2

Synthesis of Compound (3R,3aS,6aR)-hexahydrofuro[2,3-b]furan-3-yl ((2S,3R)-1-(4-((diethoxyphosphoryl)methoxy)phenyl)-3-hydroxy-4-((N-isobutyl-4-methoxyphenyl)sulfonamido)butan-2-yl)carbamate

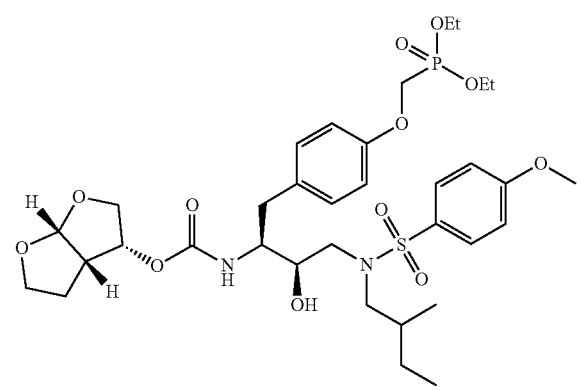 [SMILES: CCOP(=O)(COc1ccc(C[C@H](NC(=O)O[C@H]2CO[C@H]3OCC[C@H]32)[C@H](O)CN(CC(C)CC)S(=O)(=O)c2ccc(OC)cc2)cc1)OCC]

Step 1—Synthesis of Compound tert-butyl ((2S, 3R)-1-(4-(benzyloxy)phenyl)-3-hydroxy-4-(isobutylamino)butan-2-yl)carbamate

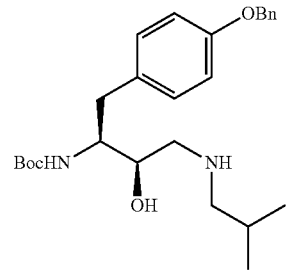 [SMILES: CC(C)CNC[C@@H](O)[C@H](Cc1ccc(OCc2ccccc2)cc1)NC(=O)OC(C)(C)C]

The same procedure was used as described for compound of Example 1 (step 1). A solution of tert-butyl ((S)-2-(4-(benzyloxy)phenyl)-1-((S)-oxiran-2-yl)ethyl)carbamate (1.00 g, 2.70 mmol) was treated with isobutyl amine (0.59 g, 8.10 mmol) to give the title compound (1.18 g, 98%) as a solid. $^1$H NMR (500 MHz, CDCl$_3$) δ 7.44-7.41 (m, 2H), 7.40-7.36 (m, 2H), 7.34-7.30 (m, 1H), 7.15 (d, J=8.5 Hz, 2H), 6.92-6.89 (m, 2H), 5.04 (s, 2H), 4.68 (d, J=9.0 Hz, 1H), 3.82-3.70 (m, 1H), 3.44 (q, J=6.0 Hz, 1H), 2.91 (dd, J=14.0, 4.5 Hz, 1H), 2.82 (dd, J=13.5, 7.5 Hz, 1H), 2.67 (d, J=4.5 Hz, 2H), 2.40 (d, J=7.0 Hz, 2H), 1.71 (p, J=7.0 Hz, 1H), 1.37 (s, 9H), 0.92 (d, J=3.0 Hz, 3H), 0.90 (d, J=3.0 Hz, 3H) ppm; $^{13}$C NMR (125 MHz, CDCl$_3$) δ 157.58, 156.07, 137.29, 130.67, 130.29, 128.71, 128.05, 127.59, 114.94, 79.45, 70.68, 70.17, 58.12, 54.33, 51.53, 35.91, 28.57, 28.46, 20.70, 20.66 ppm; HRMS (ESI) m/z: [M+H]$^+$ calcd for C$_{26}$H$_{39}$N$_2$O$_4$, 443.2905.

Step 2—Synthesis of Compound tert-butyl ((2S, 3R)-1-(4-(benzyloxy)phenyl)-3-hydroxy-4-((N-isobutyl-4-methoxyphenyl)sulfonamido)butan-2-yl) carbamate

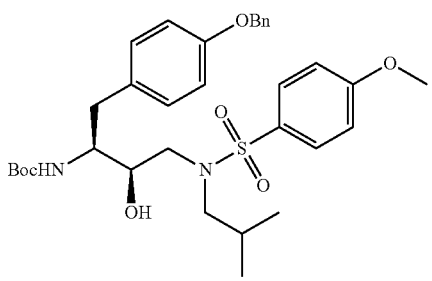 [SMILES: COc1ccc(S(=O)(=O)N(CC(C)C)C[C@@H](O)[C@H](Cc2ccc(OCc3ccccc3)cc2)NC(=O)OC(C)(C)C)cc1]

The same procedure was used as described for compound of Example 3 (step 1). The amino alcohol obtained in the previous step (1.20 g, 2.71 mmol) was treated with sodium carbonate (0.57 g, 5.41 mmol) and 4-methoxybenzenesulfonyl chloride (0.67 g, 3.25 mmol) to give the desired compound (1.50 g, 90%) as a white solid. $^1$H NMR (500 MHz, CDCl$_3$) δ 7.70 (d, J=8.5 Hz, 2H), 7.45-7.41 (m, 2H), 7.40-7.36 (m, 2H), 7.34-7.31 (m, 1H), 7.16 (d, J=8.5 Hz, 2H), 6.97 (d, J=9.0 Hz, 2H), 6.92 (d, J=8.5 Hz, 2H), 5.04 (s, 2H), 4.63 (d, J=7.0 Hz, 1H), 3.90 (s, 1H), 3.85 (s, 3H), 3.82-3.75 (m, 1H), 3.74-3.67 (m, 1H), 3.08 (dd, J=15.5, 8.5 Hz, 1H), 3.04-2.98 (m, 1H), 2.97-2.84 (m, 3H), 2.79 (dd, J=13.0, 6.5 Hz, 1H), 1.84 (sept, J=6.5 Hz, 1H), 1.35 (s, 9H), 0.99 (d, J=6.5 Hz, 3H), 0.86 (d, J=6.5 Hz, 3H) ppm; $^{13}$C NMR (125 MHz, CDCl$_3$) δ 163.13, 157.65, 137.23, 130.72, 130.19, 130.13, 129.62, 128.72, 128.09, 127.60, 115.03, 114.44, 79.81, 72.86, 70.18, 58.81, 55.74, 54.82, 53.92, 34.68, 28.43, 27.34, 20.29, 20.03 ppm; HRMS (ESI) m/z: [M+H]$^+$ calcd for C$_{33}$H$_{45}$N$_2$O$_7$S, 613.2942; found 613.2931.

Step 3—Synthesis of Compound (3R,3aS,6aR)-hexahydrofuro[2,3-b]furan-3-yl ((2S,3R)-1-(4-(benzyloxy)phenyl)-3-hydroxy-4-((N-isobutyl-4-methoxyphenyl)sulfonamido)butan-2-yl)carbamate

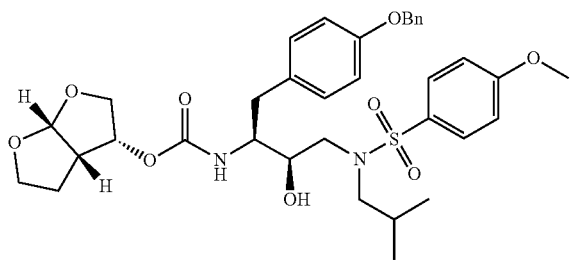 [SMILES: COc1ccc(S(=O)(=O)N(CC(C)C)C[C@@H](O)[C@H](Cc2ccc(OCc3ccccc3)cc2)NC(=O)O[C@H]2CO[C@H]3OCC[C@H]32)cc1]

The same procedure was used as described for compound Example 3 (step 2). Compound obtained in the previous step (1.50 g, 2.45 mmol) was treated with trifluoroacetic acid (8 mL), and the resulting deprotected amine was treated with diisopropylethylamine (0.95 g, 7.34 mmol) and bis-THF activated carbonate (0.73 g, 2.69 mmol) to give the desired compound (1.30 g, 77%) as a white solid. $^1$H NMR (500 MHz, CDCl$_3$) δ 7.70 (d, J=9.0 Hz, 2H), 7.43-7.36 (m, 4H), 7.35-7.30 (m, 1H), 7.13 (d, J=8.5 Hz, 2H), 6.98 (d, J=9.0 Hz, 2H), 6.90 (d, J=8.5 Hz, 2H), 5.65 (d, J=5.0 Hz, 1H), 5.05-5.00 (m, 1H), 5.03 (s, 2H, overlapping), 4.92 (d, J=8.5 Hz, 1H), 3.96 (dd, J=9.5, 6.5 Hz, 1H), 3.87-3.80 (m, 3H), 3.86 (s, 3H, overlapping), 3.74-3.67 (m, 2H), 3.66 (br s, 1H), 3.14 (dd, J=15.0, 8.5 Hz, 1H), 3.03-2.93 (m, 3H), 2.92-2.87 (m, 1H), 2.82-2.73 (m, 2H), 1.83 (sept, J=7.0 Hz, 1H), 1.69-1.59 (m, 1H), 1.56-1.50 (m, 1H), 0.92 (d, J=6.5 Hz, 3H), 0.88 (d, J=6.5 Hz, 3H) ppm; $^{13}$C NMR (125 MHz, CDCl$_3$) δ 163.25, 157.72, 155.62, 137.06, 130.50, 129.90, 129.82, 129.62, 128.74, 128.15, 127.55, 115.04, 114.52, 109.43, 73.56, 72.89, 70.93, 70.14, 69.74, 58.98, 55.77, 55.31, 53.92, 45.48, 34.88, 27.43, 25.96, 20.30, 20.02 ppm; HRMS (ESI) m/z: [M+H]$^+$ calcd for C$_{35}$H$_{45}$N$_2$O$_9$S, 669.2841; found 669.2837.

Step 4—Synthesis of Compound (3R,3aS,6aR)-hexahydrofuro[2,3-b]furan-3-yl ((2S,3R)-3-hydroxy-1-(4-hydroxyphenyl)-4-((N-isobutyl-4-methoxyphenyl)sulfonamido)butan-2-yl)carbamate

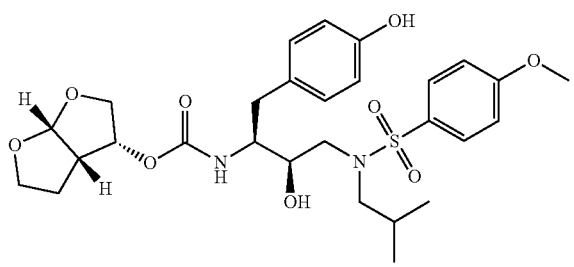 [SMILES: COc1ccc(S(=O)(=O)N(CC(C)C)C[C@@H](O)[C@H](Cc2ccc(O)cc2)NC(=O)O[C@H]2CO[C@H]3OCC[C@H]32)cc1]

The same procedure was used as described for compound of Example 3 (step 3). Compound obtained in the previous step (1.20 g, 1.79 mmol) was treated with 10% palladium on activated charcoal (0.12 g) to give the desired compound (0.83 g, 80%) as a white solid. $^1$H NMR (500 MHz, CDCl$_3$) δ 7.70 (d, J=8.5, 2H), 7.06 (d, J=8.5 Hz, 2H), 6.99 (d, J=9.0 Hz, 2H), 6.73 (d, J=8.5 Hz, 2H), 5.67 (br s, 1H), 5.65 (d, J=5.5 Hz, 1H, overlapping), 5.06 (d, J=9.0 Hz, 1H), 5.03 (q, J=6.0 Hz, 1H, overlapping), 3.95 (dd, J=9.5, 6.0 Hz, 1H), 3.90-3.79 (m, 3H), 3.87 (s, 3H, overlapping), 3.75-3.67 (m, 3H), 3.14 (dd, J=15.0, 8.5 Hz, 1H), 3.03-2.88 (m, 4H), 2.80 (dd, J=13.0, 6.5 Hz, 1H), 2.73 (dd, J=14.0, 9.0 Hz, 1H), 1.83 (sept, J=7.0 Hz, 1H), 1.73-1.63 (m, 1H), 1.55-1.48 (m, 1H), 0.92 (d, J=6.5 Hz, 3H), 0.88 (d, J=6.5 Hz, 3H) ppm; $^{13}$C NMR (125 MHz, CDCl$_3$) δ 163.28, 155.79, 154.80, 130.63, 129.77, 129.63, 129.44, 115.57, 114.56, 109.48, 73.70, 72.92, 71.07, 69.78, 58.96, 55.80, 55.46, 53.84, 45.59, 34.81, 27.42, 26.01, 20.29, 20.04 ppm; HRMS (ESI) m/z: [M+H]$^+$ calcd for C$_{28}$H$_{39}$N$_2$O$_9$S, 579.2371; found 579.2369.

Step 5—Synthesis of the Title Compound

The same procedure was used as described for the compound of Example 1 (step 5). Phenol obtained in the previous step (0.83 g, 1.14 mmol) was treated with cesium carbonate (0.70 g, 2.16 mmol) and phosphoryl triflate intermediate 1 (0.56 g, 1.87 mmol) to give the target compound (0.86 g, 100%) as a white solid. $^1$H NMR (500 MHz, CDCl$_3$) δ 7.70 (d, J=9.0 Hz, 2H), 7.14 (d, J=8.5 Hz, 2H), 6.98 (d, J=8.5 Hz, 2H), 6.87 (d, J=8.5 Hz, 2H), 5.64 (d, J=5.0 Hz, 1H), 5.01 (q, J=6.5 Hz, 1H), 4.97 (d, J=8.5 Hz, 1H, overlapping), 4.26-4.19 (m, 6H), 3.95 (dd, J=9.5, 6.5 Hz, 1H), 3.89-3.79 (m, 3H), 3.87 (s, 3H, overlapping), 3.74-3.67 (m, 3H), 3.13 (dd, J=15.0, 8.0 Hz, 1H), 3.03-2.88 (m, 4H), 2.83-2.74 (m, 2H), 1.82 (sept, J=7.0 Hz, 1H), 1.70-1.62 (m, 1H), 1.58-1.52 (m, 1H), 1.36 (t, J=7.0 Hz, 6H), 0.91 (d, J=6.5 Hz, 3H), 0.87 (d, J=6.6 Hz, 3H) ppm; $^{13}$C NMR (125 MHz, CDCl$_3$) δ 163.26, 157.70, 157.58, 155.60, 131.00, 130.59, 129.81, 129.61, 114.72, 114.52, 109.41, 73.58, 72.84, 70.95, 69.68, 63.11, 63.06, 63.01, 61.75, 58.95, 55.79, 55.27, 53.86, 45.45, 34.79, 27.41, 25.97, 20.28, 20.03, 16.63, 16.58 ppm; $^{31}$P NMR (202 MHz, CDCl$_3$) δ 19.22 ppm; HRMS (ESI) m/z: [M+H]$^+$ calcd for C$_{33}$H$_{50}$N$_2$O$_{12}$PS, 729.2817; found 729.2829.

Example 3

Synthesis of Compound (3R,3aS,6aR)-hexahydrofuro [2,3-b]furan-3-yl ((2S,3R)-1-(4-((diethoxyphosphoryl)methoxy)phenyl)-3-hydroxy-4-((4-methoxy-N—((S)-2-methylbutyl)phenyl)sulfonamido)butan-2-yl)carbamate

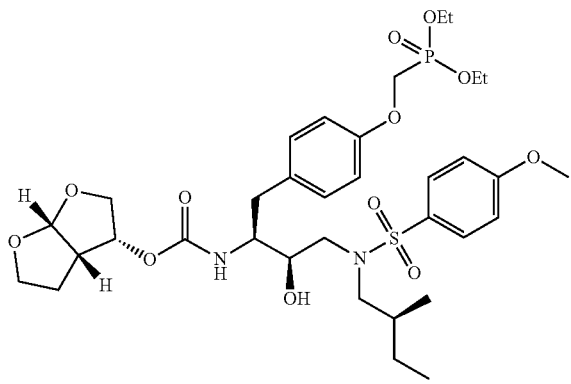 [SMILES: CCOP(=O)(COc1ccc(C[C@H](NC(=O)O[C@H]2CO[C@H]3OCC[C@H]32)[C@H](O)CN(C[C@@H](C)CC)S(=O)(=O)c2ccc(OC)cc2)cc1)OCC]

Step 1—tert-butyl ((2S,3R)-1-(4-(benzyloxy)phenyl)-3-hydroxy-4-((4-methoxy-N—((S)-2-methylbutyl)phenyl)sulfonamido)butan-2-yl)carbamate

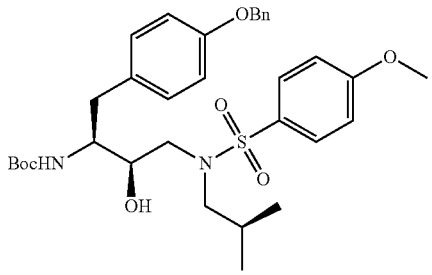

A solution of compound obtained in Example 1 (step 1) (0.30 g, 0.68 mmol) in ethyl acetate (10 mL) was treated with a solution of sodium carbonate (0.14 g, 1.31 mmol) in water (10 mL) followed by 4-methoxybenzenesulfonyl chloride (0.14 g, 0.66 mmol). The biphasic reaction mixture was stirred at room temperature overnight. The layers were separated and aqueous layer was extracted with ethyl acetate (2×25 mL). The organic portions were washed with saturated aqueous NaCl solution (25 mL), dried (Na$_2$SO$_4$), filtered, and concentrated under reduced pressure. The residue was purified by automated flash chromatography using a silica gel column (RediSep Gold, 40 g, gradient elution with 0-80% EtOAc/hexanes), to give the desired compound (0.29 g, 70%) as a white solid. $^1$H NMR (400 MHz, CDCl$_3$) δ 7.70 (d, J=9.0 Hz, 2H), 7.44-7.42 (m, 2H), 7.40-7.37 (m, 2H), 7.34-7.31 (m, 1H), 7.17 (d, J=8.5 Hz, 2H), 6.97 (d, J=9.0 Hz, 2H), 6.92 (d, J=8.6 Hz, 2H), 5.04 (s, 2H), 4.61 (d, J=8.5 Hz, 1H), 3.89 (br s, 1H), 3.85 (s, 3H), 3.79-3.66 (m, 2H), 3.10-2.87 (m, 5H), 2.76 (dd, J=14.0, 7.5 Hz, 1H), 1.66-1.54 (m, 1H), 1.53-1.44 (m, 1H), 1.36 (s, 9H), 1.12-1.00 (m, 1H), 0.86-0.82 (m, 6H) ppm; HRMS (ESI) m/z: [M+H]$^+$ calcd for C$_{34}$H$_{47}$N$_2$O$_7$S, 627.3099.

Step 2—Synthesis of Compound (3R,3aS,6aR)-hexahydrofuro[2,3-b]furan-3-yl ((2S,3R)-1-(4-(benzyloxy)phenyl)-3-hydroxy-4-((4-methoxy-N—((S)-2-methylbutyl)phenyl)sulfonamido)butan-2-yl)carbamate

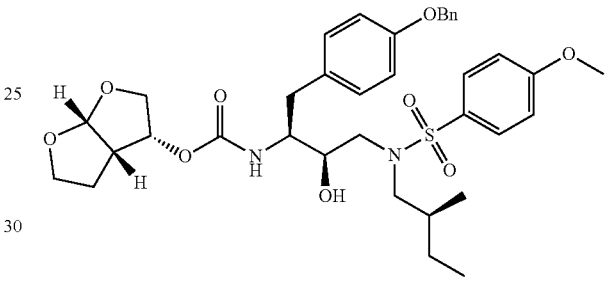

To a solution of compound obtained in the previous step (0.35 g, 0.558 mmol) in dichloromethane (6 mL) was added trifluoroacetic acid (6 mL). After stirring at room temperature for 1 h, the reaction was concentrated under reduced pressure. The residue was taken up in chloroform and concentrated and dried under high vacuum to give the deprotected amine. A solution of the deprotected amine in anhydrous acetonitrile (5 mL) was cooled to 0° C. and treated with diisopropylethylamine (0.216 g, 1.674 mmol) followed by bis-THF activated carbonate (0.166 g, 0.614 mmol). After 15 min, the reaction mixture was allowed to warm to room temperature and stirred for 24 h. The solvents were removed under reduced pressure, and the residue was purified by automated flash chromatography using a silica gel column (RediSep Gold, 24 g, gradient elution with 0-10% methanol/dichloromethane) to give the target compound (0.30 g, 79%) as a white solid. $^1$H NMR (500 MHz, CDCl$_3$) δ 7.70 (d, J=8.5 Hz, 2H), 7.44-7.36 (m, 4H), 7.35-7.31 (m, 1H), 7.13 (d, J=8.5 Hz, 2H), 6.98 (d, J=9.0 Hz, 2H), 6.90 (d, J=8.5 Hz, 2H), 5.65 (d, J=5.5 Hz, 1H), 5.06-4.99 (m, 1H), 5.02 (s, 2H, overlapping), 4.91 (d, J=9.0 Hz, 1H), 3.96 (dd, J=9.5, 6.5 Hz, 1H), 3.89-3.78 (m, 3H), 3.85 (s, 3H, overlapping), 3.74-3.68 (m, 2H), 3.63 (s, 1H), 3.12 (dd, J=15.0, 8.5 Hz, 1H), 3.07-2.88 (m, 4H), 2.82-2.73 (m, 2H), 1.70-1.46 (m, 4H), 1.13-1.03 (m, 1H), 0.88-0.83 (m, 6H) ppm; $^{13}$C NMR (125 MHz, CDCl$_3$) δ 163.25, 157.74, 155.61, 137.04, 130.53, 129.80, 129.67, 129.64, 128.75, 128.17, 127.56, 115.05, 114.52, 109.43, 73.58, 72.76, 70.93, 70.14, 69.75, 57.55, 55.78, 55.22, 53.88, 45.47, 34.89, 33.61, 26.52, 25.97, 17.07, 11.18 ppm; HRMS (ESI) m/z: [M+H]$^+$ calcd for C$_{36}$H$_{47}$N$_2$O$_9$S, 683.2997; found 683.2994.

Step 3—(3R,3aS,6aR)-hexahydrofuro[2,3-b]furan-3-yl ((2S,3R)-3-hydroxy-1-(4-hydroxyphenyl)-4-((4-methoxy-N—((S)-2-methylbutyl)phenyl)sulfonamido)butan-2-yl)carbamate

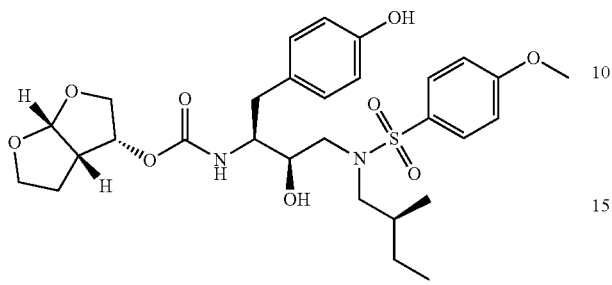

The compound obtained in the previous step (0.61 g, 0.89 mmol) was dissolved in a mixture of MeOH (5 mL) and EtOAc (5 mL) and treated with 10% palladium on activated charcoal (0.08 g) under argon. The reaction mixture was put under hydrogen atmosphere using balloons and stirred overnight. The solids were removed by filtration over a pad of Celite and the filtrate was concentrated. The residue was purified by automated flash chromatography using a silica gel column (RediSep Gold, 24 g, gradient elution with 0-100% ethyl acetate/hexane to give the target compound JRF-37 (0.32 g, 61%) as a white solid. $^1$H NMR (500 MHz, CDCl$_3$) δ 7.70 (d, J=9.0, 2H), 7.07 (d, J=8.5 Hz, 2H), 6.99 (d, J=9.0 Hz, 2H), 6.74 (d, J=8.0 Hz, 2H), 5.66 (d, J=5.0 Hz, 1H), 5.28 (s, 1H), 5.03 (q, J=6.0 Hz, 1H), 4.97 (d, J=8.5 Hz, 1H), 3.96 (dd, J=9.5, 6.0 Hz, 1H), 3.89 (dd, J=8.0, 2.0 Hz, 1H), 3.87 (s, 3H, overlapping), 3.86-3.80 (m, 2H), 3.75-3.69 (m, 2H), 3.63 (br s, 1H), 3.12 (dd, J=15.5, 8.5 Hz, 1H), 3.06-2.90 (m, 4H), 2.81-2.73 (m, 2H), 1.75-1.65 (m, 1H), 1.64-1.45 (m, 3H), 1.13-1.04 (m, 1H), 0.89-0.83 (m, 6H) ppm; $^{13}$C NMR (125 MHz, CDCl$_3$) δ 163.28, 155.72, 154.68, 130.67, 129.65, 129.50, 115.58, 114.55, 109.46, 73.68, 72.79, 71.02, 69.76, 57.54, 55.81, 55.35, 53.84, 45.54, 34.84, 33.62, 26.57, 26.00, 17.07, 11.18 ppm; HRMS (ESI) m/z: [M+H]$^+$ calcd for $C_{29}H_{41}N_2O_9S$, 593.2528; found 593.2524.

Step—Synthesis of the Title Compound

The same procedure was used as described for compound of Example 1 (step 5). Phenol obtained in the previous step (0.33 g, 0.56 mmol) was treated with cesium carbonate (0.27 g, 0.84 mmol) and phosphoryl triflate intermediate 1 (0.22 g, 0.72 mmol) to give the title compound (0.41 g, 99%) as a white solid. $^1$H NMR (500 MHz, CDCl$_3$) δ 7.70 (d, J=9.0 Hz, 2H), 7.15 (d, J=8.5 Hz, 2H), 6.98 (d, J=9.0 Hz, 2H), 6.87 (d, J=8.5 Hz, 2H), 5.65 (d, J=5.0 Hz, 1H), 5.02 (q, J=6.5 Hz, 1H), 4.93 (d, J=9.0 Hz, 1H), 4.27-4.19 (m, 6H), 3.96 (dd, J=9.5, 6.5 Hz, 1H), 3.90-3.78 (m, 3H), 3.87 (s, 3H, overlapping), 3.75-3.67 (m, 2H), 3.64 (br s, 1H), 3.11 (dd, J=15.0, 8.5 Hz, 1H), 3.05-2.89 (m, 4H), 2.83-2.75 (m, 2H), 1.74-1.64 (m, 1H), 1.63-1.54 (m, 2H), 1.53-1.44 (m, 1H), 1.36 (t, J=7.0 Hz, 6H), 1.13-1.03 (m, 1H), 0.88-0.82 (m, 6H) ppm; $^{13}$C NMR (125 MHz, CDCl$_3$) δ 163.27, 157.73, 157.61, 155.59, 130.92, 130.62, 129.70, 129.64, 114.75, 114.52, 109.41, 73.60, 72.72, 70.94, 69.68, 63.12, 63.07, 63.01, 61.76, 57.51, 55.80, 55.21, 53.83, 45.45, 34.81, 33.61, 26.56, 25.98, 17.06, 16.63, 16.59, 11.17 ppm; $^{31}$P NMR (202 MHz, CDCl$_3$) δ 19.22 ppm; HRMS (ESI) m/z: [M+H]$^+$ calcd for $C_{34}H_{52}N_2O_{12}PS$, 743.2973; found 743.2989.

Example 4

Synthesis of Compound (3R,3aS,6aR)-hexahydrofuro[2,3-b]furan-3-yl ((2S,3R)-1-(4-((diethoxyphosphoryl)methoxy)phenyl)-4-(N-(2-ethylbutyl)benzo[d][1,3]dioxole-5-sulfonamido)-3-hydroxybutan-2-yl)carbamate

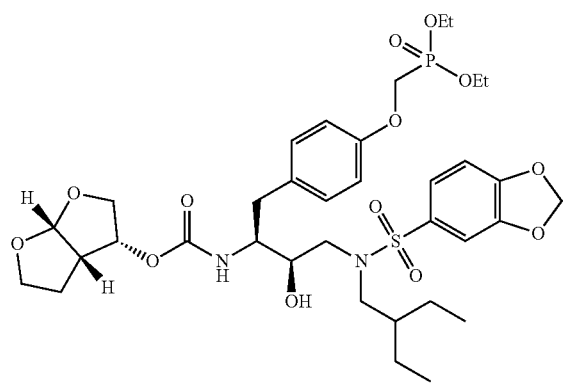

Step 1—Synthesis of Compound tert-butyl ((2S,3R)-1-(4-(benzyloxy)phenyl)-4-((2-ethylbutyl)amino)-3-hydroxybutan-2-yl)carbamate

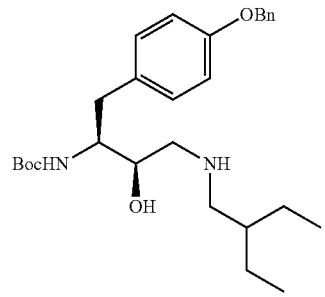 [SMILES: CCC(CC)CNC[C@@H](O)[C@H](Cc1ccc(OCc2ccccc2)cc1)NC(=O)OC(C)(C)C]

The same procedure was used as described for compound of Example 1 (step 1). A solution of tert-butyl ((S)-2-(4-(benzyloxy)phenyl)-1-((S)-oxiran-2-yl)ethyl)carbamate (1.66 g, 4.49 mmol) was treated with 2-ethylbutylamine (0.50 g, 4.94 mmol) to give the desired compound (1.27 g, 60%) as a solid. $^1$H NMR (500 MHz, CDCl$_3$) δ 7.44-7.41 (m, 2H), 7.50-7.36 (m, 2H), 7.34-7.29 (m, 1H), 7.15 (d, J=8.5 Hz, 2H), 6.91 (d, J=8.5 Hz, 2H), 5.04 (s, 2H), 4.70 (d, J=9.0 Hz, 1H), 3.82-3.73 (m, 1H), 3.44 (app q, J=5.0 Hz, 1H), 2.92 (dd, J=14.5, 5.0 Hz, 1H), 2.84 (dd, J=13.5, 7.5 Hz, 1H), 2.75-2.66 (m, 2H), 2.56-2.48 (m, 2H), 1.43-1.23 (m, 5H), 1.37 (s, 9H, overlapping), 0.87 (t, J=7.0 Hz, 6H) ppm; $^{13}$C NMR (125 MHz, CDCl$_3$) δ 157.61, 156.21, 137.28, 130.70, 130.16, 128.71, 128.06, 127.59, 114.97, 79.59, 70.55, 70.18, 54.21, 52.68, 51.82, 40.95, 35.93, 28.45, 24.01, 11.06, 11.03 ppm; HRMS (ESI) m/z: [M+H]$^+$ calcd for $C_{28}H_{43}N_2O_4$, 471.3218; found 471.3203.

Step 2—Synthesis of Compound tert-butyl ((2S, 3R)-1-(4-(benzyloxy)phenyl)-4-(N-(2-ethylbutyl) benzo[d][1,3]dioxole-5-sulfonamido)-3-hydroxybutan-2-yl)carbamate

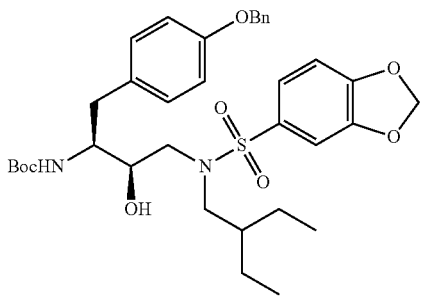 [SMILES: CCC(CC)CN(C[C@@H](O)[C@H](Cc1ccc(OCc2ccccc2)cc1)NC(=O)OC(C)(C)C)S(=O)(=O)c1ccc2c(c1)OCO2]

The same procedure was used as described for compound of Example 3 (step 1). Amino alcohol obtained in the previous step (1.52 g, 3.22 mmol) was treated with sodium carbonate (0.68 g, 6.44 mmol) and 1-benzodiaxazole-3-sulfonyl chloride (0.85 g, 3.87 mmol) to give the desired compound (1.04 g, 51%) as a white solid. $^1$H NMR (500 MHz, CDCl$_3$) δ 6 7.44-7.41 (m, 2H), 7.40-7.36 (m, 2H), 7.35-7.30 (m, 2H), 7.19-7.15 (m, 3H), 6.92 (d, J=8.5 Hz, 2H), 6.88 (d, J=8.0 Hz, 1H), 6.06 (s, 2H), 5.04 (s, 2H), 4.61 (d, J=7.0 Hz, 1H), 3.93 (s, 1H), 3.77-3.68 (m, 2H), 3.11-2.98 (m, 3H), 2.93 (dd, J=14.0, 4.5 Hz, 1H), 2.86 (dd, J=13.0, 6.0 Hz, 2H), 1.49-1.37 (m, 2H), 1.36 (s, 9H), 1.34-1.24 (m, 3H), 0.86-0.78 (m, 6H) ppm; $^{13}$C NMR (125 MHz, CDCl$_3$) δ 157.61, 156.12, 151.56, 148.39, 137.19, 131.51, 130.66, 130.00, 128.67, 128.03, 127.54, 123.23, 114.96, 108.45, 107.69, 102.43, 79.77, 72.97, 70.09, 54.91, 54.67, 53.78, 39.03, 34.83, 28.38, 23.14, 22.82, 10.68, 10.41 ppm; HRMS (ESI) m/z: [M+H]$^+$ calcd for C$_{35}$H$_{47}$N$_2$O$_8$S, 655.3048; found 655.3035.

Step 3—Synthesis of Compound (3R,3aS,6aR)-hexahydrofuro[2,3-b]furan-3-yl ((2S,3R)-1-(4-(benzyloxy)phenyl)-4-(N-(2-ethylbutyl)benzo[d][1,3]dioxole-5-sulfonamido)-3-hydroxybutan-2-yl)carbamate

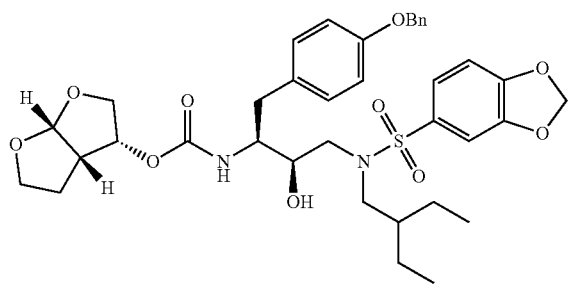 [SMILES: CCC(CC)CN(C[C@@H](O)[C@H](Cc1ccc(OCc2ccccc2)cc1)NC(=O)O[C@H]1CO[C@H]2OCC[C@H]21)S(=O)(=O)c1ccc2c(c1)OCO2]

The same procedure was used as described for compound of Example 3 (step 2). Compound obtained in the previous step (1.04 g, 1.59 mmol) was treated with trifluoroacetic acid (8 mL), and the resulting deprotected amine was treated with diisopropylethylamine (0.82 g, 6.35 mmol) and bis-THF activated carbonate (0.47 g, 1.75 mmol) to give the desired compound (0.72 g, 64%) as a yellow solid. $^1$H NMR (500 MHz, CDCl$_3$) δ 6 7.43-7.36 (m, 4H), 7.35-7.31 (m, 2H), 7.17 (d, J=1.5 Hz, 1H), 7.13 (d, J=8.5 Hz, 2H), 6.92-6.88 (m, 3H), 6.08 (s, 2H), 5.65 (d, J=5.0 Hz, 1H), 5.05-5.00 (m, 1H), 5.02 (s, 2H, overlapping), 4.85 (d, J=8.5 Hz, 1H), 3.96 (dd, J=9.5, 6.5 Hz, 1H), 3.88-3.76 (m, 3H), 3.74-3.64 (m, 3H), 3.11 (dd, J=15.5, 9.0 Hz, 1H), 3.07-2.99 (m, 2H), 2.98-2.88 (m, 2H), 2.83 (dd, J=13.5, 6.0 Hz, 1H), 2.76 (dd, J=14.5, 9.0 Hz, 1H), 1.69-1.60 (m, 1H), 1.55-1.49 (m, 1H), 1.48-1.39 (m, 2H), 1.35-1.24 (m, 3H), 0.86-0.80 (m, 6H) ppm; $^{13}$C NMR (125 MHz, CDCl$_3$) δ 157.78, 155.63, 151.76, 148.53, 137.08, 131.20, 130.52, 129.77, 128.77, 128.18, 127.56, 123.34, 115.09, 109.43, 108.58, 107.71, 102.55, 73.62, 73.21, 70.82, 70.16, 69.74, 55.22, 55.17, 54.02, 45.47, 39.33, 35.07, 25.94, 23.22, 22.91, 10.78, 10.44 ppm; HRMS (ESI) m/z: [M+H]$^+$ calcd for C$_{37}$H$_{47}$N$_2$O$_{10}$S, 711.2946;

Step 4—Synthesis of Compound (3R,3aS,6aR)-hexahydrofuro[2,3-b]furan-3-yl ((2S,3R)-4-(N-(2-ethylbutyl)benzo[d][1,3]dioxole-5-sulfonamido)-3-hydroxy-1-(4-hydroxyphenyl)butan-2-yl)carbamate

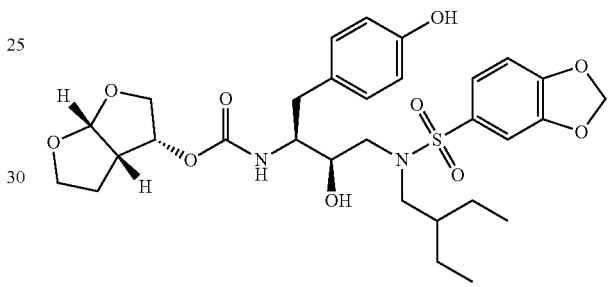

The same procedure was used as described for compound of Example 3 (step 3). Compound obtained in the previous step (0.72 g, 1.01 mmol) was treated with 10% palladium on activated charcoal (0.07 g) to give the target compound (0.56 g, 89%) as a white solid. $^1$H NMR (500 MHz, CDCl$_3$) δ 7.33 (dd, J=8.0, 1.5 Hz, 1H), 7.17 (d, J=1.5 Hz, 1H), 7.04 (d, J=8.5 Hz, 2H), 6.89 (d, J=8.5 Hz, 1H), 6.72 (d, J=8.5 Hz, 2H), 6.27 (br s, 1H), 6.08 (s, 2H), 5.64 (d, J=5.0 Hz, 1H), 5.14 (d, J=8.5 Hz, 1H), 5.02 (q, J=6.0 Hz, 1H), 3.93 (dd, J=9.5, 6.0 Hz, 1H), 3.88-3.77 (m, 3H), 3.75-3.64 (m, 3H), 3.11-2.96 (m, 4H), 2.94-2.85 (m, 2H), 2.69 (dd, J=14.0, 9.0 Hz, 1H), 1.70-1.60 (m, 1H), 1.51-1.35 (m, 3H), 1.34-1.26 (m, 3H), 0.82 (td, J=7.5, 2.0 Hz, 6H) ppm; $^{13}$C NMR (125 MHz, CDCl$_3$) δ 155.83, 154.96, 151.72, 148.48, 131.14, 130.55, 129.19, 123.31, 115.57, 109.46, 108.55, 107.66, 102.53, 73.69, 73.27, 71.00, 69.76, 55.47, 54.97, 53.79, 45.62, 39.14, 34.94, 25.98, 23.11, 22.87, 10.66, 10.41 ppm; HRMS (ESI) m/z: [M+H]$^+$ calcd for C$_{30}$H$_{41}$N$_2$O$_{10}$S, 621.2477; found 621.2473.

Step 5—Synthesis of the Title Compound

The same procedure was used as described for compound of Example 1 (step 5). Phenol obtained in the previous step (0.56 g, 0.90 mmol) was treated with cesium carbonate (0.44 g, 1.35 mmol) and phosphoryl triflate intermediate 1 (0.35 g, 1.17 mmol) to give the desired compound (0.69 g, 99%) as a white solid. $^1$H NMR (500 MHz, CDCl$_3$) δ 6 7.32 (dd, J=8.0, 2.0 Hz, 1H), 7.18-7.13 (m, 3H), 6.92-6.86 (m, 3H), 6.09 (s, 2H), 5.65 (d, J=5.0 Hz, 1H), 5.03 (q, J=6.0 Hz, 1H), 4.90 (d, J=8.5 Hz, 1H), 4.27-4.20 (m, 6H), 3.96 (dd, J=9.5, 6.5 Hz, 1H), 3.87 (td, J=8.0, 2.5 Hz, 1H), 3.85-3.76 (m, 2H), 3.75-3.68 (m, 2H), 3.68 (br s, 1H, overlapping), 3.09 (dd, J=15.5, 8.5 Hz, 1H), 3.05-2.90 (m, 4H), 2.84 (dd, J=13.5, 6.0 Hz, 1H), 2.78 (dd, J=14.0, 8.5 Hz, 1H), 1.73-1.64 (m, 1H), 1.60-1.53 (m, 1H), 1.48-1.38 (m, 2H), 1.36 (t, J=7.0 Hz, 6H), 1.33-1.26 (m, 3H), 0.83 (t, J=7.5 Hz, 6H) ppm; $^{31}$P NMR (202 MHz, CDCl$_3$) δ 6 19.22 ppm; $^{13}$C NMR (125 MHz, CDCl$_3$) δ 157.75, 157.63, 155.60, 151.77, 148.52, 131.18, 130.90, 130.60, 123.32, 114.77, 109.40, 108.57, 107.68, 102.57, 73.62, 73.15, 70.83, 69.68, 63.11, 63.07, 63.02, 61.75, 55.19, 55.13, 53.98, 45.44, 39.30, 34.97, 25.96, 23.19, 22.90, 16.64, 16.60, 10.75, 10.44 ppm; HRMS (ESI) m/z: [M+H]$^+$ calcd for C$_{35}$H$_{52}$N$_2$O$_{13}$PS, 771.2922; found 771.2928.

Example 5

Synthesis of Compound (3R,3aS,6aR)-hexahydrofuro[2,3-b]furan-3-yl ((2S,3R)-4-((4-amino-N—((S)-2-methylbutyl)phenyl)sulfonamido)-1-(4-((diethoxyphosphoryl)methoxy)phenyl)-3-hydroxybutan-2-yl)carbamate

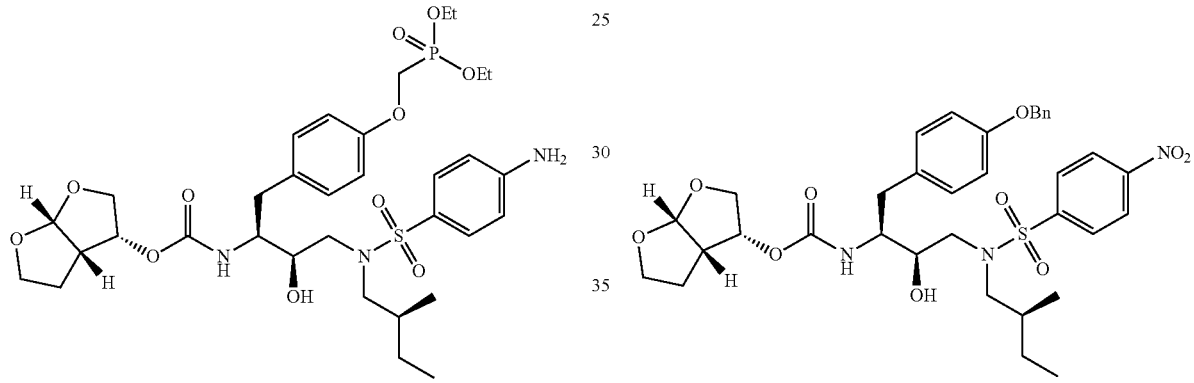

Step 1—Synthesis of Compound tert-butyl ((2S, 3R)-1-(4-(benzyloxy)phenyl)-3-hydroxy-4-((N—((S)-2-methylbutyl)-4-nitrophenyl)sulfonamido)butan-2-yl)carbamate

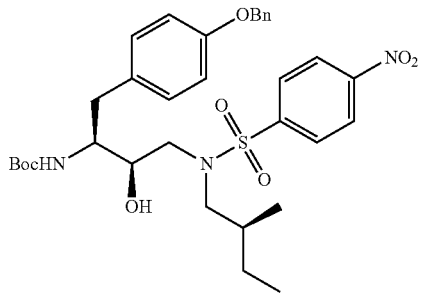 [SMILES: CC[C@H](C)CN(C[C@@H](O)[C@H](Cc1ccc(OCc2ccccc2)cc1)NC(=O)OC(C)(C)C)S(=O)(=O)c1ccc([N+](=O)[O-])cc1]

The same procedure was used as described for compound of Example 3 (step 1). Amino alcohol obtained in Example 1 (step 1) (1.26 g, 2.76 mmol) was treated with sodium carbonate (0.58 g, 5.52 mmol) and 4-nitrobenzenesulfonyl chloride (0.73 g, 3.31 mmol) to give the desired compound (1.63 g, 92%) as a yellow solid. $^1$H NMR (500 MHz, CDCl$_3$) δ 8.33 (d, J=9.0 Hz, 2H), 7.95 (d, J=9.0 Hz, 2H), 7.44-7.41 (m, 2H), 7.40-7.36 (m, 2H), 7.35-7.30 (m, 1H), 7.14 (d, J=8.5 Hz, 2H), 6.93 (d, J=9.0 Hz, 2H), 5.05 (s, 2H), 4.61 (d, J=6.5 Hz, 1H), 3.82-3.68 (m, 3H), 3.24-3.12 (m, 2H), 3.06 (dd, J=13.5, 7.0 Hz, 1H), 2.96 (dd, J=13.5, 8.0 Hz, 1H), 2.91-2.81 (m, 2H), 1.68-1.60 (m, 1H), 1.46-1.34 (m, 1H), 1.38 (s, 9H, overlapping), 1.12-1.02 (m, 1H), 0.88-0.82 (m, 6H) ppm; $^{13}$C NMR (125 MHz, CDCl$_3$) δ 157.81, 156.52, 150.10, 145.00, 137.07, 130.53, 129.64, 128.73, 128.67, 128.13, 127.60, 124.40, 115.17, 80.28, 72.07, 70.20, 56.18, 55.33, 52.47, 34.93, 33.21, 28.39, 26.65, 16.92, 11.22 ppm; HRMS (ESI) m/z: [M+H]$^+$ calcd for C$_{33}$H$_{44}$N$_3$O$_8$S, 642.2844; found 642.2837.

Step 2—Synthesis of Compound (3R,3aS,6aR)-hexahydrofuro[2,3-b]furan-3-yl ((2S,3R)-1-(4-(benzyloxy)phenyl)-3-hydroxy-4-((N—((S)-2-methylbutyl)-4-nitrophenyl)sulfonamido)butan-2-yl)carbamate

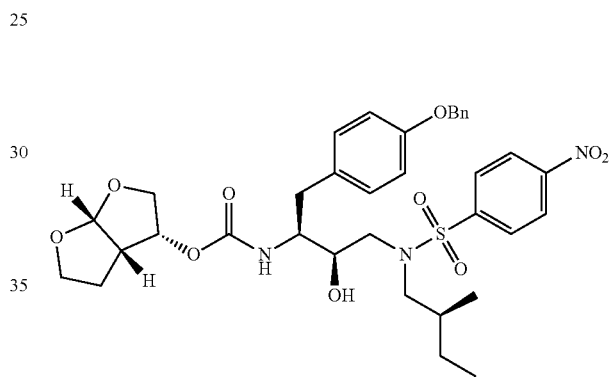

The same procedure was used as described for compound of Example 3 (step 2). Compound obtained in the previous step (1.0 g, 1.56 mmol) was treated with trifluoroacetic acid (5 mL), and the resulting deprotected amine was treated with diisopropylethylamine (0.61 g, 4.68 mmol) and bis-THF activated carbonate (0.51 g, 1.87 mmol) to give the desired compound (0.99 g, 91%) as a white solid. $^1$H NMR (500 MHz, CDCl$_3$) δ 8.36 (d, J=9.0 Hz, 2H), 7.96 (d, J=9.0 Hz, 2H), 7.44-7.36 (m, 4H), 7.35-7.31 (m, 1H), 7.12 (d, J=8.5 Hz, 2H), 6.91 (d, J=8.5 Hz, 2H), 5.66 (d, J=5.5 Hz, 1H), 5.07-5.01 (m, 1H), 5.03 (s, 2H, overlapping), 4.91 (d, J=8.0 Hz, 1H), 3.96 (dd, J=9.5, 7.0 Hz, 1H), 3.88-3.80 (m, 3H), 3.75-3.67 (m, 2H), 3.37 (br s, 1H), 3.21 (dd, J=15.0, 8.0 Hz, 1H), 3.12-3.05 (m, 2H), 2.99 (dd, J=14.0, 3.5 Hz, 1H), 2.95-2.88 (m, 2H), 2.76 (dd, J=13.5, 8.5 Hz, 1H), 1.72-1.60 (m, 2H), 1.58-1.51 (m, 1H), 1.50-1.40 (m, 1H), 1.14-1.03 (m, 1H), 0.88-0.82 (m, 6H) ppm; $^{13}$C NMR (125 MHz, CDCl$_3$) δ 157.88, 155.80, 150.27, 144.53, 136.95, 130.43, 129.49, 128.77, 128.70, 128.21, 127.57, 124.55, 115.18, 109.44, 73.81, 72.42, 70.97, 70.19, 69.71, 56.77, 55.52, 53.14, 45.53, 34.81, 33.41, 26.56, 25.99, 16.97, 11.18 ppm; HRMS (ESI) m/z: [M+H]$^+$ calcd for C$_{35}$H$_{44}$N$_3$O$_{10}$S, 698.2742; found 698.2744.

Step 3—Synthesis of Compound (3R,3aS,6aR)-hexahydrofuro[2,3-b]furan-3-yl ((2S,3R)-4-((4-amino-N—((S)-2-methylbutyl)phenyl)sulfonamido)-3-hydroxy-1-(4-hydroxyphenyl)butan-2-yl)carbamate

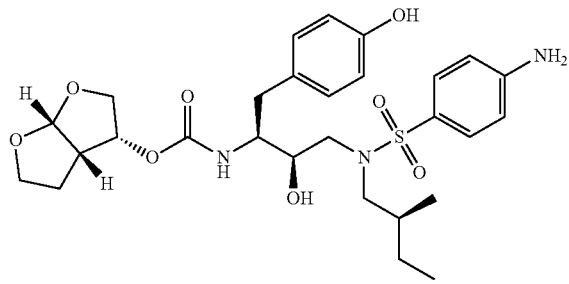 [SMILES: CC[C@H](C)CN(C[C@@H](O)[C@H](Cc1ccc(O)cc1)NC(=O)O[C@H]1CO[C@H]2OCC[C@H]21)S(=O)(=O)c1ccc(N)cc1]

The same procedure was used as described for compound of Example 3 (step 3). Compound obtained in the previous step (0.80 g, 1.15 mmol) was treated with 10% palladium on activated charcoal (0.25 g) to give the desired compound (0.46 g, 69%) as a yellow solid. $^1$H NMR (500 MHz, CDCl$_3$) δ 7.53 (d, J=9.0 Hz, 2H), 7.07 (d, J=8.0 Hz, 2H), 6.74 (d, J=8.5 Hz, 2H), 6.68 (d, J=8.5 Hz, 2H), 5.66 (d, J=5.0 Hz, 1H), 5.13 (br s, 1H), 5.03 (dd, J=6.5 Hz, 1H), 4.95 (d, J=9.0 Hz, 1H), 4.17 (br s, 2H), 3.97 (dd, J=9.5, 6.5 Hz, 1H), 3.89 (td, J=8.0, 2.0 Hz, 1H), 3.86-3.78 (m, 2H), 3.75-3.69 (m, 2H), 3.65 (br s, 1H), 3.09 (dd, J=15.0, 8.5 Hz, 1H), 3.03-2.90 (m, 4H), 2.80-2.72 (m, 2H), 1.75-1.65 (m, 1H), 1.63-1.55 (m, 2H), 1.54-1.45 (m, 1H), 1.13-1.03 (m, 1H), 0.89-0.83 (m, 6H) ppm; $^{13}$C NMR (125 MHz, CDCl$_3$) δ 155.67, 154.59, 150.89, 135.28, 130.71, 129.69, 126.10, 115.55, 114.29, 109.47, 73.63, 72.79, 71.02, 69.78, 57.62, 55.29, 53.93, 45.51, 34.90, 33.65, 26.59, 26.00, 17.10, 11.19 ppm; HRMS (ESI) m/z: [M+H]$^+$ calcd for C$_{28}$H$_{40}$N$_3$O$_8$S, 578.2531.

Step 4—Synthesis of the Title Compound

The same procedure was used as described for compound of Example 1 (step 5). Phenol obtained in the previous step (0.17 g, 0.29 mmol) was treated with cesium carbonate (0.14 g, 0.44 mmol) and phosphoryl triflate intermediate 1 (0.12 g, 0.38 mmol) to give the desired compound (0.18 g, 86%) as a white solid. $^1$H NMR (500 MHz, CDCl$_3$) δ 7.41 (d, J=8.5 Hz, 2H), 7.18 (d, J=8.5 Hz, 2H), 6.88 (d, J=8.5 Hz, 2H), 6.68 (d, J=8.5 Hz, 2H), 5.67 (d, J=5.5 Hz, 1H), 5.09-5.03 (m, 2H), 4.48 (br s, 2H), 4.30-4.17 (m, 6H), 4.00 (dd, J=9.5, 6.0 Hz, 1H), 3.94-3.88 (m, 1H), 3.87-3.74 (m, 3H), 3.71 (dd, J=9.5, 6.5 Hz, 1H), 3.66 (br s, 1H), 3.05-2.93 (m, 4H), 2.81 (dd, J=14.0, 7.5 Hz, 1H), 2.68 (d, J=13.5 Hz, 1H), 2.61 (dd, J=13.5, 6.5 Hz, 1H), 1.80-1.69 (m, 2H), 1.62-1.47 (m, 2H), 1.40-1.35 (m, 6H), 1.13-1.02 (m, 1H), 0.88-0.82 (m, 6H) ppm; $^{13}$C NMR (125 MHz, CDCl$_3$) δ 157.62, 157.50, 155.46, 151.10, 131.17, 130.64, 129.56, 125.61, 114.68, 114.20, 109.40, 73.54, 73.02, 70.97, 69.72, 63.26, 63.21, 63.08, 63.03, 61.67, 57.70, 55.13, 54.20, 45.40, 34.90, 33.65, 26.48, 26.02, 17.12, 16.66, 16.61, 11.19 ppm; $^{31}$P NMR (202 MHz, CDCl$_3$) δ 19.27 ppm; HRMS (ESI) m/z: [M+H]$^+$ calcd for C$_{33}$H$_{51}$N$_3$O$_{11}$PS, 728.2977; found 728.2984.

Example 6

(3R,3aS,6aR)-hexahydrofuro[2,3-b]furan-3-yl ((2S,3R)-1-(4-((diethoxyphosphoryl)methoxy)phenyl)-3-hydroxy-4-((4-(hydroxymethyl)-N—((S)-2-methylbutyl)phenyl)sulfonamido)butan-2-yl)carbamate

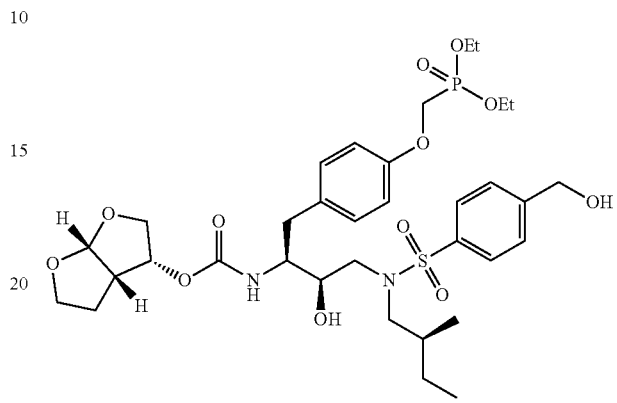

Step 1—Synthesis of Compound tert-butyl ((2S,3R)-1-(4-(benzyloxy)phenyl)-4-((4-formyl-N—((S)-2-methylbutyl)phenyl)sulfonamido)-3-hydroxybutan-2-yl)carbamate

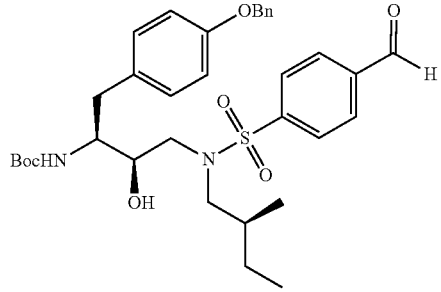 [SMILES: CC[C@H](C)CN(C[C@@H](O)[C@H](Cc1ccc(OCc2ccccc2)cc1)NC(=O)OC(C)(C)C)S(=O)(=O)c1ccc(C=O)cc1]

The same procedure was used as described for compound of Example 3 (step 1). Amino alcohol obtained in Example 1 (step 1) (1.24 g, 2.71 mmol) was treated with sodium carbonate (0.57 g, 5.41 mmol) and 4-formylbenzenesulfonyl chloride (0.72 g, 3.52 mmol) to give the desired compound (1.50 g, 89%) as a white solid. $^1$H NMR (500 MHz, CDCl$_3$) δ 10.07 (s, 1H), 8.01 (d, J=8.0 Hz, 2H), 7.93 (d, J=8.0 Hz, 2H), 7.44-7.41 (m, 2H), 7.40-7.36 (m, 2H), 7.35-7.30 (m, 1H), 7.15 (d, J=8.0 Hz, 2H), 6.92 (d, J=8.0 Hz, 2H), 5.04 (s, 2H), 4.61 (d, J=5.5 Hz, 1H), 3.85-3.66 (m, 3H), 3.19-3.09 (m, 2H), 3.06 (dd, J=13.5, 7.5 Hz, 1H), 2.96-2.82 (m, 3H), 1.70-1.58 (m, 1H), 1.47-1.34 (m, 1H), 1.37 (s, 9H, overlapping), 1.10-1.01 (m, 1H), 0.87-0.80 (m, 6H) ppm; $^{13}$C NMR (125 MHz, CDCl$_3$) δ 190.90, 157.75, 156.36, 144.03, 138.93, 137.13, 130.62, 130.29, 128.73, 128.69, 128.12, 127.59, 115.11, 80.10, 72.39, 70.17, 56.70, 55.08, 53.09, 34.82, 33.33, 28.40, 26.60, 16.95, 11.19 ppm; HRMS (ESI) m/z: [M+H]$^+$ calcd for C$_{34}$H$_{45}$N$_2$O$_7$S, 625.2942.

Step 2—Synthesis of Compound tert-butyl ((2S,3R)-1-(4-(benzyloxy)phenyl)-3-hydroxy-4-((4-(hydroxymethyl)-N—((S)-2-methylbutyl)phenyl)sulfonamido)butan-2-yl)carbamate

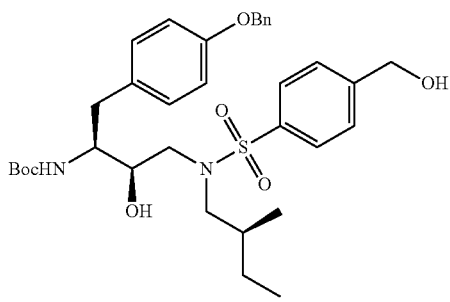 [SMILES: CC[C@H](C)CN(C[C@@H](O)[C@H](Cc1ccc(OCc2ccccc2)cc1)NC(=O)OC(C)(C)C)S(=O)(=O)c1ccc(CO)cc1]

A solution of compound obtained in the previous step (0.99 g, 1.58 mmol) in methanol (20 mL) was cooled to 0° C. and sodium borohydride (0.07 g, 1.90 mmol) was added. The reaction mixture was stirred at 0° C. for 30 min and the reaction was quenched with ammonium chloride (20 mL). The methanol was removed on the rotavapor and the resulting mixture was extracted with ethyl acetate (2×15 mL). The combined organic layers were washed with brine (10 mL), dried over sodium sulfate and the solvent was removed under reduced pressure. The residue was purified by automated flash chromatography using a silica gel column (RediSep Gold, 24 g, gradient elution with 20-100% EtOAc/hexanes), to give the desired compound (0.80 g, 81%) as a white solid. $^1$H NMR (500 MHz, CDCl$_3$) δ 6 7.75 (d, J=8.5 Hz, 2H), 7.50 (d, J=8.0 Hz, 2H), 7.45-7.41 (m, 2H), 7.40-7.35 (m, 2H), 7.34-7.30 (m, 1H), 7.16 (d, J=8.5 Hz, 2H), 6.92 (d, J=8.5 Hz, 2H), 5.04 (s, 2H), 4.77 (s, 2H), 4.62 (d, J=7.0 Hz, 1H), 3.80-3.65 (m, 2H), 3.12-2.98 (m, 3H), 2.94-2.84 (m, 2H), 2.80 (dd, J=13.0, 7.0 Hz, 1H), 1.60-1.43 (m, 2H), 1.36 (s, 9H), 1.11-1.01 (m, 1H), 0.86-0.77 (m, 6H) ppm; $^{13}$C NMR (125 MHz, CDCl$_3$) δ 157.67, 156.21, 151.29, 146.18, 137.21, 130.71, 130.07, 128.74, 128.11, 127.77, 127.60, 127.25, 115.08, 79.92, 70.20, 64.41, 57.34, 54.81, 53.75, 34.69, 33.48, 28.44, 26.57, 17.03, 11.19 ppm; HRMS (ESI) m/z: [M+H]$^+$ calcd for C$_{34}$H$_{47}$N$_2$O$_7$S, 627.3099.

Step 3—Synthesis of Compound (3R,3aS,6aR)-hexahydrofuro[2,3-b]furan-3-yl ((2S,3R)-1-(4-(benzyloxy)phenyl)-3-hydroxy-4-((4-(hydroxymethyl)-N—((S)-2-methylbutyl)phenyl)sulfonamido)butan-2-yl)carbamate

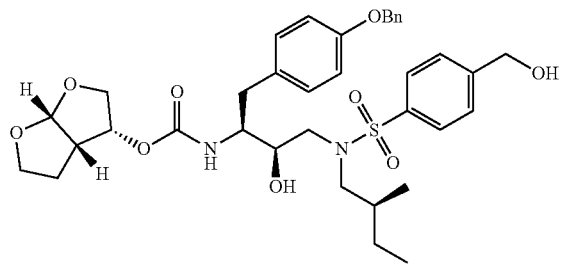 [SMILES: CC[C@H](C)CN(C[C@@H](O)[C@H](Cc1ccc(OCc2ccccc2)cc1)NC(=O)O[C@H]1CO[C@H]2OCC[C@H]21)S(=O)(=O)c1ccc(CO)cc1]

The same procedure was used as described for compound of Example 3 (step 2). Compound obtained in the previous step (0.80 g, 1.28 mmol) was treated with trifluoroacetic acid (3 mL), and the resulting deprotected amine was treated with diisopropylethylamine (0.50 g, 3.83 mmol) and bis-THF activated carbonate (0.42 g, 1.53 mmol) to give the desired compound (0.79 g, 91%) as a white solid. $^1$H NMR (500 MHz, CDCl$_3$) δ 7.74 (d, J=8.0 Hz, 2H), 7.51 (d, J=8.0 Hz, 2H), 7.44-7.35 (m, 4H), 7.35-7.30 (m, 1H), 7.12 (d, J=8.0 Hz, 2H), 6.89 (d, J=8.0 Hz, 2H), 5.65 (d, J=5.0 Hz, 1H), 5.05-4.98 (m, 1H), 5.02 (s, 2H, overlapping), 4.94 (d, J=8.0 Hz, 1H), 4.77 (s, 2H), 3.95 (app q, J=11.0, Hz, 1H), 3.88-3.78 (m, 3H), 3.73-3.64 (m, 2H), 3.10 (dd, J=15.0, 8.0 Hz, 1H), 3.06-2.86 (m, 4H), 2.82 (dd, J=13.0, 7.0 Hz, 1H), 2.77 (dd, J=13.5, 8.0 Hz, 1H, overlapping), 1.71-1.43 (m, 4H), 1.09 (sept, J=7.5 Hz, 1H), 0.89-0.82 (m, 6H) ppm; $^{13}$C NMR (125 MHz, CDCl$_3$) δ 157.73, 155.62, 146.55, 137.04, 136.95, 130.50, 129.77, 128.75, 128.16, 127.71, 127.55, 127.29, 115.08, 109.44, 73.59, 72.70, 71.05, 70.15, 69.74, 64.24, 57.54, 55.27, 53.86, 45.46, 34.93, 33.58, 26.57, 25.99, 17.05, 11.18 ppm; HRMS (ESI) m/z: [M+H]$^+$ calcd for C$_{36}$H$_{47}$N$_2$O$_9$S, 683.2997.

Step 4—Synthesis of Compound (3R,3aS,6aR)-hexahydrofuro[2,3-b]furan-3-yl ((2S,3R)-1-(4-(benzyloxy)phenyl)-4-((4-(((tert-butyl)dimethylsilyl)oxy)methyl)-N—((S)-2-methylbutyl)phenyl) sulfonamido)-3-hydroxybutan-2-yl)carbamate

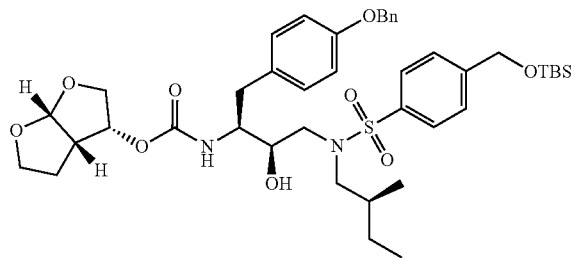 [SMILES: CC[C@H](C)CN(C[C@@H](O)[C@H](Cc1ccc(OCc2ccccc2)cc1)NC(=O)O[C@H]1CO[C@H]2OCC[C@H]21)S(=O)(=O)c1ccc(CO[Si](C)(C)C(C)(C)C)cc1]

A solution of compound obtained in the previous step (0.40 g, 0.59 mmol) in dichloromethane (15 mL) was cooled to 0° C. and DIPEA (0.15 g, 1.17 mmol), DMAP (0.14 g, 1.17 mmol) and TBSC$_1$ (0.18 g, 1.17 mmol) were added. The reaction was stirred at room temperature for 15 h and then concentrated under reduced pressure. The residue was purified by automated flash chromatography using a silica gel column (RediSep Gold, 24 g, gradient elution with 0-10% methanol/dichloromethne), to give the desired compound (0.46 g, 98%) as a white solid. $^1$H NMR (500 MHz, CDCl$_3$) δ 7.74 (d, J=8.5 Hz, 2H), 7.48 (d, J=8.5 Hz, 2H), 7.44-7.36 (m, 4H), 7.35-7.30 (m, 1H), 7.13 (d, J=8.5 Hz, 2H), 6.90 (d, J=8.5 Hz, 2H), 5.65 (d, J=5.5 Hz, 1H), 5.05-5.00 (m, 1H), 5.03 (s, 2H, overlapping), 4.87 (d, J=9.0 Hz, 1H), 4.79 (s, 2H), 3.96 (dd, J=9.5 Hz, 6.5 Hz, 1H), 3.88-3.78 (m, 3H), 3.74-3.67 (m, 2H), 3.60 (br s, 1H), 3.15 (dd, J=15.0 Hz, 8.0 Hz, 1H), 3.06 (dd, J=13.5 Hz, 8.0 Hz, 1H), 3.02-2.95 (m, 2H), 2.94-2.88 (m, 1H), 2.83-2.75 (m, 2H), 1.70-1.46 (m, 4H), 1.12-1.02 (m, 1H), 0.95 (s, 9H), 0.88-0.83 (m, 6H), 0.12 (s, 6H) ppm; $^{13}$C NMR (125 MHz, CDCl$_3$) δ 157.77, 155.63, 147.29, 137.08, 136.44, 130.53, 128.76, 128.16, 127.55, 126.52, 115.08, 109.43, 73.60, 72.76, 70.89, 70.15, 69.74, 64.24, 57.61, 55.27, 53.92, 45.48, 34.88, 33.63, 26.52, 26.03, 25.96, 18.52, 17.06, 11.17, −5.19 ppm; HRMS (ESI) m/z: [M+H]⁺ calcd for C₄₂H₆₁N₂O₉SSi, 797.3862; found 797.3860.

Step 5—Synthesis of Compound (3R,3aS,6aR)-hexahydrofuro[2,3-b]furan-3-yl ((2S, 3R)-4-((4-(((tert-butyldimethylsilyl)oxy)methyl)-N—((S)-2-methylbutyl)phenyl)sulfonamido)-3-hydroxy-1-(4-hydroxyphenyl)butan-2-yl)carbamate

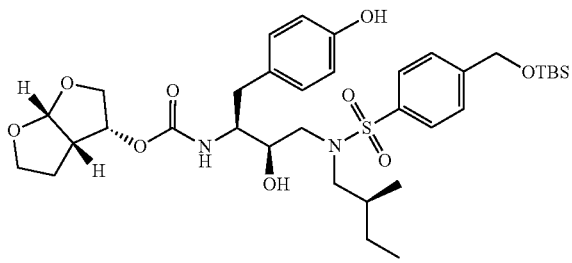 [SMILES: CC[C@H](C)CN(C[C@@H](O)[C@H](Cc1ccc(O)cc1)NC(=O)O[C@H]1CO[C@H]2OCC[C@H]21)S(=O)(=O)c1ccc(CO[Si](C)(C)C(C)(C)C)cc1]

The same procedure was used as described for compound of Example 3 (step 3). Compound obtained in the previous step (0.40 g, 0.50 mmol) was treated with 10% palladium on activated charcoal (0.04 g) to give the desired compound (0.20 g, 55%) as a yellow solid. HRMS (ESI) m/z: [M+H]⁺ calcd for C₃₅H₅₅N₂O₉SSi.

Step 6—Synthesis of Compound (3R,3aS,6aR)-hexahydrofuro[2,3-b]furan-3-yl ((2S,3R)-4-((4-(((tert-butyldimethylsilyl)oxy)methyl)-N—((S)-2-methylbutyl)phenyl)sulfonamido)-1-(4-((diethoxyphosphoryl)methoxy)phenyl)-3-hydroxybutan-2-yl)carbamate

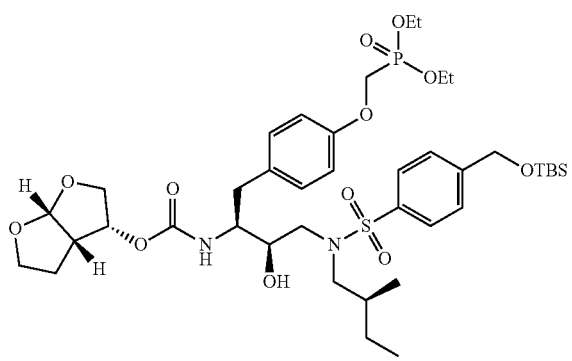 [SMILES: CCOP(=O)(COc1ccc(C[C@H](NC(=O)O[C@H]2CO[C@H]3OCC[C@H]32)[C@H](O)CN(C[C@@H](C)CC)S(=O)(=O)c2ccc(CO[Si](C)(C)C(C)(C)C)cc2)cc1)OCC]

The same procedure was used as described for compound of Example 1 (step 5). Phenol obtained in the previous step (0.29 g, 0.41 mmol) was treated with cesium carbonate (0.20 g, 0.62 mmol) and phosphoryl triflate intermediate 1 (0.16 g, 0.55 mmol) to give the desired compound (0.22 g, 62%) as a white solid. ¹H NMR (500 MHz, CDCl₃) δ 7.73 (d, J=8.5 Hz, 2H), 7.47 (d, J=8.0 Hz, 2H), 7.14 (d, J=8.5 Hz, 2H), 6.86 (d, J=8.5 Hz, 2H), 5.64 (d, J=5.0 Hz, 1H), 5.06-4.98 (m, 2H), 4.79 (s, 2H), 4.26-4.18 (m, 6H), 3.94 (dd, J=9.5, 6.0 Hz, 1H), 3.89-3.78 (m, 3H), 3.74-3.66 (m, 3H), 3.12 (dd, J=15.0, 8.0 Hz, 1H), 3.07-2.95 (m, 3H), 2.94-2.88 (m, 1H), 2.84-2.74 (m, 2H), 1.70-1.42 (m, 4H), 1.38-1.32 (m, 6H), 1.12-1.02 (m, 1H), 0.94 (s, 9H), 0.87-0.82 (m, 6H), 0.11 (s, 6H) ppm; ¹³C NMR (125 MHz, CDCl₃) δ 157.61, 157.49, 155.44, 147.36, 136.53, 131.21, 130.64, 127.53, 127.22, 114.71, 109.39, 73.55, 73.06, 71.01, 69.71, 63.98, 63.35, 63.29, 63.21, 63.16, 63.05, 61.68, 57.60, 55.28, 54.10, 45.37, 34.89, 33.58, 26.41, 26.01, 25.82, 25.77, 17.04, 16.62, 16.57, 11.11, −3.46 ppm; ³¹P NMR (202 MHz, CDCl₃) δ 19.28 ppm HRMS (ESI) m/z: [M+H]⁺ calcd for C₄₀H₆₆N₂O₁₂PSSi, 857.3838.

Step 7—Synthesis of the Title Compound

Compound obtained in the previous step (0.20 g, 0.23 mmol) was dissolved in anhydrous THF and the solution was cooled to 0° C. and TBAF (1M in THF) (0.28 mL, 0.28 mmol) was added. After stirring for 2 h at 0° C., the reaction was quenched with aqueous ammonium chloride solution and extracted with ethyl acetate. The organic portion was dried over sodium sulfate, concentrated and purified automated flash chromatography using a silica gel column (RediSep Gold, 24 g, gradient elution with 0-20% methanol/dichloromethne), to give the desired compound (0.46 g, 98%) as a white solid. NMR (500 MHz, CDCl₃) δ 7.61 (d, J=8.0 Hz, 2H), 7.48 (d, J=8.0 Hz, 2H), 7.17 (d, J=8.5 Hz, 2H), 6.86 (d, J=8.5 Hz, 2H), 5.65 (d, J=5.5 Hz, 1H), 5.21 (d, J=8.5 Hz, 1H), 5.04 (q, J=6.0 Hz, 1H), 4.73 (d, J=6.0 Hz, 2H), 4.27-4.17 (m, 6H), 3.96 (dd, J=9.5, 6.5 Hz, 1H), 3.91-3.79 (m, 3H), 3.78-3.70 (m, 2H), 3.69-3.63 (m, 2H), 3.06-2.91 (m, 4H), 2.78 (dd, J=14.0, 7.5 Hz, 1H), 2.73-2.64 (m, 2H), 1.77-1.67 (m, 2H), 1.64-1.54 (m, 1H), 1.53-1.43 (m, 1H), 1.39-1.32 (m, 6H), 1.11-1.01 (m, 1H), 0.87-0.81 (m, 6H) ppm; ¹³C NMR (125 MHz, CDCl₃) δ 157.56, 157.45, 155.44, 147.34, 136.53, 131.21, 130.60, 127.50, 127.18, 114.67, 109.37, 73.50, 72.99, 71.00, 69.68, 63.91, 63.29, 63.24, 63.18, 63.13, 63.01, 61.64, 57.51, 55.28, 53.99, 45.38, 34.83, 33.53, 26.44, 26.01, 17.01, 16.59, 16.54, 11.10 ppm; ³¹P NMR (202 MHz, CDCl₃) δ 19.34 ppm; HRMS (ESI) m/z: [M+H]⁺ calcd for C₃₄H₅₂N₂O₁₂PS, 743.2973.

Example 7

(3R,3aS,6aR)-hexahydrofuro[2,3-b]furan-3-yl ((2S, 3R)-4-((4-amino-N-(2-ethylbutyl)phenyl)sulfonamido)-1-(4-((diethoxyphosphoryl)methoxy)phenyl)-3-hydroxybutan-2-yl)carbamate

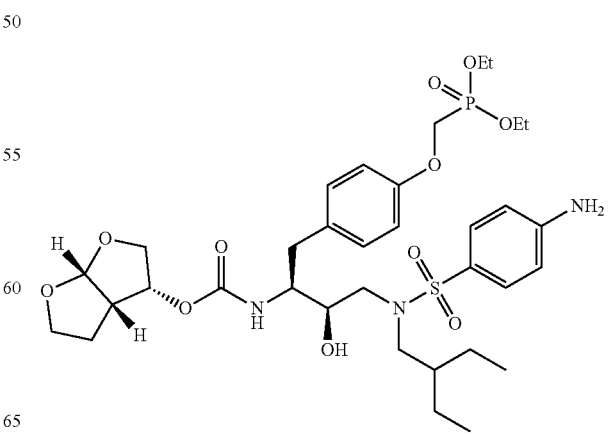

Step 1—Synthesis of Compound tert-butyl ((2S, 3R)-1-(4-(benzyloxy)phenyl)-4-((N-(2-ethylbutyl)-4-nitrophenyl)sulfonamido)-3-hydroxybutan-2-yl)carbamate

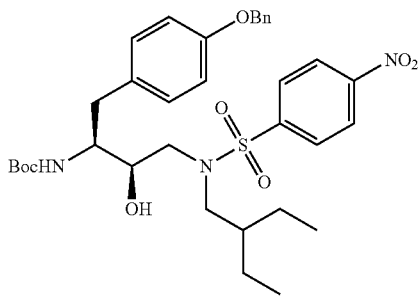 [SMILES: CCC(CC)CN(C[C@@H](O)[C@H](Cc1ccc(OCc2ccccc2)cc1)NC(=O)OC(C)(C)C)S(=O)(=O)c1ccc([N+](=O)[O-])cc1]

The same procedure was used as described for compound of Example 3 (step 1). Amino alcohol obtained in Example 4 (step 1) (0.64 g, 1.36 mmol) was treated with sodium carbonate (0.29 g, 2.72 mmol) and 4-nitrobenzenesulfonyl chloride (0.39 g, 1.77 mmol) to give the desired compound (0.72 g, 81%) as a yellow solid. $^1$H NMR (500 MHz, CDCl$_3$) δ 8.34 (d, J=9.0 Hz, 2H), 7.95 (d, J=9.0 Hz, 2H), 7.45-7.42 (m, 2H), 7.41-7.36 (m, 2H), 7.35-7.31 (m, 1H), 7.14 (d, J=8.5 Hz, 2H), 6.93 (d, J=9.0 Hz, 2H), 5.05 (s, 2H), 4.57 (d, J=6.0 Hz, 1H), 3.81 (s, 1H), 3.77-3.68 (m, 2H), 3.22-3.11 (m, 2H), 3.10-3.00 (m, 2H), 2.91-2.80 (m, 2H), 1.53-1.44 (m, 1H), 1.40-1.23 (m, 4H), 1.37 (s, 9H, overlapping), 0.82 (dt, J=10.5, 7.5 Hz, 6H) ppm; $^{13}$C NMR (125 MHz, CDCl$_3$) δ 157.84, 156.52, 150.14, 144.91, 137.09, 130.55, 129.61, 128.75, 128.70, 128.15, 127.61, 124.44, 115.19, 80.30, 72.33, 70.22, 55.32, 53.85, 52.53, 38.77, 35.07, 28.40, 23.06, 22.90, 10.62, 10.49 ppm; HRMS (ESI) m/z: [M+H]$^+$ calcd for C$_{34}$H$_{46}$N$_3$O$_8$S, 656.3000; found 656.2993.

Step 2—Synthesis of Compound (3R,3aS,6aR)-hexahydrofuro[2,3-b]furan-3-yl ((2S,3R)-1-(4-(benzyloxy)phenyl)-4-((N-(2-ethylbutyl)-4-nitrophenyl)sulfonamido)-3-hydroxybutan-2-yl)carbamate

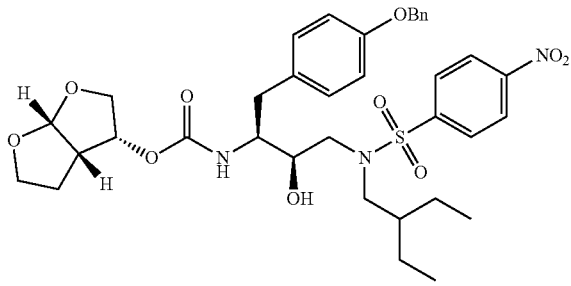 [SMILES: CCC(CC)CN(C[C@@H](O)[C@H](Cc1ccc(OCc2ccccc2)cc1)NC(=O)O[C@H]1CO[C@H]2OCC[C@H]21)S(=O)(=O)c1ccc([N+](=O)[O-])cc1]

The same procedure was used as described for compound of Example 3 (step 2). Compound obtained in the previous step (0.72 g, 1.10 mmol) was treated with trifluoroacetic acid (5 mL), and the resulting deprotected amine was treated with diisopropylethylamine (0.43 g, 3.30 mmol) and bis-THF activated carbonate (0.36 g, 1.33 mmol) to give the desired compound (0.73 g, 93%) as a yellow solid. $^1$H NMR (500 MHz, CDCl$_3$) δ 8.37 (d, J=8.5 Hz, 2H), 7.96 (d, J=9.0 Hz, 2H), 7.43-7.37 (m, 4H), 7.35-7.31 (m, 1H), 7.13 (d, J=8.5 Hz, 2H), 6.91 (d, J=8.5 Hz, 2H), 5.66 (d, J=5.0 Hz, 1H), 5.06-5.01 (m, 1H), 5.03 (s, 2H, overlapping), 4.84 (d, J=8.0 Hz, 1H), 3.95 (dd, J=9.5, 6.5 Hz, 1H). 3.88-3.79 (m, 3H), 3.74-3.67 (m, 2H), 3.45 (s, 1H), 3.19 (dd, J=15.5, 8.5 Hz, 1H), 3.14-3.04 (m, 2H), 3.00 (dd, J=14.0, 3.5 Hz, 1H), 2.90-2.89 (m, 2H, overlapping), 2.76 (dd, J=14.5, 9.0 Hz, 1H), 1.71-1.63 (m, 1H), 1.59-1.51 (m, 1H), 1.50-1.45 (m, 1H), 1.44-1.36 (m, 1H), 1.33-1.24 (m, 3H), 0.83 (td, J=7.5, 3.5 Hz, 6H) ppm; $^{13}$C NMR (125 MHz, CDCl$_3$) δ 157.90, 155.81, 150.31, 144.35, 136.96, 130.44, 129.46, 128.79, 128.73, 128.22, 127.58, 124.59, 115.21, 109.44, 73.84, 72.80, 70.89, 70.21, 69.71, 55.48, 54.47, 53.33, 45.52, 39.07, 34.95, 25.99, 23.10, 22.86, 10.69, 10.42 ppm; HRMS (ESI) m/z: [M+H]$^+$ calcd for C$_{36}$H$_{46}$N$_3$O$_{10}$S, 712.2899; found 712.2915.

Step 3—Synthesis of Compound (3R,3aS,6aR)-hexahydrofuro[2,3-b]furan-3-yl ((2S, 3R)-4-((4-amino-N-(2-ethylbutyl)phenyl)sulfonamido)-3-hydroxy-1-(4-hydroxyphenyl)butan-2-yl)carbamate

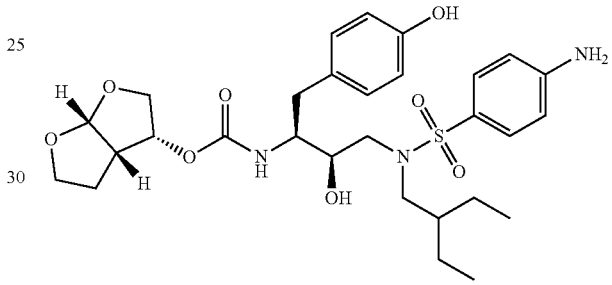

The same procedure was used as described for compound of Example 3 (step 3). Compound obtained in the previous step (0.73 g, 1.03 mmol) was treated with 10% palladium on activated charcoal (0.22 g) to give the desired compound (0.60 g, 98%) as a yellow solid. $^1$H NMR (500 MHz, CDCl$_3$) δ 7.53 (d, J=8.5 Hz, 2H), 7.07 (d, J=8.5 Hz, 2H), 6.73 (d, J=8.5 Hz, 2H), 6.69 (d, J=9.0 Hz, 2H), 5.66 (d, J=5.5 Hz, 1H), 5.14 (br s, 1H), 5.03 (q, J=6.0 Hz, 1H), 4.92 (d, J=8.5 Hz, 1H), 4.17 (br s, 2H), 3.95 (dd, J=9.5, 6.5 Hz, 1H), 3.89 (td, J=8.5, 2.5 Hz, 1H), 3.85-3.77 (m, 2H), 3.77-3.68 (m, 3H), 3.09 (dd, J=15.5, 8.5 Hz, 1H), 3.05-2.96 (m, 3H), 2.95-2.89 (m, 2H), 2.81 (dd, J=13.0, 6.0 Hz, 1H), 2.75 (dd, J=14.0, 8.0 Hz, 1H), 1.75-1.65 (m, 1H), 1.64-1.52 (m, 1H), 1.48-1.38 (m, 2H), 1.35-1.24 (m, 3H), 0.82 (td, J=7.0, 2.0 Hz, 6H) ppm; $^{13}$C NMR (125 MHz, CDCl$_3$) δ 155.66, 154.59, 150.89, 130.70, 129.72, 129.60, 125.95, 115.55, 114.30, 109.47, 73.62, 73.14, 70.96, 69.77, 55.26, 55.09, 53.95, 45.51, 39.32, 35.01, 25.98, 23.23, 22.92, 10.76, 10.44 ppm; HRMS (ESI) m/z: [M+H]$^+$ calcd for C$_{29}$H$_{42}$N$_3$O$_8$S, 592.2687; found 592.2700.

Step 4—Synthesis of the Title Compound

The same procedure was used as described for compound of Example 1 (step 5). Phenol obtained in the previous step (0.60 g, 1.02 mmol) was treated with cesium carbonate (0.50 g, 1.53 mmol) and phosphoryl triflate intermediate 1 (0.40 g, 1.32 mmol) to give the desired compound (0.58 g, 77%) as a white solid. $^1$H NMR (500 MHz, CDCl$_3$) δ 7.42 (d, J=8.5 Hz, 2H), 7.18 (d, J=8.5 Hz, 2H), 6.89 (d, J=9.0 Hz, 2H), 6.70 (d, J=8.5 Hz, 2H), 5.67 (d, J=5.0 Hz, 1H), 5.05 (q, J=6.5 Hz, 1H), 5.01 (d, J=9.0 Hz, 1H), 4.51 (br s, 2H), 4.30-4.17 (m, 6H), 3.99 (dd, J=9.5, 6.5 Hz, 1H), 3.91 (td, J=8.0, 2.5 Hz, 1H), 3.88-3.72 (m, 4H), 3.71 (dd, J=9.5, 7.0 Hz, 1H, overlapping), 3.07-2.93 (m, 4H), 2.81 (dd, J=14.0, 7.5 Hz, 1H), 2.70-2.63 (m, 2H), 1.80-1.67 (m, 2H), 1.50-1.33 (m, 8H), 1.32-1.22 (m, 3H), 0.82 (td, J=7.5, 4.0 Hz, 6H) ppm; $^{13}$C NMR (125 MHz, CDCl$_3$) δ 157.64, 157.53, 155.46, 151.23, 131.15, 130.65, 129.61, 125.42, 114.71, 114.13, 109.41, 73.55, 73.31, 70.92, 69.72, 63.25, 63.20, 63.07, 63.02, 61.69, 55.21, 55.09, 54.21, 45.40, 39.32, 34.99, 26.01, 23.29, 22.82, 16.66, 16.62, 10.80, 10.36 ppm; $^{31}$P NMR (202 MHz, CDCl$_3$) δ 6 19.27 ppm; HRMS (ESI) m/z: [M+H]$^+$ calcd for C$_{34}$H$_{53}$N$_3$O$_{11}$PS, 742.3133; found 742.3139.

Example 8

(3R,3aS,6aR)-hexahydrofuro[2,3-b]furan-3-yl ((2S, 3R)-1-(4-((diethoxyphosphoryl)methoxy)phenyl)-4-((N-(2-ethylbutyl)-4-methoxyphenyl)sulfonamido)-3-hydroxybutan-2-yl)carbamate

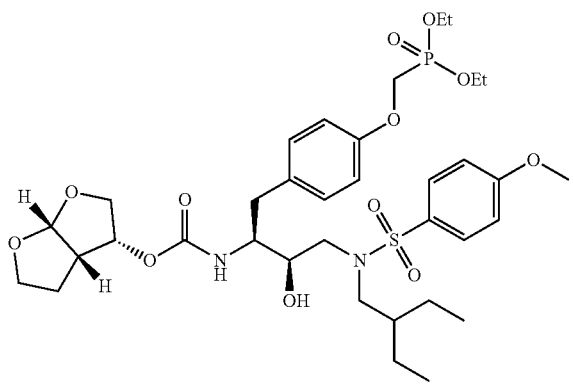 [SMILES: CCOP(=O)(COc1ccc(C[C@H](NC(=O)O[C@H]2CO[C@H]3OCC[C@H]32)[C@H](O)CN(CC(CC)CC)S(=O)(=O)c2ccc(OC)cc2)cc1)OCC]

Step 1—Synthesis of Compound tert-butyl ((2S, 3R)-1-(4-(benzyloxy)phenyl)-4-((N-(2-ethylbutyl)-4-methoxyphenyl)sulfonamido)-3-hydroxybutan-2-yl) carbamate

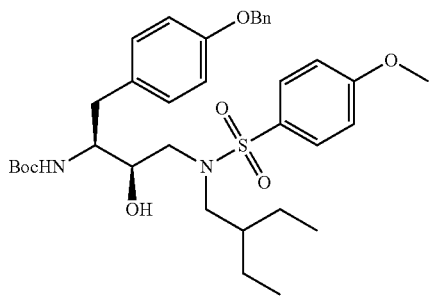 [SMILES: CCC(CC)CN(C[C@@H](O)[C@H](Cc1ccc(OCc2ccccc2)cc1)NC(=O)OC(C)(C)C)S(=O)(=O)c1ccc(OC)cc1]

The same procedure was used as described for compound of Example 3 (step 1). Amino alcohol prepared in Example 4 (step 1) (0.63 g, 1.34 mmol) was treated with sodium carbonate (0.28 g, 2.68 mmol) and 4-methoxybenzenesulfonyl chloride (0.33 g, 1.61 mmol) to give the desired compound (0.73 g, 85%) as a white solid. $^1$H NMR (500 MHz, CDCl$_3$) δ 6 7.70 (d, J=9.0 Hz, 2H), 7.45-7.41 (m, 2H), 7.40-7.36 (m, 2H), 7.34-7.30 (m, 1H), 7.16 (d, J=8.5 Hz, 2H), 6.97 (d, J=9.0 Hz, 2H), 6.92 (d, J=8.5 Hz, 2H), 5.04 (s, 2H), 4.58 (d, J=6.5 Hz, 1H), 3.92 (s, 1H), 3.85 (s, 3H), 3.77-3.67 (m, 2H), 3.11-2.96 (m, 3H), 2.93 (dd, J=14.0, 4.5 Hz, 1H), 2.89-2.79 (m, 2H, overlapping), 1.49-1.36 (m, 2H), 1.35 (s, 9H), 1.32-1.24 (m, 3H), 0.82 (td, J=7.5, 5.5 Hz, 6H) ppm; $^{13}$C NMR (125 MHz, CDCl$_3$) δ 163.15, 157.67, 156.13, 137.24, 130.74, 130.10, 129.91, 129.67, 128.73, 128.09, 127.59, 115.04, 114.47, 79.79, 72.97, 70.19, 55.75, 54.93, 54.67, 53.87, 39.12, 34.86, 28.43, 23.22, 22.89, 10.72, 10.45 ppm; HRMS (ESI) m/z: [M+H]$^+$ calcd for C$_{35}$H$_{49}$N$_2$O$_7$S, 641.3255; found 641.3258.

Step 2—Synthesis of Compound (3R,3aS,6aR)-hexahydrofuro[2,3-b]furan-3-yl ((2S,3R)-1-(4-(benzyloxy)phenyl)-4-((N-(2-ethylbutyl)-4-methoxyphenyl)sulfonamido)-3-hydroxybutan-2-yl)carbamate

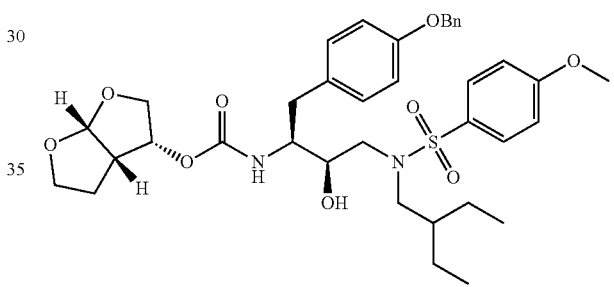

The same procedure was used as described for compound of Example 3 (step 2). Compound obtained in the previous step (0.72 g, 1.12 mmol) was treated with trifluoroacetic acid (5 mL), and the resulting deprotected amine was treated with diisopropylethylamine (0.48 g, 3.69 mmol) and bis-THF activated carbonate (0.37 g, 1.35 mmol) to give the desired compound (0.63 g, 81%) as a yellow solid. $^1$H NMR (500 MHz, CDCl$_3$) δ 6 7.70 (d, J=9.0 Hz, 2H), 7.44-7.36 (m, 4H), 7.35-7.30 (m, 1H), 7.13 (d, J=8.5 Hz, 2H), 6.99 (d, J=9.0 Hz, 2H), 6.90 (d, J=8.5 Hz, 2H), 5.65 (d, J=5.0 Hz, 1H), 5.05-5.00 (m, 1H), 5.02 (s, 2H, overlapping), 4.86 (d, J=9.0 Hz, 1H), 3.95 (dd, J=9.5, 6.5 Hz, 1H), 3.88-3.77 (m, 3H), 3.86 (s, 3H, overlapping), 3.74-3.67 (m, 3H), 3.12 (dd, J=15.5, 8.5 Hz, 1H), 3.08-2.98 (m, 2H), 2.96-2.87 (m, 2H), 2.84-2.74 (m, 2H), 1.69-1.58 (m, 1H), 1.56-1.50 (m, 1H), 1.48-1.37 (m, 2H), 1.35-1.24 (m, 3H), 0.82 (dt, J=7.0, 4.0 Hz, 6H) ppm; $^{13}$C NMR (125 MHz, CDCl$_3$) δ 163.30, 157.77, 155.62, 137.08, 130.54, 129.69, 128.77, 128.18, 127.57, 115.09, 114.56, 109.44, 73.60, 73.14, 70.86, 70.17, 69.74, 55.80, 55.20, 55.09, 53.96, 45.48, 39.32, 35.03, 25.96, 23.23, 22.90, 10.78, 10.43 ppm; HRMS (ESI) m/z: [M+H]$^+$ calcd for C$_{37}$H$_{49}$N$_2$O$_9$S, 697.3154; found 697.3158.

Step 3—Synthesis of Compound (3R,3aS,6aR)-hexahydrofuro[2,3-b]furan-3-yl ((2S,3R)-4-((N-(2-ethylbutyl)-4-methoxyphenyl)sulfonamido)-3-hydroxy-1-(4-hydroxyphenyl)butan-2-yl)carbamate

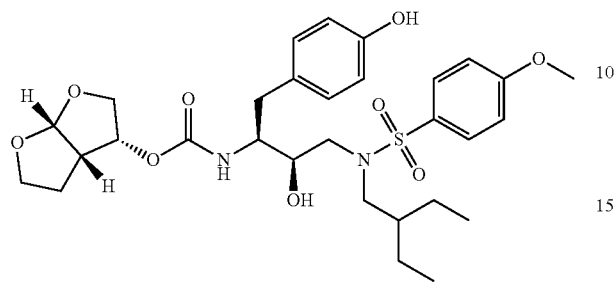

The same procedure was used as described for compound of Example 3 (step 3). Compound obtained in the previous step (0.63 g, 0.90 mmol) was treated with 10% palladium on activated charcoal (0.13 g) to give the desired compound (0.52 g, 95%) as a white solid. $^1$H NMR (500 MHz, CDCl$_3$) δ 7.71 (d, J=8.5 Hz, 2H), 7.08 (d, J=8.0 Hz, 2H), 7.00 (d, J=9.0 Hz, 2H), 6.74 (d, J=8.5 Hz, 2H), 5.66 (d, J=5.0 Hz, 1H), 5.07 (br s, 1H), 5.03 (q, J=6.5 Hz, 1H), 4.91 (d, J=8.5 Hz, 1H), 3.95 (dd, J=10.0, 6.5 Hz, 1H), 3.88 (td, J=8.5, 2.0 Hz, 1H), 3.88 (s, 3H, overlapping), 3.84-3.78 (m, 2H), 3.75-3.68 (m, 3H), 3.11 (dd, J=15.0, 8.0 Hz, 1H), 3.07-2.89 (m, 4H), 2.83 (dd, J=13.0, 6.0 Hz, 1H), 2.75 (dd, J=14.0, 8.5 Hz, 1H), 1.74-1.64 (m, 1H), 1.57-1.51 (m, 1H), 1.48-1.38 (m, 2H), 1.35-1.24 (m, 3H), 0.83 (td, J=7.5, 4.5 Hz, 6H) ppm; $^{13}$C NMR (125 MHz, CDCl$_3$) δ 163.30, 155.67, 154.55, 130.70, 129.68, 129.61, 129.52, 115.57, 114.57, 109.46, 73.65, 73.13, 70.91, 69.75, 55.81, 55.26, 55.08, 53.93, 45.51, 39.31, 34.98, 25.97, 23.22, 22.90, 10.77, 10.42 ppm; HRMS (ESI) m/z: [M+H]$^+$ calcd for C$_{30}$H$_{43}$N$_2$O$_9$S, 607.2684; found 607.2698.

Step 4—Synthesis of the Title Compound

The same procedure was used as described for compound of Example 1 (step 5). Phenol obtained in the previous step (0.52 g, 0.86 mmol) was treated with cesium carbonate (0.42 g, 1.29 mmol) and phosphoryl triflate intermediate 1 (0.34 g, 1.11 mmol) to give the desired compound (0.60 g, 92%) as a white solid. $^1$H NMR (500 MHz, CDCl$_3$) δ 6 7.71 (d, J=9.0 Hz, 2H), 7.15 (d, J=8.5 Hz, 2H), 6.99 (d, J=9.0 Hz, 2H), 6.88 (d, J=8.5 Hz, 2H), 5.65 (d, J=5.5 Hz, 1H), 5.02 (q, J=6.5 Hz, 1H), 4.85 (d, J=9.0 Hz, 1H), 4.27-4.20 (m, 6H), 3.96 (dd, J=9.5, 6.5 Hz, 1H), 3.90-3.85 (m, 1H), 3.88 (s, 3H, overlapping), 3.85-3.76 (m, 2H), 3.75-3.67 (m, 3H), 3.11 (dd, J=15.0, 8.0 Hz, 1H), 3.07-2.90 (m, 4H), 2.85-2.76 (m, 2H), 1.74-1.64 (m, 1H), 1.60-1.54 (m, 1H), 1.47-1.39 (m, 2H), 1.37 (t, J=7.0 Hz, 6H), 1.33-1.25 (m, 3H), 0.82 (td, J=7.0, 2.5 Hz, 6H) ppm; $^{13}$C NMR (125 MHz, CDCl$_3$) δ 163.32, 157.76, 157.65, 155.59, 130.89, 130.63, 129.68, 129.52, 114.78, 114.57, 109.42, 73.63, 73.07, 70.88, 69.69, 63.14, 63.07, 63.02, 61.78, 55.82, 55.17, 55.08, 53.93, 45.45, 39.32, 34.94, 25.98, 23.21, 22.91, 16.65, 16.61, 10.77, 10.44 ppm; $^{31}$P NMR (202 MHz, CDCl$_3$) δ 19.22 ppm; HRMS (ESI) m/z: [M+H]$^+$ calcd for C$_{35}$H$_{54}$N$_2$O$_{12}$PS, 757.3130; found 757.3140.

Example 9

(3R,3aS,6aR)-hexahydrofuro[2,3-b]furan-3-yl ((2S,3R)-1-(4-((diethoxyphosphoryl)methoxy)phenyl)-3-hydroxy-4-(N-isobutylbenzo[d][1,3]dioxole-5-sulfonamido)butan-2-yl)carbamate

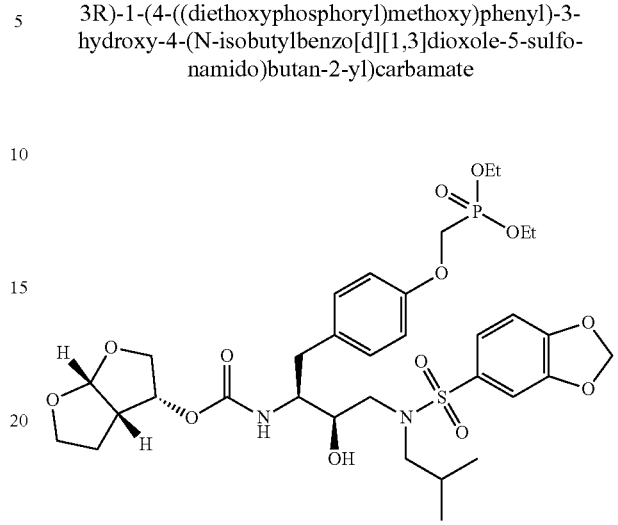

Step 1—Synthesis of compound benzyl ((2R,3S)-4-(4-(benzyloxy)phenyl)-3-((tert-butoxycarbonyl)amino)-2-hydroxybutyl)(isobutyl)carbamate

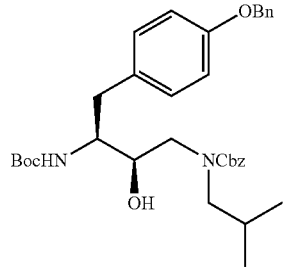 [SMILES: CC(C)CN(C[C@@H](O)[C@H](Cc1ccc(OCc2ccccc2)cc1)NC(=O)OC(C)(C)C)C(=O)OCc1ccccc1]

The same procedure was used as described for compound of Example 12 (step 1). Amino alcohol obtained in Example 2 (step 1) (5.04 g, 11.38 mmol) was treated with triethylamine (2.30 g, 22.76 mmol) and benzylchloroformate (2.52 g, 14.77 mmol) to give the desired compound (4.00 g, 61%) as a white solid. $^1$H NMR (500 MHz, CDCl$_3$) δ 7.45-7.41 (m, 2H), 7.40-7.29 (m, 8H), 7.15 (d, J=7.5 Hz, 2H), 6.91 (d, J=8.0 Hz, 2H), 5.15 (s, 2H), 5.04 (s, 2H), 4.65 (br s, 1H), 4.47 (br s, 1H), 3.81-3.68 (m, 2H), 3.58-3.47 (m, 1H), 3.35-3.06 (m, 3H), 2.95-2.68 (m, 2H), 1.95-1.81 (m, 1H), 1.37 (s, 9H), 0.91-0.81 (m, 6H) ppm; $^{13}$C NMR (125 MHz, CDCl$_3$) δ 6 158.85, 157.59, 156.08, 137.26, 136.51, 130.69, 130.22, 128.68, 128.64, 128.20, 128.03, 127.96, 127.56, 114.94, 79.60, 73.96, 70.14, 67.71, 56.01, 54.96, 52.31, 34.96, 28.40, 27.60, 20.15, 20.06 ppm; HRMS (ESI) m/z: [M+H]$^+$ calcd for C$_{34}$H$_{45}$N$_2$O$_6$, 577.3272; found 577.3261.

Step 2—Synthesis of Compound benzyl ((2R,3S)-4-(4-(benzyloxy)phenyl)-3-(((((3R, 3aS, 6aR)-hexahydrofuro[2,3-b]furan-3-yl) oxy)carbonyl)amino)-2-hydroxybutyl)(isobutyl)carbamate

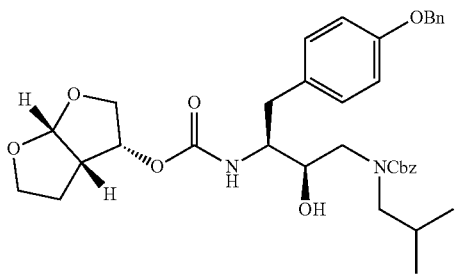 [SMILES: CC(C)CN(C[C@@H](O)[C@H](Cc1ccc(OCc2ccccc2)cc1)NC(=O)O[C@H]1CO[C@H]2OCC[C@H]21)C(=O)OCc1ccccc1]

The same procedure was used as described for compound of Example 3 (step 2). Compound obtained in the previous step (5.50 g, 9.53 mmol) was treated with trifluoroacetic acid (15 mL), and the resulting deprotected amine was treated with diisopropylethylamine (4.92 g, 38.12 mmol) and bis-THF activated carbonate (3.10 g, 11.44 mmol) to give the desired compound (3.00 g, 50%) as a yellow solid. $^1$H NMR (500 MHz, CDCl$_3$) δ 6 7.44-7.30 (m, 10H), 7.11 (d, J=7.0 Hz, 2H), 6.88 (d, J=8.5 Hz, 2H), 5.65 (d, J=5.5 Hz, 1H), 5.15 (s, 2H), 5.06-4.97 (m, 2H), 5.02 (s, 2H, overlapping), 4.24 (br s, 1H), 3.96 (dd, J=9.0, 6.5 Hz, 1H), 3.91-3.81 (m, 3H), 3.74-3.66 (m, 2H), 3.60 (dd, J=14.5, 9.5 Hz, 1H), 3.21 (d, J=14.5 Hz, 1H), 3.16-3.05 (m, 2H), 2.98-2.87 (m, 2H), 2.79-2.70 (m, 1H), 1.94-1.82 (m, 1H), 1.69-1.58 (m, 1H), 1.57-1.49 (m, 1H), 0.86 (d, J=6.0 Hz, 6H) ppm; $^{13}$C NMR (125 MHz, CDCl$_3$) δ 159.02, 157.69, 155.60, 137.10, 136.37, 130.47, 130.00, 128.74, 128.70, 128.31, 128.14, 128.02, 127.55, 114.98, 109.43, 74.01, 73.47, 70.93, 70.14, 69.73, 67.88, 56.14, 55.61, 52.45, 45.51, 34.71, 27.68, 25.96, 20.15, 20.07 ppm; HRMS (ESI) m/z: [M+H]$^+$ calcd for C$_{36}$H$_{45}$N$_2$O$_8$, 633.3171; found 633.3165.

Step 3—Synthesis of Compound tert-butyl ((2R, 3S)-3-(((((3R,3aS,6aR)-hexahydrofuro[2,3-b]furan-3-yl)oxy)carbonyl)amino)-2-hydroxy-4-(4-hydroxyphenyl)butyl)(isobutyl)carbamate

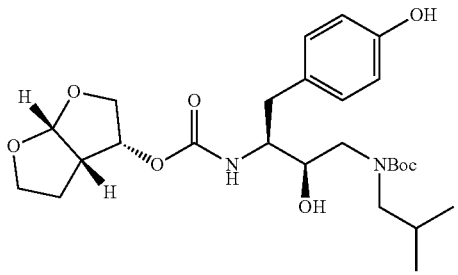 [SMILES: CC(C)CN(C[C@@H](O)[C@H](Cc1ccc(O)cc1)NC(=O)O[C@H]1CO[C@H]2OCC[C@H]21)C(=O)OC(C)(C)C]

The same procedure was used as described for compound of Example 12 (step 3). Compound obtained in the previous step (1.00 g, 1.58 mmol) was treated with palladium hydroxide (0.25 g) and H$_2$ gas, and the resulting deprotected amine was treated with sodium carbonate (0.20 g, 1.90 mmol) and di-tert-butyl dicarbonate (0.41 g, 1.90 mmol) to give the desired compound (0.90 g, 77%) as a white solid. $^1$H NMR (500 MHz, CDCl$_3$) δ 7.04 (d, J=8.5 Hz, 2H), 6.71 (d, J=8.0 Hz, 2H), 6.01 (br s, 1H), 5.65 (d, J=5.0 Hz, 1H), 5.19 (d, J=6.5 Hz, 1H), 5.03 (q, J=7.5 Hz, 1H), 4.56 (br s, 1H), 3.95 (dd, J=9.5, 6.5 Hz, 1H), 3.89-3.80 (m, 3H), 3.75-3.66 (m, 2H), 3.63-3.53 (m, 1H), 3.14 (d, J=14.0 Hz, 1H), 3.04 (d, J=6.5 Hz, 2H), 2.95-2.87 (m, 2H), 2.70 (dd, J=13.5, 9.5 Hz, 1H), 1.93-1.80 (m, 1H), 1.71-1.61 (m, 1H), 1.55-1.43 (m, 1H), 1.47 (s, 9H, overlapping), 0.88 (d, J=5.0 Hz, 3H), 0.87 (d, J=5.0 Hz, 3H) ppm; $^{13}$C NMR (125 MHz, CDCl$_3$) δ 158.70, 155.69, 154.81, 130.56, 129.53, 115.47, 109.47, 80.99, 74.08, 73.53, 71.04, 69.76, 56.50, 55.82, 51.93, 45.59, 34.62, 28.50, 27.84, 26.01, 20.23, 20.15 ppm; HRMS (ESI) m/z: [M+H]$^+$ calcd for C$_{26}$H$_{41}$N$_2$O$_8$, 509.2858.

Step 4—Synthesis of Compound tert-butyl ((2R, 3S)-4-(4-((diethoxyphosphoryl)methoxy)phenyl)-3-(((((3R,3aS,6aR)-hexahydrofuro[2,3-b]furan-3-yl)oxy)carbonyl)amino)-2-hydroxybutyl)(isobutyl)carbamate

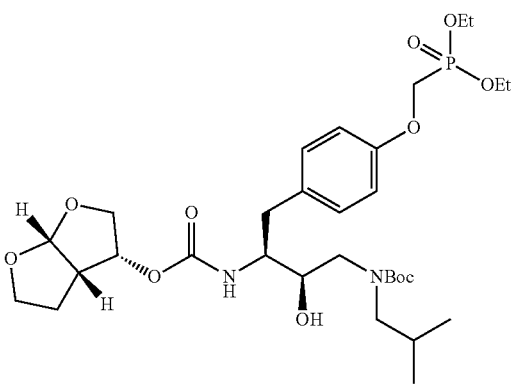 [SMILES: CCOP(=O)(COc1ccc(C[C@H](NC(=O)O[C@H]2CO[C@H]3OCC[C@H]32)[C@H](O)CN(CC(C)C)C(=O)OC(C)(C)C)cc1)OCC]

The same procedure was used as described for compound of Example 1 (step 5). Phenol obtained in the previous step (0.50 g, 0.98 mmol) was treated with cesium carbonate (0.48 g, 1.47 mmol) and phosphoryl triflate intermediate 1 (0.38 g, 1.28 mmol) to give the desired compound (0.81 g, 82%) as a white solid. $^1$H NMR (500 MHz, CDCl$_3$) δ 7.13 (d, J=8.5 Hz, 2H), 6.86 (d, J=8.5 Hz, 2H), 5.64 (d, J=5.0 Hz, 1H), 5.09-4.98 (m, 2H), 4.60 (br s, 1H), 4.26-4.18 (m, 6H), 3.96 (dd, J=9.5, 6.5 Hz, 1H), 3.89-3.78 (m, 3H), 3.75-3.66 (m, 2H), 3.63-3.54 (m, 1H), 3.12-2.98 (m, 3H), 2.96-2.88 (m, 2H), 2.74 (dd, J=13.5, 9.5 Hz, 1H), 1.91-1.78 (m, 1H), 1.71-1.61 (m, 1H), 1.59-1.51 (m, 1H), 1.46 (s, 9H), 1.36 (t, J=7.0 Hz, 6H), 0.87 (d, J=5.0 Hz, 3H), 0.86 (d, J=5.0 Hz, 3H) ppm; $^{13}$C NMR (125 MHz, CDCl$_3$) δ 158.70. 157.61, 157.50, 155.48, 131.30, 130.54, 114.62, 109.40, 80.89, 74.18, 73.40, 70.93, 69.67, 63.08, 63.05, 63.00, 61.72, 56.48, 55.60, 53.55, 51.97, 45.46, 34.55, 28.48, 27.84, 25.96, 20.21, 20.14, 16.62, 16.57 ppm; $^{31}$P NMR (202 MHz, CDCl$_3$) δ 19.28 ppm; HRMS (ESI) m/z: [M+H]$^+$ calcd for C$_{31}$H$_{52}$N$_2$O$_{11}$P, 659.3303; found 659.3304.

Step 5—Synthesis of the Title Compound

A solution of the compound obtain in the previous step (0.15 g, 0.228 mmol) in dichloromethane (2 mL) was treated with trifluoroacetic acid (2 mL). After stirring at room temperature for 1 h, the reaction was concentrated under reduced pressure. The residue was taken up in chloroform and concentrated and dried under reduced pressure to give the deprotected amine. The deprotected amine in ethyl acetate (5 mL) was treated with a solution of sodium carbonate (0.048 g, 0.456 mmol) in water (5 mL) followed by benzodiaxazole-3-sulfonyl chloride (0.065 g, 0.296 mmol). The biphasic reaction mixture was stirred at room temperature overnight. The layers were separated and aqueous layer was extracted with ethyl acetate (2×10 mL). The organic portions were washed with saturated aqueous NaCl solution (10 mL), dried ($Na_2SO_4$), filtered, and concentrated under reduced pressure. The residue was purified by automated flash chromatography using a silica gel column (RediSep Gold, 15 g, gradient elution with 0-10% MeOH/dichloromethane), to give the desired compound (0.140 g, 83%) as a white solid. $^1$H NMR (500 MHz, CDCl$_3$) δ 7.32 (dd, J=8.5, 2.0 Hz, 1H), 7.17-7.12 (m, 3H), 6.91-6.86 (m, 3H), 6.09 (s, 2H), 5.65 (d, J=5.0 Hz, 1H), 5.03 (q, J=6.5 Hz, 1H), 4.99 (d, J=9.0 Hz, 1H, overlapping), 4.27-4.19 (m, 6H), 3.96 (dd, J=9.5, 6.5 Hz, 1H), 3.88 (dd, J=8.5, 2.5 Hz, 1H), 3.86-3.78 (m, 2H), 3.75-3.67 (m, 2H), 3.64 (br s, 1H), 3.11 (dd, J=15.5, 8.5 Hz, 1H), 3.04-2.89 (m, 4H), 2.83-2.73 (m, 2H), 1.83 (sept, J=6.5 Hz, 1H), 1.73-1.63 (m, 1H), 1.60-1.53 (m, 1H), 1.36 (t, J=7.5 Hz, 6H), 0.92 (d, J=6.5 Hz, 3H), 0.88 (d, J=6.5 Hz, 3H) ppm; $^{13}$C NMR (125 MHz, CDCl$_3$) δ 157.70, 157.59, 155.60, 151.72, 148.49, 131.46, 130.98, 130.57, 123.24, 114.73, 109.39, 108.53, 107.61, 102.55, 73.59, 72.91, 70.90, 69.68, 63.06, 63.01, 61.72, 59.03, 55.28, 53.95, 45.44, 34.82, 27.41, 25.96, 20.27, 20.02, 16.62, 16.58 ppm; $^{31}$P NMR δ 19.24 ppm; HRMS (ESI) m/z: [M+H]$^+$ calcd for $C_{33}H_{48}N_2O_{13}PS$, 743.2609; found 743.2623.

Example 10

Synthesis of Compound (3R,3aS,6aR)-hexahydrofuro[2,3-b]furan-3-yl ((2S,3R)-1-(4-((diethoxyphosphoryl)methoxy)phenyl)-3-hydroxy-4-(N-isobutyl-benzo[d]thiazole-6-sulfonamido)butan-2-yl)carbamate

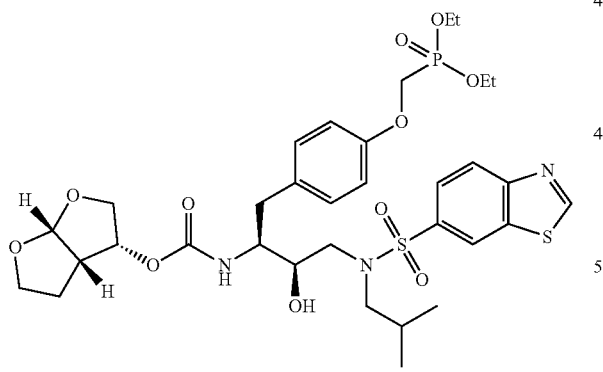

The same procedure was used as described for compound of Example 9 (step 5). Compound obtained in Example 8 (step 4) (0.15 g, 0.23 mmol) was treated with trifluoroacetic acid (2 mL), and the resulting deprotected amine was treated with sodium carbonate (0.063 g, 0.600 mmol) and 1,3-benzothiazole-6-sulfonyl chloride (0.069 g, 0.30 mmol) to give the desired compound (0.14 g, 81%) as a white solid. $^1$H NMR (500 MHz, CDCl$_3$) δ 9.20 (s, 1H), 8.45 (d, J=1.5 Hz, 1H), 8.23 (d, J=8.5 Hz, 1H), 7.88 (dd, J=8.5, 1.5 Hz, 1H), 7.12 (d, J=8.5 Hz, 2H), 6.84 (d, J=8.5 Hz, 2H), 5.62 (d, J=5.5 Hz, 1H), 5.15 (d, J=9.0 Hz, 1H), 4.99 (q, J=6.0 Hz, 1H), 4.25-4.17 (m, 6H), 3.91 (dd, J=10.0, 6.5 Hz, 1H), 3.89-3.80 (m, 3H, overlapping), 3.76 (d, J=3.0 Hz, 1H), 3.70-3.64 (m, 2H), 3.19 (dd, J=15.0, 8.0 Hz, 1H), 3.13 (dd, J=14.5, 2.0 Hz, 1H, overlapping), 3.04-2.97 (m, 2H), 2.95-2.85 (m, 2H), 2.74 (dd, J=14.5, 9.5 Hz, 1H), 1.86 (sept, J=7.0 Hz, 1H), 1.68-1.58 (m, 1H), 1.52-1.45 (m, 1H), 1.34 (t, J=7.0 Hz, 6H), 0.89 (d, J=6.5 Hz, 3H), 0.87 (d, J=6.5 Hz, 3H) ppm; $^{13}$C NMR (125 MHz, CDCl$_3$) δ 158.21, 157.61, 157.50, 155.67, 155.62, 135.79, 134.48, 131.00, 130.50, 124.90, 124.47, 122.34, 114.64, 109.36, 73.54, 72.75, 70.92, 69.61, 63.05, 63.00, 61.66, 58.65, 55.39, 53.55, 45.48, 34.65, 27.28, 25.92, 20.19, 20.00, 16.57, 16.53 ppm; $^{31}$P NMR (202 MHz, CDCl$_3$) δ 19.20 ppm; HRMS (ESI) m/z: [M+H]$^+$ calcd for $C_{33}H_{47}N_3O_{11}PS_2$, 756.2384; found 756.2392.

Example 11

Synthesis of Compound (3R,3aS,6aR)-hexahydrofuro[2,3-b]furan-3-yl ((2S,3R)-1-(4-((diethoxyphosphoryl)methoxy)phenyl)-3-hydroxy-4-(N—((S)-2-methylbutyl)benzo[d]thiazole-6-sulfonamido)butan-2-yl)carbamate

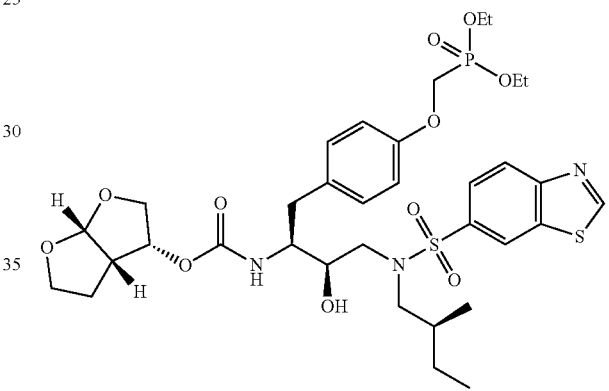

Step 1—Synthesis of Compound benzyl ((2R,3S)-4-(4-(benzyloxy)phenyl)-3-((tert-butoxycarbonyl)amino)-2-hydroxybutyl)((S)-2-methylbutyl)carbamate

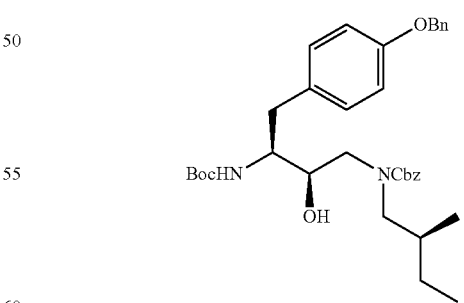

The same procedure was used as described for compound of Example 12 (step 1). Amino alcohol obtained in Example 1 (step 1) (2.28 g, 5.00 mmol) was treated with triethylamine (1.01 g, 10.00 mmol) and benzylchloroformate (1.11 g, 6.50 mmol) to give the desired compound (1.9 g, 64%) as a white solid. $^1$H NMR (500 MHz, CDCl$_3$) δ 6 7.44-7.41 (m, 2H), 7.40-7.29 (m, 8H), 7.15 (d, J=7.5 Hz, 2H), 6.91 (d, J=8.0 Hz, 2H), 5.14 (s, 2H), 5.04 (s, 2H), 4.62 (br s, 1H), 4.48 (br s, 1H), 3.81-3.66 (m, 2H), 3.57-3.47 (m, 1H), 3.29 (d, J=14.0 Hz, 1H), 3.18 (dd, J=13.5, 6.5 Hz, 1H), 3.09 (dd, J=13.5, 7.5 Hz, 1H), 2.94-2.68 (m, 2H), 1.71-1.59 (m, 1H), 1.42-1.28 (m, 1H), 1.36 (s, 9H, overlapping), 1.13-0.98 (m, 1H), 0.92-0.76 (m, 6H) ppm; $^{13}$C NMR (125 MHz, CDCl$_3$) δ 6 158.92, 157.62, 156.11, 137.26, 136.50, 130.71, 130.19, 128.70, 128.64, 128.22, 128.05, 127.58, 127.11, 114.96, 79.62, 73.94, 70.16, 67.74, 65.50, 54.93, 54.62, 52.28, 34.98, 33.98, 28.42, 26.87, 16.95, 11.39 ppm; HRMS (ESI) m/z: [M+H]$^+$ calcd for C$_{35}$H$_{47}$N$_2$O$_6$, 591.3429; found 591.3419.

Step 2—Synthesis of Compound benzyl ((2R,3S)-4-(4-(benzyloxy)phenyl)-3-(((((3R,3aS,6aR)-hexahydrofuro[2,3-b]furan-3-yl)oxy)carbonyl)amino)-2-hydroxybutyl)((S)-2-methylbutyl)carbamate

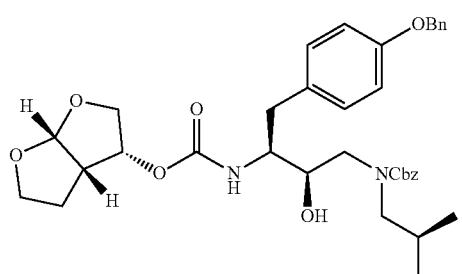

The same procedure was used as described for compound of Example 3 (step 2). Compound obtained in the previous step (1.09 g, 3.22 mmol) was treated with trifluoroacetic acid (8 mL), and the resulting deprotected amine was treated with diisopropylethylamine (1.66 g, 12.86 mmol) and bis-THF activated carbonate (1.05 g, 3.86 mmol) to give the desired compound (1.55 g, 75%) as a yellow solid. $^1$H NMR (500 MHz, CDCl$_3$) δ 6 7.44-7.30 (m, 10H), 7.11 (d, J=7.0 Hz, 2H), 6.88 (d, J=8.5 Hz, 2H), 5.65 (d, J=5.0 Hz, 1H), 5.15 (s, 2H), 5.10-5.00 (m, 2H), 5.02 (s, 2H, overlapping), 4.27 (br s, 1H), 3.95 (dd, J=9.5, 6.5 Hz, 1H), 3.91-3.81 (m, 3H), 3.74-3.66 (m, 2H), 3.57 (dd, J=14.0, 8.5 Hz, 1H), 3.30-3.15 (m, 2H), 3.11 (dd, J=13.5, 7.5 Hz, 1H), 2.99-2.86 (m, 2H), 2.78-2.70 (m, 1H), 1.69-1.57 (m, 2H), 1.56-1.46 (m, 1H), 1.40-1.29 (m, 1H), 1.13-1.00 (m, 1H), 0.89-0.80 (m, 6H) ppm; $^{13}$C NMR (125 MHz, CDCl$_3$) δ 158.93, 157.66, 155.58, 137.10, 136.36, 130.47, 130.01, 128.72, 128.66, 128.29, 128.12, 128.03, 127.53, 114.95, 109.43, 73.89, 73.44, 70.92, 70.12, 69.71, 67.85, 55.60, 54.63, 52.27, 45.52, 34.73, 33.99, 26.83, 25.95, 16.96, 11.36 ppm; HRMS (ESI) m/z: [M+H]$^+$ calcd for C$_{37}$H$_{47}$N$_2$O$_8$, 647.3327; found 647.3326.

Step 3—Synthesis of Compound tert-butyl ((2R,3S)-3-(((((3R,3aS,6aR)-hexahydrofuro[2,3-b]furan-3-yl)oxy)carbonyl)amino)-2-hydroxy-4-(4-hydroxyphenyl)butyl)((S)-2-methylbutyl)carbamate

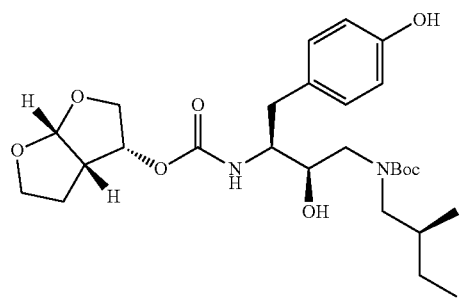 [SMILES: CC[C@H](C)CN(C[C@@H](O)[C@H](Cc1ccc(O)cc1)NC(=O)O[C@H]1CO[C@H]2OCC[C@H]21)C(=O)OC(C)(C)C]

The same procedure was used as described for compound of Example 12 (step 3). Compound obtained in the previous step (0.95 g, 1.47 mmol) was treated with palladium hydroxide (0.24 g) and H$_2$ gas, and the resulting deprotected amine was treated with sodium carbonate (0.19 g, 1.76 mmol) and di-tert-butyl decarbonate (0.38 g, 1.76 mmol) to give the desired compound (0.70 g, 91%) as a white solid. $^1$H NMR (500 MHz, CDCl$_3$) δ 7.05 (d, J=8.0 Hz, 2H), 6.72 (d, J=8.5 Hz, 2H), 5.65 (d, J=5.5 Hz, 1H), 5.09 (d, J=6.5 Hz, 1H), 5.04 (q, J=6.5 Hz, 1H), 3.96 (dd, J=10.0, 6.5 Hz, 1H), 3.90-3.79 (m, 3H), 3.75-3.67 (m, 2H), 3.62-3.53 (m, 1H), 3.17-3.08 (m, 2H), 3.06-2.98 (m, 1H), 2.95-2.88 (m, 2H), 2.72 (dd, J=13.5, 9.5 Hz, 1H), 1.73-1.58 (m, 2H), 1.57-1.50 (m, 1H), 1.47 (s, 9H), 1.41-1.32 (m, 1H), 1.14-1.04 (m, 1H), 0.89 (t, J=7.5 Hz, 3H), 0.84 (d, J=6.5 Hz, 3H) ppm; $^{13}$C NMR (125 MHz, CDCl$_3$) δ 158.80, 155.63, 154.63, 130.61, 129.74, 115.46, 109.47, 80.98, 74.10, 73.52, 71.00, 69.76, 55.73, 54.98, 51.92, 45.56, 34.66, 34.15, 28.52, 26.91, 26.00, 17.05, 11.43 ppm; HRMS (ESI) m/z: [M+H]$^+$ calcd for C$_{27}$H$_{43}$N$_2$O$_8$, 523.3014; found 523.3006.

Step 4—Synthesis of Compound tert-butyl ((2R,3S)-4-(4-((diethoxyphosphoryl)methoxy)phenyl)-3-(((((3R,3aS,6aR)-hexahydrofuro[2,3-b]furan-3-yl)oxy)carbonyl)amino)-2-hydroxybutyl)((S)-2-methylbutyl)carbamate

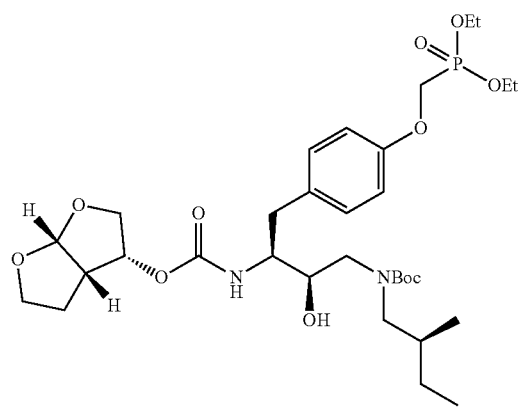 [SMILES: CCOP(=O)(COc1ccc(C[C@H](NC(=O)O[C@H]2CO[C@H]3OCC[C@H]32)[C@H](O)CN(C[C@@H](C)CC)C(=O)OC(C)(C)C)cc1)OCC]

The same procedure was used as described for compound of Example 1 (step 5). Phenol obtained in the previous step (0.28 g, 0.53 mmol) was treated with cesium carbonate (0.26 g, 0.80 mmol) and phosphoryl triflate intermediate 1 (0.21 g, 0.70 mmol) to give the desired compound (0.30 g, 83%) as a white solid. $^1$H NMR (500 MHz, CDCl$_3$) δ δ 7.12 (d, J=8.5 Hz, 2H), 6.85 (d, J=8.5 Hz, 2H), 5.63 (d, J=5.5 Hz, 1H), 5.08-4.98 (m, 2H), 4.25-4.17 (m, 6H), 3.94 (dd, J=9.5, 6.0 Hz, 1H), 3.88-3.80 (m, 2H), 3.79-3.73 (m, 1H), 3.72-3.65 (m, 2H), 3.60-3.50 (m, 1H), 3.15-3.03 (m, 3H), 2.97-2.87 (m, 2H), 2.72 (dd, J=14.0, 9.5 Hz, 1H), 1.70-1.60 (m, 1H), 1.57-1.50 (m, 1H), 1.45 (s, 9H), 1.35 (t, J=7.0 Hz, 6H), 1.34-1.18 (m, 3H), 0.83 (td, J=7.5, 3.0 Hz, 6H) ppm; $^{13}$C NMR (125 MHz, CDCl$_3$) δ 158.70, 157.57, 157.46, 155.45, 131.28, 130.54, 114.58, 109.37, 80.90, 74.20, 73.36, 70.87, 69.64, 63.04, 63.02, 62.97, 61.69, 55.51, 52.24, 51.91, 47.81, 45.44, 39.78, 34.63, 28.48, 25.93, 23.14, 23.07, 16.59, 16.54, 10.78, 10.67 ppm; $^{31}$P NMR (202 MHz, CDCl$_3$) δ 19.26 ppm; HRMS (ESI) m/z: [M+H]$^+$ calcd for C$_{32}$H$_{54}$N$_2$O$_{11}$P, 673.3460.

Step 5—Synthesis of the Title Compound

The same procedure was used as described for compound of Example 9 (step 5). Compound obtained in the previous step (0.300 g, 0.446 mmol) was treated with trifluoroacetic acid (2 mL), and the resulting deprotected amine was treated with sodium carbonate (0.095 g, 0.892 mmol) and 1,3-benzothiazole-6-sulfonyl chloride (0.135 g, 0.580 mmol) to give the desired compound (0.26 g, 75%) as a white solid. $^1$H NMR (500 MHz, CDCl$_3$) δ δ 9.20 (s, 1H), 8.45 (d, J=1.5 Hz, 1H), 8.22 (d, J=8.5 Hz, 1H), 7.87 (dd, J=8.5, 1.5 Hz, 1H), 7.12 (d, J=8.5 Hz, 2H), 6.83 (d, J=8.5 Hz, 2H), 5.60 (d, J=5.0 Hz, 1H), 5.17 (d, J=8.5 Hz, 1H), 4.98 (q, J=6.5 Hz, 1H), 4.24-4.16 (m, 6H), 3.89 (dd, J=9.5, 6.0 Hz, 1H), 3.86-3.78 (m, 4H), 3.69-3.62 (m, 2H), 3.18-3.09 (m, 2H), 3.08-2.93 (m, 3H), 2.91-2.84 (m, 1H), 2.73 (dd, J=13.5, 9.0 Hz, 1H), 1.67-1.56 (m, 1H), 1.52-1.42 (m, 2H), 1.33 (t, J=7.0 Hz, 6H), 1.31-1.23 (m, 2H), 0.78 (td, J=7.5, 2.5 Hz, 6H) ppm; $^{13}$C NMR (125 MHz, CDCl$_3$) δ 158.21, 157.78, 157.67, 155.83, 155.66, 135.45, 134.61, 130.58, 124.98, 124.63, 122.46, 114.80, 109.40, 73.70, 73.02, 70.84, 69.67, 63.12, 63.08, 63.03, 61.76, 55.29, 55.01, 53.84, 45.46, 39.29, 34.89, 25.96, 23.16, 22.89, 16.65, 16.60, 10.74, 10.42 ppm; $^{31}$P NMR (202 MHz, CDCl$_3$) δ 19.18 ppm; HRMS (ESI) m/z: [M+H]$^+$ calcd for C$_{34}$H$_{49}$N$_3$O$_{11}$PS$_2$, 770.2541

Example 12

Synthesis of Compound (3R,3aS,6aR)-hexahydrofuro[2,3-b]furan-3-yl ((2S,3R)-1-(4-((diethoxyphosphoryl)methoxy)phenyl)-4-(N-(2-ethylbutyl)benzo[d]thiazole-6-sulfonamido)-3-hydroxybutan-2-yl)carbamate

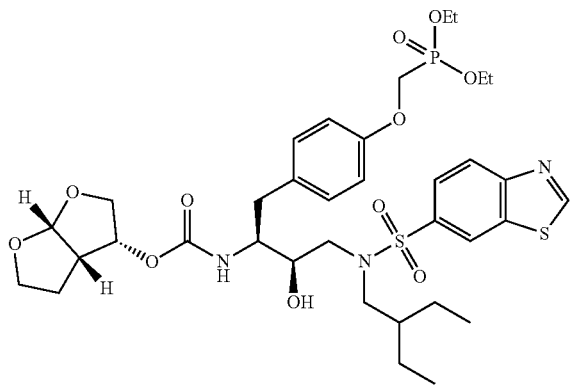 [SMILES: CCOP(=O)(COc1ccc(C[C@H](NC(=O)O[C@H]2CO[C@H]3OCC[C@H]32)[C@H](O)CN(CC(CC)CC)S(=O)(=O)c2ccc3ncsc3c2)cc1)OCC]

Step 1—Synthesis of Compound benzyl ((2R,3S)-4-(4-(benzyloxy)phenyl)-3-((tert-butoxycarbonyl)amino)-2-hydroxybutyl)(2-ethylbutyl)carbamate

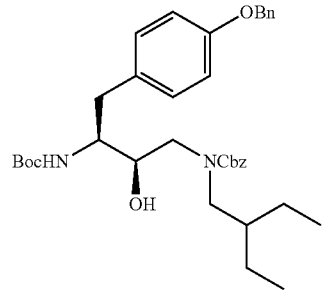 [SMILES: CCC(CC)CN(C[C@@H](O)[C@H](Cc1ccc(OCc2ccccc2)cc1)NC(=O)OC(C)(C)C)C(=O)OCc1ccccc1]

A solution of compound obtained in Example 4 (step 1) (4.22 g, 8.98) and triethylamine (1.82 g, 17.97 mmol) in dichloromethane (50 mL) was cooled to 0° C. and benzylchloroformate (1.99 g, 11.68 mmol) was added dropwise. The reaction was stirred at room temperature for 15 h. The reaction was diluted with dichloromethane (150 mL) and washed with saturated NaHCO$_3$ solution (50 mL), water (50 mL) and saturated NaCl solution (50 mL). The solution was dried over sodium sulfate, filtered and concentrated under reduced pressure. The residue was purified by automated flash chromatography using a silica gel column (RediSep Gold, 40 g, gradient elution with 0-100% EtOAc/Hexane), to give the desired compound (2.87 g, 53%) as a white solid. $^1$H NMR (500 MHz, CDCl$_3$) δ δ 7.45-7.41 (m, 2H), 7.41-7.29 (m, 8H), 7.15 (d, J=7.5 Hz, 2H), 6.91 (d, J=8.0 Hz, 2H), 5.15 (s, 2H), 5.04 (s, 2H), 4.63 (br s, 1H), 4.54 (br s, 1H), 3.82-3.68 (m, 2H), 3.56-3.46 (m, 1H), 3.36-3.14 (m, 3H), 2.96-2.76 (m, 2H), 1.54-1.44 (m, 1H), 1.36 (s, 9H), 1.31-1.17 (m, 4H), 0.90-0.75 (m, 6H) ppm; $^{13}$C NMR (125 MHz, CDCl$_3$) δ δ 158.89, 157.60, 156.09, 137.25, 136.43, 130.70, 130.19, 128.61, 128.23, 128.12, 128.03, 127.71, 127.56, 127.07, 114.94, 79.61, 73.98, 67.76, 65.41, 54.96, 52.26, 52.01, 39.65, 35.05, 28.40, 23.16, 23.12, 10.69 ppm; HRMS (ESI) m/z: [M+H]$^+$ calcd for $C_{36}H_{49}N_2O_6$, 605.3585; found 605.3573.

Step 2—Synthesis of Compound benzyl ((2R,3S)-4-(4-(benzyloxy)phenyl)-3-(((((3R, 3aS, 6aR)-hexahydrofuro[2,3-b]furan-3-yl) oxy)carbonyl)amino)-2-hydroxybutyl)(2-ethylbutyl)carbamate

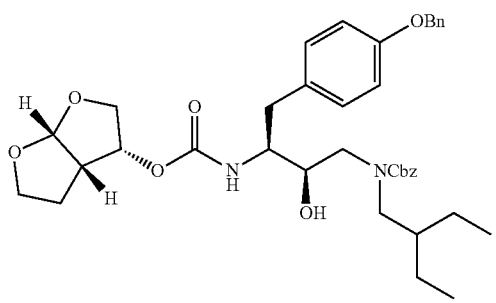

The same procedure was used as described for compound of Example 3 (step 2). Compound obtained in the previous step (2.87 g, 4.75 mmol) was treated with trifluoroacetic acid (10 mL), and the resulting deprotected amine was treated with diisopropylethylamine (2.45 g, 18.98 mmol) and bis-THF activated carbonate (1.54 g, 5.69 mmol) to give the target compound (2.1 g, 67%) as a white solid. $^1$H NMR (500 MHz, CDCl$_3$) δ 6 7.44-7.30 (m, 10H), 7.17 (d, J=8.5 Hz, 2H), 6.89 (d, J=8.5 Hz, 2H), 5.65 (d, J=5.0 Hz, 1H), 5.15 (s, 2H), 5.06-4.99 (m, 1H), 5.02 (s, 2H, overlapping), 4.98-4.89 (m, 1H), 4.34 (br s, 1H), 3.99-3.92 (m, 1H), 3.90-3.77 (m, 3H), 3.74-3.66 (m, 2H), 3.63-3.53 (m, 1H), 3.25-3.11 (m, 3H), 3.01-2.87 (m, 2H), 2.79-2.68 (m, 1H), 1.69-1.43 (m, 3H), 1.33-1.16 (m, 4H), 0.86 (d, J=6.0 Hz, 6H) ppm; $^{13}$C NMR (125 MHz, CDCl$_3$) δ 6 159.02, 157.66, 155.56, 137.08, 136.28, 130.47, 128.71, 128.64, 128.32, 128.15, 128.11, 127.52, 114.95, 109.41, 74.08, 73.44, 70.87, 70.11, 69.70, 67.90, 55.52, 52.37, 52.05, 45.50, 45.01, 39.71, 34.80, 25.93, 23.17, 23.08, 10.70, 10.63 ppm; HRMS (ESI) m/z: [M+H]$^+$ calcd for $C_{34}H_{49}N_2O_8$, 661.3484; found 661.3474.

Step 3—Synthesis of Compound tert-butyl (2-ethylbutyl)((2R,3S)-3-(((((3R,3aS,6aR)-hexahydrofuro[2,3-b]furan-3-yl)oxy)carbonyl)amino)-2-hydroxy-4-(4-hydroxyphenyl)butyl)carbamate

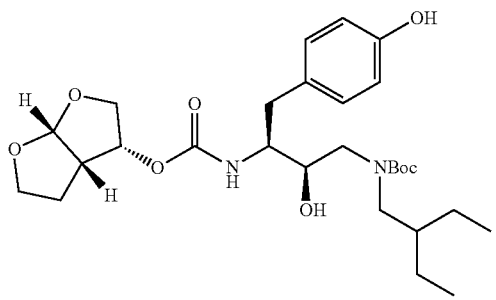 [SMILES: CCC(CC)CN(C[C@@H](O)[C@H](Cc1ccc(O)cc1)NC(=O)O[C@H]1CO[C@H]2OCC[C@H]21)C(=O)OC(C)(C)C]

A solution of compound obtained in the previous step (2.10 g, 3.18 mmol) in ethanol (5 mL) and ethyl acetate (5 mL) was treated with 20% palladium hydroxide on activated charcoal (0.50 g) and the reaction mixture was stirred at room temperature under hydrogen gas for 3 h. After reaction completion, the reaction mixture was filtered over celite and dried under reduced pressure. The deprotected amino phenol was re-dissolved in dioxane (3 mL) and water (3 mL) and the solution was cooled to 0° C. Sodium carbonate (0.34 g, 3.81 mmol) was added followed by di-tert-butyl dicarbonate (0.83 g, 3.81 mmol) and the reaction was stirred at 0° C. for 30 minutes and then warmed up to room temperature and stirred for another 2 hours. The reaction was diluted with ethyl acetate, washed with water and brine and concentrated under reduced pressure. The residue was purified by automated flash chromatography using a silica gel column (RediSep Gold, 40 g, gradient elution with 0-100% EtOAc/Hexane), to give the desired compound 4 (2.87 g, 53%) as a white solid. $^1$H NMR (500 MHz, CDCl$_3$) δ 7.02 (d, J=8.5 Hz, 2H), 6.70 (d, J=8.0 Hz, 2H), 5.63 (d, J=5.0 Hz, 1H), 5.24 (d, J=7.5 Hz, 1H), 5.02 (q, J=6.5 Hz, 1H), 3.93 (dd, J=10.0, 6.5 Hz, 1H), 3.88-3.78 (m, 3H), 3.74-3.64 (m, 2H), 3.58-3.47 (m, 1H), 3.29-3.07 (m, 3H), 2.97-2.86 (m, 2H), 2.67 (dd, J=14.0, 9.5 Hz, 1H), 1.70-1.58 (m, 1H), 1.55-1.40 (m, 2H), 1.47 (s, 9H, overlapping), 1.34-1.20 (m, 4H), 0.85 (td, J=7.5, 2.5 Hz, 6H) ppm; $^{13}$C NMR (125 MHz, CDCl$_3$) δ 158.66, 155.73, 155.00, 130.52, 129.30, 115.47, 109.46, 81.04, 74.07, 73.54, 71.01, 69.75, 55.79, 52.31, 51.82, 45.62, 39.78, 34.75, 28.51, 26.01, 23.18, 23.09, 10.81, 10.69 ppm; HRMS (ESI) m/z: [M+H]$^+$ calcd for $C_{28}H_{45}N_2O_8$, 537.3171; found 537.3166.

Step 4—Synthesis of Compound tert-butyl ((2R, 3S)-4-(4-((diethoxyphosphoryl)methoxy)phenyl)-3-(((((3R,3aS,6aR)-hexahydrofuro[2,3-b]furan-3-yl)oxy)carbonyl)amino)-2-hydroxybutyl) (2-ethylbutyl)carbamate

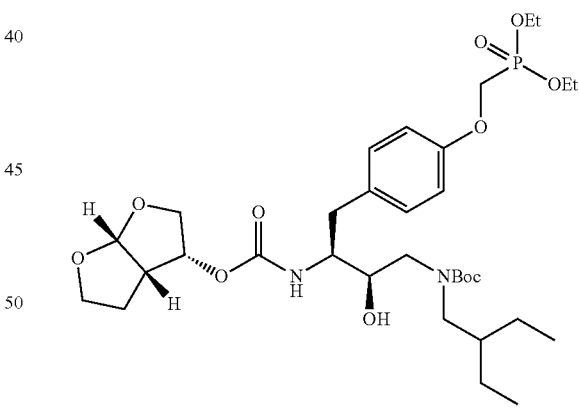

The same procedure was used as described for compound of Example 1 (step 5). Phenol obtained in the previous step (0.50 g, 0.931 mmol) was treated with cesium carbonate (0.455 g, 1.400 mmol) and phosphoryl triflate intermediate 1 (0.364 g, 1.211 mmol) to give the desired compound (0.486 g, 76%) as a white solid. $^1$H NMR (500 MHz, CDCl$_3$) δ 7.14 (d, J=8.5 Hz, 2H), 6.87 (d, J=9.0 Hz, 2H), 5.65 (d, J=5.5 Hz, 1H), 5.03 (q, J=6.5 Hz, 1H), 4.98 (d, J=8.0 Hz, 1H), 4.68 (br s, 1H), 4.27-4.19 (m, 6H), 3.96 (dd, J=9.5, 6.5 Hz, 1H), 3.90-3.81 (m, 2H), 3.80-3.75 (m, 1H), 3.74-3.66 (m, 2H), 3.63-3.54 (m, 1H), 3.17-3.03 (m, 3H), 2.98-2.89 (m, 2H), 2.75 (dd, J=14.0, 9.5 Hz, 1H), 1.72-1.62 (m, 1H), 1.60-1.52 (m, 1H), 1.51-1.43 (m, 1H), 1.47 (s, 9H, overlapping), 1.36 (t, J=7.0 Hz, 6H), 1.32-1.21 (m, 4H), 0.85 (td, J=7.0, 3.0 Hz, 6H) ppm; $^{13}$C NMR (125 MHz, CDCl$_3$) δ 158.48, 157.46, 157.34, 155.39, 131.33, 130.47, 114.47, 109.30, 80.72, 74.01, 73.25, 70.80, 69.55, 62.96, 62.91, 61.59, 55.47, 52.08, 51.69, 45.41, 39.70, 34.55, 28.40, 25.86, 23.09, 22.99, 16.51, 16.46, 10.71, 10.60 ppm; $^{31}$P NMR (202 MHz, CDCl$_3$) δ 19.24 ppm; HRMS (ESI) m/z: [M+H]$^+$ calcd for C$_{33}$H$_{56}$N$_2$O$_{11}$P, 687.3616

Step–Synthesis of the Title Compound

The same procedure was used as described for compound of Example 9 (step 5). Compound obtained in the previous step (1.04 g, 1.59 mmol) was treated with trifluoroacetic acid (2 mL), and the resulting deprotected amine was treated with sodium carbonate (0.07 g, 0.68 mmol) and 1,3-benzothiazole-6-sulfonyl chloride (0.10 g, 0.44 mmol) to give the desired compound (0.18 g, 68%) as a white solid. $^1$H NMR (500 MHz, CDCl$_3$) δ 6 9.22 (s, 1H), 8.47 (d, J=1.5 Hz, 1H), 8.27 (d, J=8.5 Hz, 1H), 7.90 (dd, J=8.5, 2.0 Hz, 1H), 7.15 (d, J=8.5 Hz, 2H), 6.88 (d, J=8.5 Hz, 2H), 5.65 (d, J=5.5 Hz, 1H), 5.01 (q, J=6.5 Hz, 1H), 4.87 (d, J=8.0 Hz, 1H), 4.27-4.20 (m, 6H), 3.94 (dd, J=9.5, 6.5 Hz, 1H), 3.87 (td, J=8.5, 2.0 Hz, 1H), 3.85-3.80 (m, 2H, overlapping), 3.74-3.66 (m, 3H), 3.20 (dd, J=15.0, 8.0 Hz, 1H), 3.13 (dd, J=13.0, 8.0 Hz, 1H), 3.08-3.00 (m, 2H), 2.96-2.89 (m, 2H), 2.79 (dd, J=14.0, 8.5 Hz, 1H), 1.73-1.63 (m, 1H), 1.58-1.51 (m, 1H), 1.50-1.39 (m, 2H), 1.36 (t, J=7.0 Hz, 6H), 1.34-1.26 (m, 3H), 0.82 (td, J=7.5, 5.0 Hz, 6H) ppm; $^{13}$C NMR (125 MHz, CDCl$_3$) δ 158.21, 157.78, 157.67, 155.83, 155.66, 135.44, 134.62, 130.77, 130.58, 124.98, 124.63, 122.46, 114.81, 109.40, 73.70, 73.02, 70.84, 69.67, 63.12, 63.08, 63.03, 61.76, 55.29, 55.02, 53.85, 45.46, 39.30, 34.90, 25.96, 23.17, 22.89, 16.65, 16.60, 10.75, 10.42 ppm; $^{31}$P NMR (202 MHz, CDCl$_3$) δ 19.19 ppm; HRMS (ESI) m/z: [M+H]$^+$ calcd for C$_{35}$H$_{51}$N$_3$O$_{11}$PS$_2$, 784.2697; found, 784.2707.

Example 13

Synthesis of Compound (3R,3aS,6aR)-hexahydrofuro[2,3-b]furan-3-yl ((2S,3R)-1-(4-((diethoxyphosphoryl)methoxy)phenyl)-4-((N-(2-ethylbutyl)-4-(hydroxymethyl)phenyl)sulfonamido)-3-hydroxybutan-2-yl)carbamate

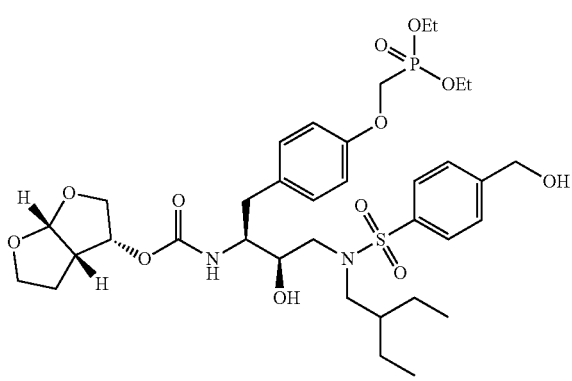 [SMILES: CCOP(=O)(COc1ccc(C[C@H](NC(=O)O[C@H]2CO[C@H]3OCC[C@H]32)[C@H](O)CN(CC(CC)CC)S(=O)(=O)c2ccc(CO)cc2)cc1)OCC]

Step 1—Synthesis of Compound (3R,3aS,6aR)-hexahydrofuro[2,3-b]furan-3-yl ((2S,3R)-1-(4-((diethoxyphosphoryl)methoxy)phenyl)-4-((N-(2-ethylbutyl)-4-formylphenyl)sulfonamido)-3-hydroxybutan-2-yl)carbamate

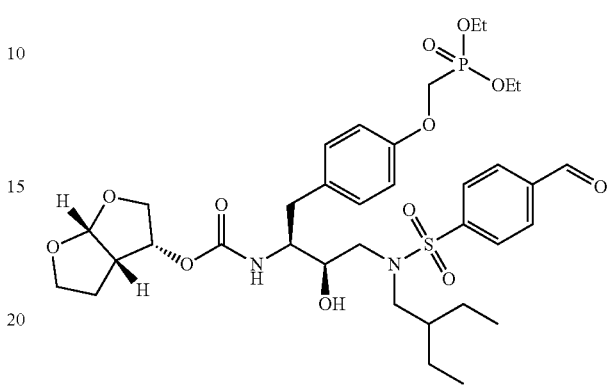

The same procedure was used as described for compound of Example 9 (step 5). Compound obtained in Example 12 (step 4) (0.25 g, 0.36 mmol) was treated with trifluoroacetic acid (2 mL), and the resulting deprotected amine was treated with sodium carbonate (0.08 g, 0.73 mmol) and 4-formylbenzenesulfonyl chloride (0.10 g, 0.47 mmol) to give the desired compound (0.18 g, 64%) as a white solid. $^1$H NMR (500 MHz, CDCl$_3$) δ 10.11 (s, 1H), 8.03 (d, J=8.5 Hz, 2H), 7.94 (d, J=8.5 Hz, 2H), 7.14 (d, J=8.5 Hz, 2H), 6.88 (d, J=8.5 Hz, 2H), 5.64 (d, J=5.0 Hz, 1H), 5.01 (q, J=6.5 Hz, 1H), 4.97 (d, J=8.0 Hz, 1H), 4.26-4.19 (m, 6H), 3.93 (dd, J=9.5, 6.5 Hz, 1H), 3.86 (td, J=8.0, 2.0 Hz, 1H), 3.84-3.78 (m, 2H, overlapping), 3.73-3.66 (m, 2H), 3.63 (br s, 1H), 3.15 (dd, J=15.5, 8.0 Hz, 1H), 3.11-3.04 (m, 2H), 3.01 (dd, J=14.0, 2.5 Hz, 1H), 2.98-2.89 (m, 2H), 2.77 (dd, J=14.0, 8.5 Hz, 1H), 1.72-1.62 (m, 1H), 1.57-1.51 (m, 1H), 1.50-1.41 (m, 1H), 1.36 (t, J=7.0 Hz, 6H), 1.32-1.22 (m, 4H), 0.81 (td, J=7.5, 3.0 Hz, 6H) ppm; $^{13}$C NMR (125 MHz, CDCl$_3$) δ 190.88, 157.76, 157.64, 155.68, 143.46, 139.10, 130.78, 130.55, 130.38, 128.14, 114.79, 109.40, 73.71, 72.91, 70.91, 69.65, 63.11, 63.09, 63.04, 61.75, 55.32, 54.61, 53.49, 45.48, 39.07, 34.81, 25.97, 23.06, 22.84, 16.62, 16.58, 10.64, 10.40 ppm; $^{31}$P NMR (202 MHz, CDCl$_3$) δ 19.17 ppm; HRMS (ESI) m/z: [M+H]$^+$ calcd for C$_{35}$H$_{52}$N$_2$O$_{12}$PS, 755.2973.

Step 2—Synthesis of the Title Compound

A solution of the compound obtained in the previous step (0.18 g, 0.23 mmol) in anhydrous tetrahydrofuran (7 mL) was cooled to −10° C. and sodium borohydride (0.01 g, 0.28 mmol) was added. The reaction was stirred at −10° C. for 30 mins and the reaction was quenched with saturated ammonium chloride solution (5 mL). The aqueous phase was extracted twice with ethyl acetate (2×5 mL) and concentrated under reduced pressure. The residue was purified by automated flash chromatography using a silica gel column (RediSep Gold, 12 g, gradient elution with 0-20% MeOH/dichloromethane), to give the desired compound (0.16 g, 88%) as a white solid. $^1$H NMR (500 MHz, CDCl$_3$) δ 7.61 (d, J=8.0 Hz, 2H), 7.51 (d, J=8.0 Hz, 2H), 7.20 (d, J=8.0 Hz, 2H), 6.89 (d, J=9.0 Hz, 2H), 5.68 (d, J=5.0 Hz, 1H), 5.10 (d, J=9.0 Hz, 1H), 5.07 (q, J=6.5 Hz, 1H, overlapping), 4.81-4.72 (m, 2H), 4.30-4.19 (m, 6H), 4.00 (dd, J=9.5, 6.5 Hz, 1H), 3.95-3.90 (m, 1H), 3.87-3.76 (m, 3H), 3.69 (dd, J=9.5, 6.5 Hz, 1H), 3.68 (d, J=1.5 Hz, 1H, overlapping), 3.51 (t, J=6.0 Hz, 1H), 3.11-3.02 (m, 2H), 3.01-2.91 (m, 2H), 2.81 (dd, J=14.0, 6.5 Hz, 1H), 2.67 (dd, J=13.5, 5.5 Hz, 1H), 2.56 (d, J=14.5 Hz, 1H), 1.81-1.75 (m, 2H), 1.50-1.19 (m, 11H), 0.86-0.79 (m, 6H) ppm; $^{13}$C NMR (125 MHz, CDCl$_3$) δ 157.65, 157.53, 155.43, 147.36, 136.42, 131.20, 130.66, 127.58, 127.27, 114.75, 109.40, 73.59, 73.37, 70.98, 69.73, 64.06, 63.36, 63.31, 63.20, 63.15, 63.09, 61.72, 55.25, 55.21, 54.20, 45.36, 39.25, 34.99, 26.05, 23.25, 22.73, 16.64, 16.59, 10.77, 10.31 ppm; $^{31}$P NMR (202 MHz, CDCl$_3$) δ 19.36 ppm; HRMS (ESI) m/z: [M+H]$^+$ calcd for $C_{35}H_{54}N_2O_{12}PS$, 757.3130; found 757.3137.

Example 14

Activity of the Exemplified Compounds Against HIV Protease

Assay: To obtain drug resistance, the HIV virus was challenged with gradually increasing amounts of very potent HIV-1 protease inhibitors (e.g., DRV). This challenge was continued until high levels of resistance occurred spanning six-orders of magnitude of binding affinity. A series of passaging experiments (e.g., 26) in viral cultures created resistant strains. The initial inhibitor concentration was chosen below the EC$_{50}$ (<10 nM) and was increased in steps of 1.5x; both sets of experiments had a corresponding no-inhibitor control. High levels of resistance were achieved tolerating 3-10 μM inhibitor after 40-80 viral passages. The protease gene was sequenced for all viral selection trajectories using NextGen sequencing and PrimerID. Mutations detected and reached fixation (100% of cell culture) for three parallel selection experiments with DRV are displayed in FIG. 2. With all inhibitors, active site mutations I84V and/or I50V were selected early and retained in all the final resistant viruses but never in the no-drug control. By the end of selection, the protease gene accumulated up to 14 mutations, but still retained activity to allow viral replication. High level of resistance occurs late in the selection, with the addition of mutations outside the active site.

Highly resistant variants successfully identified from viral passaging: The variants contain 6-14 mutations relative to the wildtype enzyme, including one or two major active site mutations (e.g., I50V, I84V), while the enzymatic activity of all variants was retained within ~10-fold of wildtype. 9 resistant variants, including the most resistant endpoint variant, Sel-DRV0-11 Mut (containing the total of 11 mutations) were expressed, purified, enzymatically characterized, and crystallized with DRV. As shown in FIG. 3, highly mutated variants had increased protein and inhibitor fluctuations and reduced cross-correlated motions between the two. These changes were also reflected in the hydrogen bonds and VdW interactions that contribute to DRV's pM potency. In this highly evolved variant from selection, it was discovered that mutations outside the active site considerably increase resistance. It is also demonstrated with pMD that resistant variants have significantly altered conformational dynamics and cross-correlations of the enzyme-nhibitor complex. FIG. 4 contains a table showing details of protease variants from DRV viral passaging. I54, A71, and L76 mutations are late-selected and distal mutations that contribute to high-level resistance, and V82 and I84 mutations indicate primary resistance mutations at the active site that are selected early during viral passaging and likely determines the pathway resistance.

Table 1 provides inhibitory activity of the exemplified compounds against drug-resistant protease variants and antiviral potency against wild-type HIV-1.

TABLE 1

| | Ki (nM) | | | | | | Antiviral |
|---|---|---|---|---|---|---|---|
| Ex. No. | I84V | I50V/A71V | 8 Mutant | 10 Mutant | 11 Mutant | KY24 | WT $EC_{50}$ (nM) |
| 5 | <0.005 | <0.005 | 13.3 ± 3.5 | 146 ± 10 | 259 ± 17 | 2.31 ± 0.09 | 22.89 |
| 3 | <0.005 | <0.005 | 0.78 ± 0.07 | 3.70 ± 0.30 | 10.5 ± 0.9 | 0.16 ± 0.02 | 7.80 |
| 6 | <0.005 | <0.005 | 4.98 ± 0.40 | 52.9 ± 4.2 | 103 ± 3 | 1.89 ± 0.17 | 27.29 |
| 1 | <0.005 | <0.005 | 0.88 ± 0.13 | 4.20 ± 0.30 | 11.0 ± 1.0 | 0.19 ± 0.03 | 4.16 |
| 11 | <0.005 | <0.005 | 1.8 ± 0.5 | 1.20 ± 0.40 | 9.03 ± 4.21 | 0.09 ± 0.01 | 9.93 |
| 7 | <0.005 | <0.005 | 4.71 ± 0.73 | 51.6 ± 5.50 | 106 ± 7 | 1.08 ± 0.06 | 16.02 |
| 8 | <0.005 | <0.005 | 0.77 ± 0.06 | 1.26 ± 0.08 | 2.2 ± 0.2 | 0.16 ± 0.04 | 5.15 |
| 13 | <0.005 | <0.005 | 2.2 ± 0.4 | 32.1 ± 4.3 | 81.2 ± 10.8 | 0.60 ± 0.10 | 16.96 |
| 4 | <0.005 | <0.005 | 0.37 ± 0.03 | 1.60 ± 0.06 | 6.9 ± 0.5 | 0.08 ± 0.03 | 3.11 |
| 12 | <0.005 | <0.005 | 0.25 ± 0.08 | 0.24 ± 0.09 | 3.2 ± 0 5 | 0.022 ± 0.09 | 10.70 |
| 2 | <0.005 | <0.005 | 0.56 ± 0.048 | 2.10 ± 0.10 | 3.6 ± 0.4 | 0.32 ± 0.04 | 11.83 |
| 9 | <0.005 | <0.005 | 2.2 ± 0.5 | 4.5 ± 0.8 | 63.5 ± 15.2 | 0.36 ± 0.05 | 5.67 |
| 10 | <0.005 | <0.005 | 0.93 ± 0.2 | 1.9 ± 0.3 | 15.0 ± 3.5 | 0.23 ± 0.02 | 10.37 |
| DRV | <0.005 | <0.005 | 12.8 ± 0.4 | 156 ± 3.70 | 759 ± 57 | 6.95 ± 0.12 | 4.75 |

The HIV protease inhibitors of the present disclosure are less susceptible to resistance because a mutation affecting such inhibitors will simultaneously affect substrate processing. These inhibitors share a common chemical scaffold with DRV but have modified chemical moieties that further fill the substrate envelope, and all bind tighter than <5 pM to purified wildtype ("WT") HIV-1 protease. The inhibitors retained robust potency to many multi-drug resistant protease variants and viral strains. Although all inhibitors are close analogs, even relatively minor chemical modifications resulted in significant changes in potency across many variants, although co-crystal structures exhibit only subtle changes in packing or hydrogen bonding.

Most of these inhibitors are about 10-fold more potent than their parent compounds (corresponding compounds lacking phosphonate moiety at the $P_1$ position) against highly resistant variants. Referring to FIG. 5, PU7 refers to example 8, PU1 refers to example 5, and PU10 refers to example 12, and compounds UM7 and UM10 refer to the parent compounds for PU7 and PU10, respectively. Compounds of examples 8 and 12 are highly potent with 10-500-fold better potency than DRV with Ki often staying in the subnanomolar or even pM range. The structural analysis revealed that modification to extend the $P_1'$ moiety results in 1) reduced VdW contacts of the $P_2'$ group, 2) more variability in the hydrogen bond frequencies and 3) changes in conserved water sites both proximal and distal to the active site. These relationships demonstrate intricate interdependency between inhibitor moieties in achieving potency.

Example 15

Activity of the Exemplified Compounds Against HTLV Protease DRV and Analogs Inhibit HTLV-1 Protease The 116-amino-acid construct of HTLV-1 protease was expressed and purified for enzyme inhibition assays and crystallization. This protease construct has 9 amino acids removed from the C-terminus to facilitate crystallization, which does not affect catalytic activity. With a FRET-based enzymatic assay, the activity of HTLV-1 protease was tested using two peptide substrates based on HTLV-1 matrix/capsid (MA/CA) and capsid/nucleocapsid (CA/NC) cleavage sites (See FIG. 6B). The Michaelis-Menten constant (KM) was measured as 101.3±1.9 μM and 31.6±5.9 μM, consistent with previously reported values. HTLV-1 catalyzed cleavage of the MA/CA substrate an order of magnitude faster than that of CA/NC, with a catalytic efficiency of 0.21±0.02 $\mu M^{-1} s^{-1}$. Thus, the purified HTLV-1 protease is folded and active under the test conditions.

Figure 8:
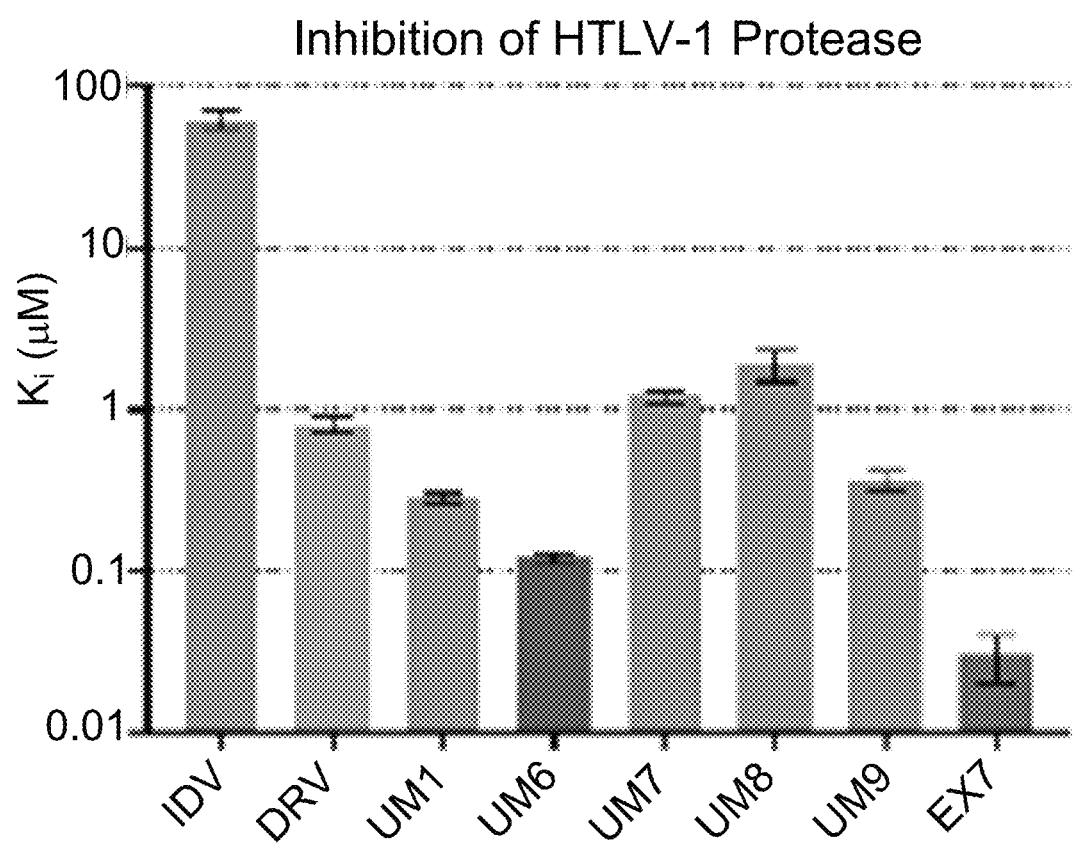
FIG. 8 contains a bar graphs showing enzyme inhibition constants (Ki) for IDV, DRV, and compounds UM1 (parent compound for example 5), UM6 (parent compound of example 7), UM7 (parent compound of example 7), UM8 (parent compound of example 13), UM9 (parent compound of example 4), and example 7 against HTLV-1 protease.

The FDA-approved HIV-1 protease inhibitors IDV and DRV were tested against HTLV-1 protease (FIGS. 7-9). IDV weakly inhibited HTLV-1 protease ($K_i$=62.7 μM), while DRV was two orders of magnitude more potent with a $K_i$ of 0.8 μM. UM6 inhibited the enzyme with a $K_i$ of 0.12±0.01 μM, which is ~7-fold lower compared to DRV. The compound of Example 7, on the other hand, inhibited HTLV-1 protease 4-fold better than UM6 ($K_i$=0.03±0.01 μM) and was a 26-fold improvement over the FDA-approved inhibitor DRV.

Inhibition of Gag Processing in HTLV-1 VLPs

In addition to the biochemical enzymatic assays, DRV, UM6, and Example 7 were tested for their ability to prevent Gag maturation (FIG. 9). This work has been performed by laboratory of Louis Mansky at Institute of Molecular Virology, University of Minnesota. HTLV-1 Gag expressed in Hek293T cells produced virus-like particles (VLPs), which were harvested, resolved by SDS-PAGE, and visualized using anti-capsid antibodies. In the absence of any inhibitor, HTLV-1 protease rapidly processed Gag in VLPs to yield smaller fragments corresponding to cleavage products. DRV, UM6, and Example 7 effectively inhibited Gag cleavage and VLP maturation at as low as 1:1 ratio. Decreasing inhibitor concentration resulted in a dose-dependent response; the compounds inhibit HTLV-1 protease and Gag processing, which is required for viral maturation.

Figure 20:
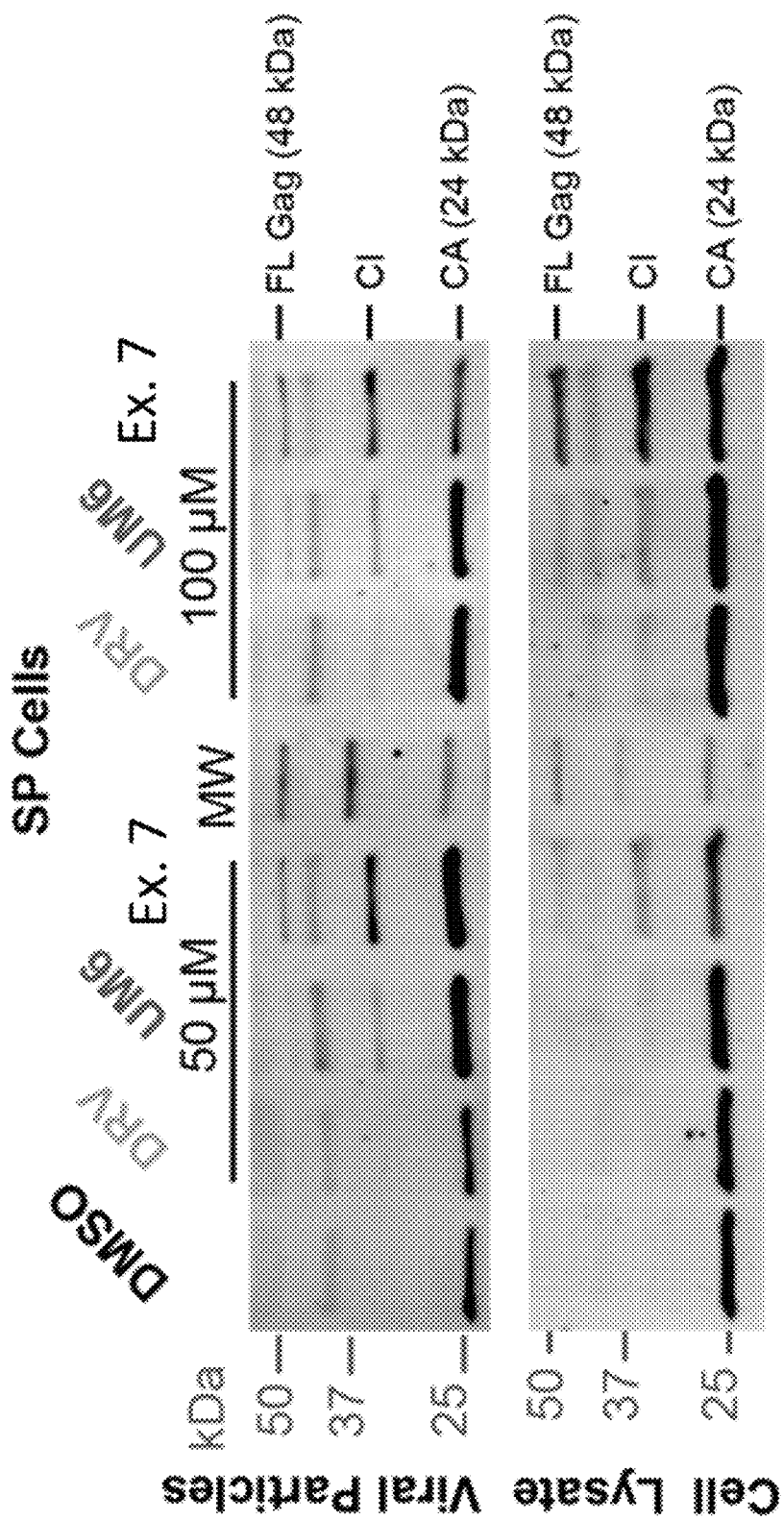
FIG. 20 contains images showing HTLV-1 Gag cleavage from SP cell lysates and from particles released into cell culture supernatants was treated with 50 μM or 100 μM inhibitor for 48 h. Samples were then visualized by using an anti-HTLV-1 p24 antibody.
Figure 21:
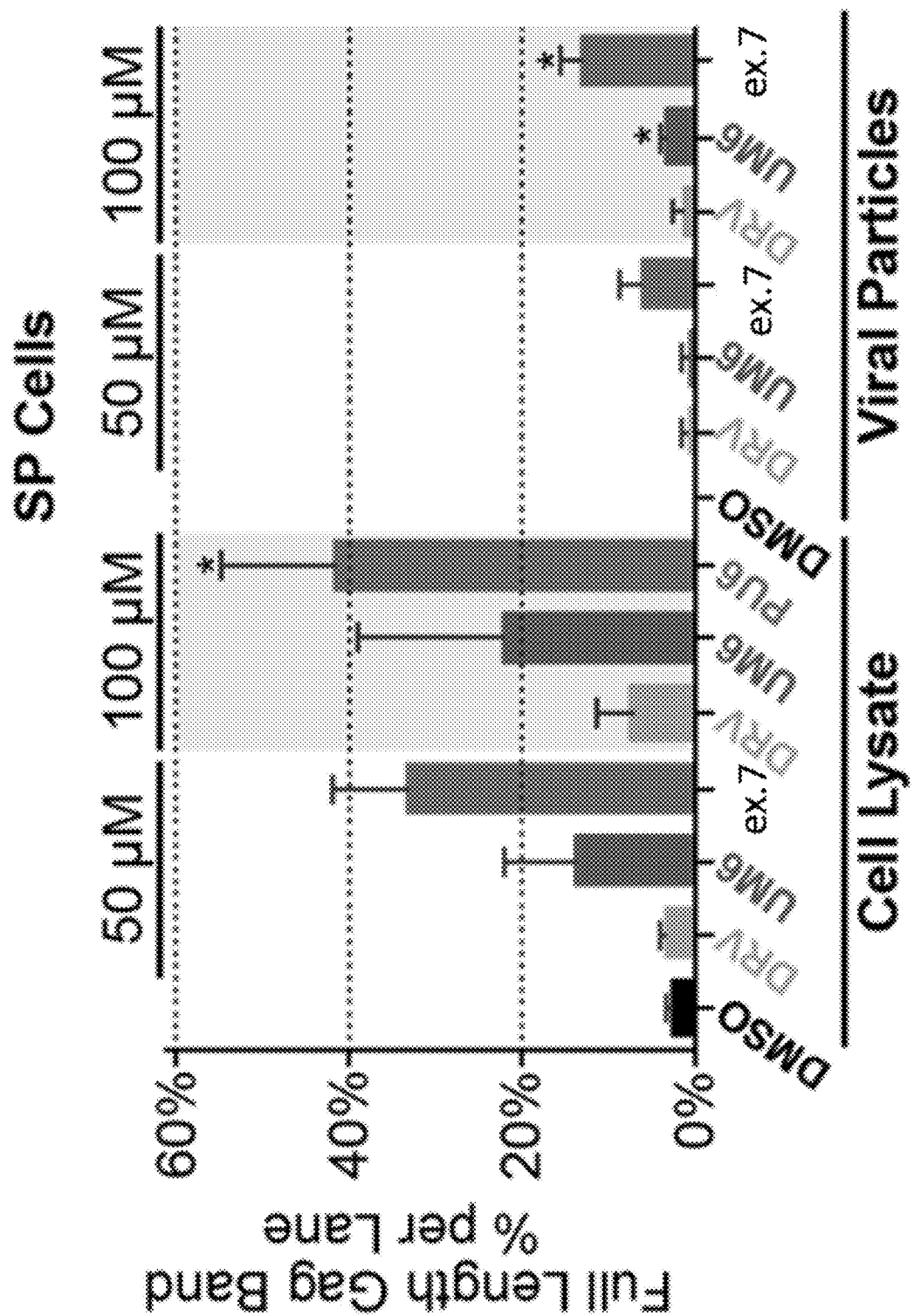
FIG. 21 contains bar graphs showing immunoblot quantification of the FL Gag band as a percentage of total bands in each lane for the different SP cell drug treatments reported as the mean±SEM (n=3). Band labels: full-length Gag (FL Gag), cleavage intermediates (CI), and capsid (CA). *denotes p-value<0.05 with values compared to the DMSO control sample.
Figure 22:
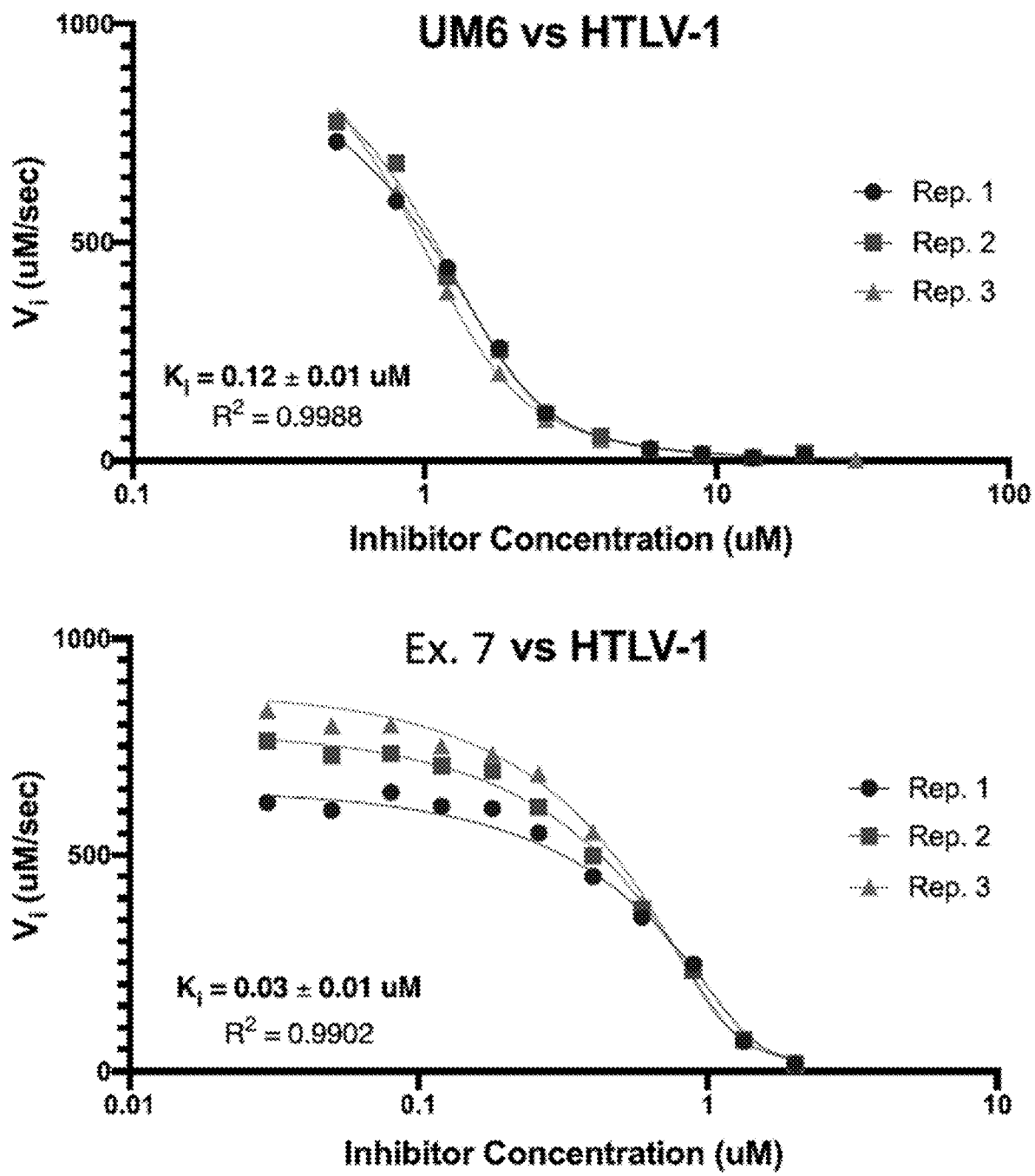
FIG. 22 contains representative dose-response curves. Initial velocity ($V_i$) as a function of inhibitor concentration was globally fit for 3 replicates (Rep 1-3) to obtain the inhibition constants ($K_i$).
Figure 23:
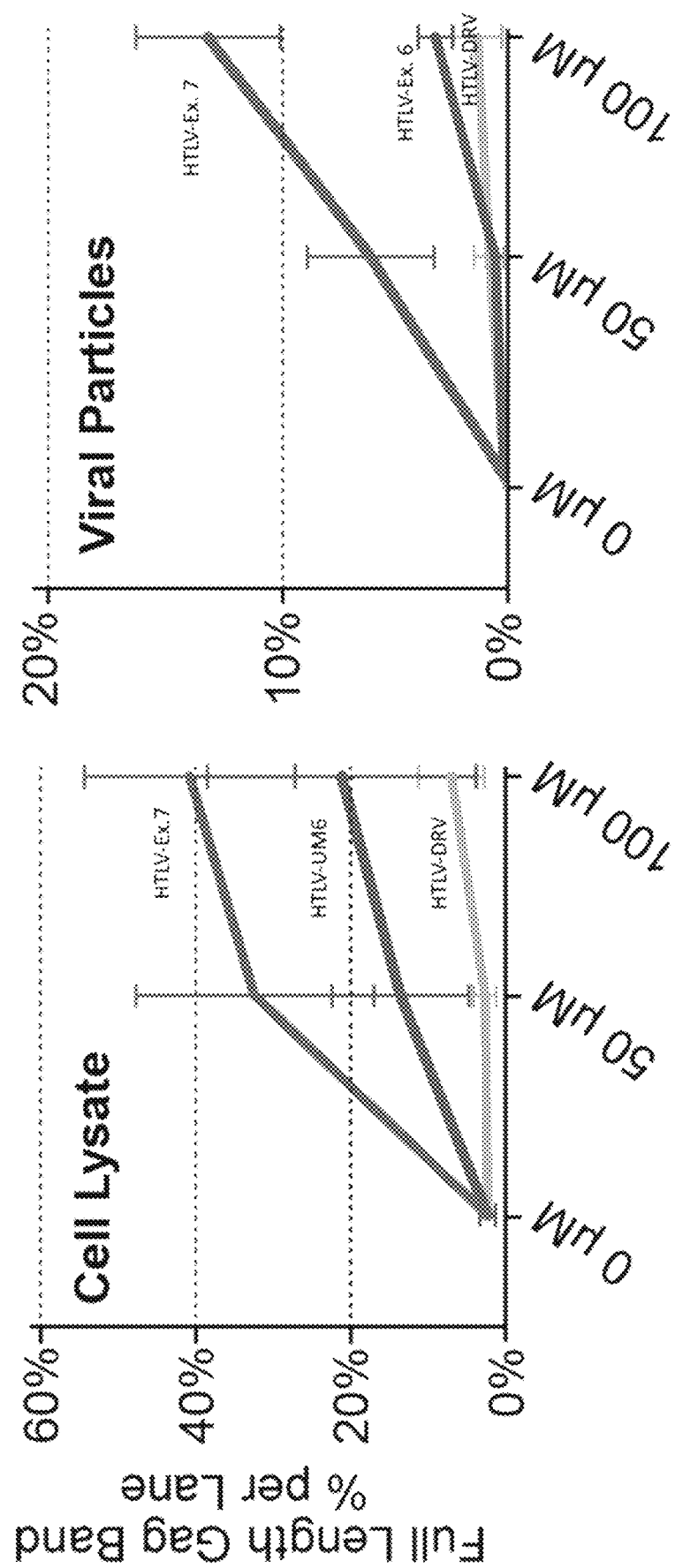
FIG. 23 contains immunoblot quantification of full-length (FL Gag) band as a percentage of total bands in each lane for the different SP cell drug treatments reported as the mean±SEM (n=3).

To further validate inhibition of HTLV-1 protease, SP cells (which are chronically infected with HTLV-1) were treated with the same inhibitors (FIG. 20). The SP cell line harbors low numbers of HTLV-1 proviruses and produces virus particles that incorporate full-length Gag, which makes SP an ideal cell culture system for testing the inhibition of HTLV-1 maturation. Gag cleavage products were detected by using a CA (p24) primary antibody in both SP cell lysates and virus particles released in the cell culture supernatants. In both lysates and supernatants, the amount of full-length (FL) Gag and larger size cleavage intermediates (CI) increased when the cells were treated with 50 μM or 100 μM DRV or the two analogues UM6/Ex.7. The Ex.7 analogue showed the greatest amount of FL Gag present in both concentrations of the inhibitor tested: 32.4±15.5% and 41.0±13.7% band percentage (mean±SEM) for 50 μM and 100 μM, respectively, in the cell lysate as compared to DMSO (2.0±1.0%). For the Ex.7 treatment of the viral particles produced from the SP cells, the FL Gag band percentage was 5.8±2.8% and 12.9±3.1% (mean±SEM) for 50 μM and 100 μM treatments, respectively (FIGS. 21, 23). In agreement with the enzyme inhibition assays, the highest amount of protease inhibition was observed for Ex. 7 in vitro with the SP cell line. Therefore, exemplified compounds inhibited HTLV-1 protease and the subsequent Gag processing, which is required for viral maturation.

Cocrystal Structures of DRV and Analogs Bound to HTLV-1 Protease

To elucidate how the DRV scaffold binds to HTLV-1 protease, high-resolution cocrystal structures with DRV, UM6, and example 7 (2.05-2.29 Å resolution) were determined (crystallography statistics in FIG. 11). The three complexes crystallized in the same space group (P6$_3$22), containing one homodimer in the asymmetric unit. For comparison, the structure of example 7 bound to HIV-1 protease was also determined to 1.84 Å resolution (FIG. 11). Following established convention, the monomer that contacts the aniline side of DRV (P2') is denoted the prime (') or B chain, while the A chain that interacts with the bis-THF (P2) will remain non-prime. Starting from these crystal structures, a series of molecular dynamics (MD) simulations were performed to assess the stability of the inhibitor-protease interactions observed in the crystal structures.

Interactions Lost in the Binding of DRV to HTLV-1 Versus HIV-1 Protease

Figure 10:
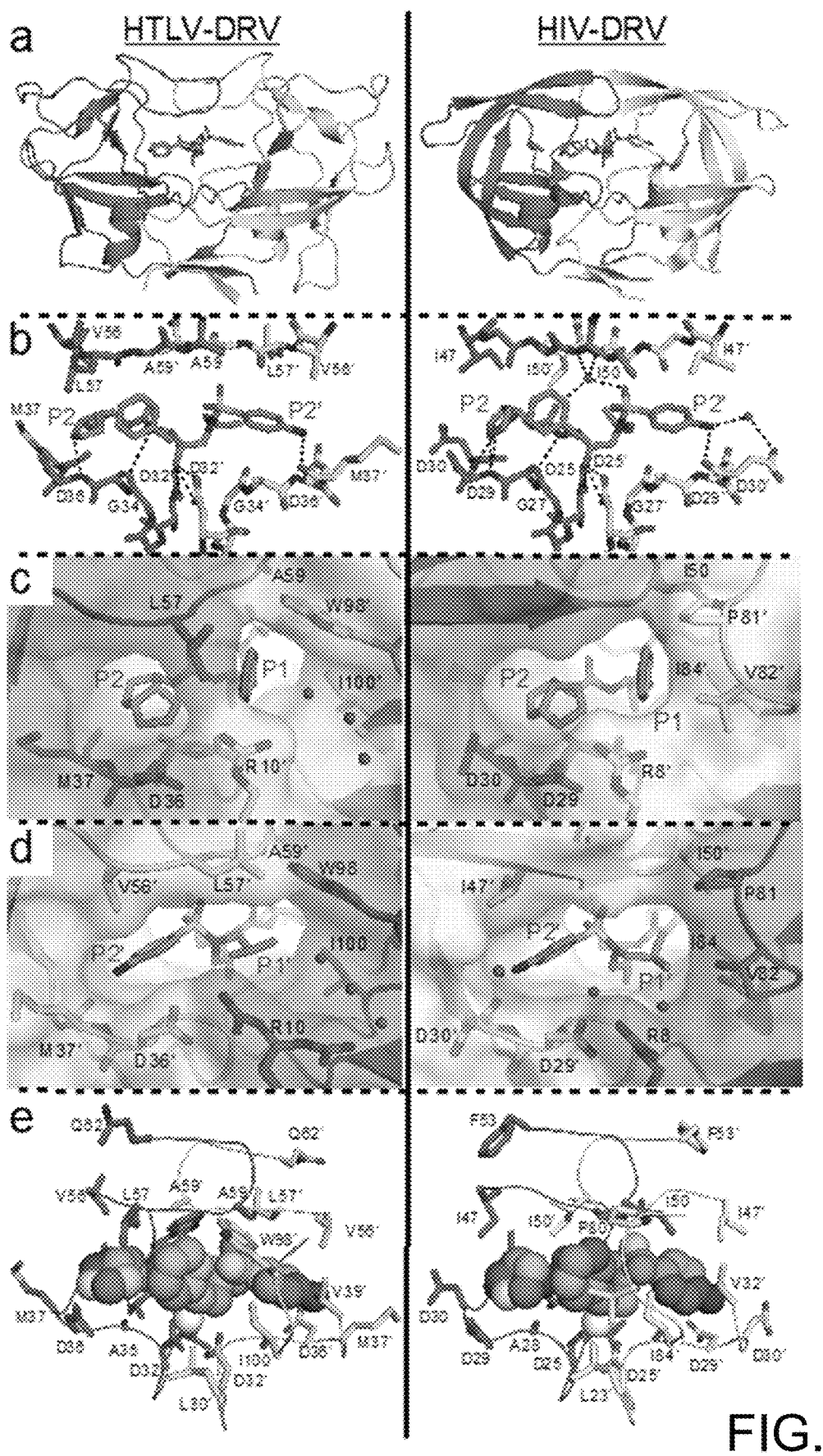
FIG. 10 contains images showing comparison of DRV binding to HTLV-1 versus HIV-1 protease. (a) Cocrystal structures of DRV bound to HTLV-1 and HIV-1 protease (PDB IDs 6W6Q and 6DGX, respectively). (b) Close-up view of bis-THF moiety in the S2 subsite; (c) close-up view of aniline moiety in the S2' subsite. (d) Inter-molecular hydrogen bonds between DRV and protease active site. (e) Packing around DRV at the active site visualized through mean inter-molecular VdW interactions with protease during MD simulations. In all panels, the prime side monomer (chain A) interacting with the bis-THF moiety is in darker shade, and DRV is depicted as lighter sticks in panels A-D.

In the cocrystal structure determined, DRV was bound at the active site of HTLV-1 protease with an overall conformation similar to that in HIV-1 protease (FIG. 10). However, because of variations in the active site, evident in dramatically altered substrate specificity, certain key protease-inhibitor interactions were either lost or weakened in HTLV-1 protease. As with all HIV-1 protease inhibitors, DRV is a transition state analogue: the central hydroxyl moiety interacts with the side chain oxygens of both catalytic aspartates at a distance of 2.5-3.2 Å between heavy atoms. In HTLV-1 protease, these distances increased to 2.8-3.5 Å. In addition, the more open active site in HTLV-1 protease resulted limited packing of the inhibitor and the flaps, with no evidence of coordinated waters in the electron density maps. Finally, DRV is not large enough to keep optimal distance to the catalytic residues while coordinating bis-THF moiety interactions at the S2 subsite. In HIV-1 protease, the bis-THF oxygens have hydrogen bonds with the backbone nitrogen atoms of Asp29 and Asp30 (FIG. 10, segment b) within 2.8-3.2 Å while remaining 3.5 Å away from the repulsive force of the carbonyl oxygen of Asp30. This binding also allows the NH atom of the carbamate linker to interact with the carbonyl oxygen of Gly27 at a distance of 3.0 Å. In HTLV-1 protease, the bis-THF had a single hydrogen bond with the backbone nitrogen of D36 at a favorable distance of 2.9 Å. The nitrogen of Met37 and carbonyl oxygen of Gly34 were both beyond hydrogen bonding distance (3.4-3.6 Å). Thus, these three major disruptions of hydrogen bonds in HTLV-1 protease (FIG. 10, segment b) between (1) the central hydroxyl and catalytic aspartates (which centers the inhibitor within the active site); (2) the loss of the tetrahedral network coordinating the inhibitor to the flaps through a conserved water; (3) the bis-THF moiety and backbone nitrogens in the S2' subsite, weaken the affinity with DRV as previously observed in highly DRV-resistant HIV-1 protease variants.

The packing of DRV is dramatically different in HTLV-1 compared with HIV-1 protease. In HTLV-1, the phenyl ring of P1 moiety does not pack well against the hydrophobic residues Leu30', Trp98', Ile100', and Leu57 in the S1 subsite (FIG. 10, segment c) and the exposed ring coordinates a channel filled with water molecules. In contrast in HIV-1 protease, the phenyl ring of P1 packs against the hydrophobic side chains in the 80s loop, especially Val82 (FIG. 10, segment c). This reflects the substrate specificity of HIV protease where residues with aromatic rings (Phe and Tyr) naturally occur at the P1 position of cleavage sites (FIG. 6A) and modifications to increase van der Waals (VdW) contacts at this site can greatly improve potency against resistant proteases. The cocrystal structure with HTLV-1 protease indicates modifications to the P1 moiety to either stack against the hydrophobic side chains in the Si subsite or exploit the available space in the channel may increase potency.

In homodimeric proteases, the S2' subsite is symmetrically related to the S2 subsite and made up of identical residues. In the S2' subsite of HIV-1 protease, DRV P2' aniline makes a direct hydrogen bond with the backbone oxygen of Asp30' and a water-mediated interaction with the side chain of Asp30' (FIG. 10, segment d). The cocrystal structure (FIG. 10, segment d) shows the aniline nitrogen is roughly equidistant from both the backbone oxygen and backbone nitrogen of residue Met37' but not within hydrogen bonding distance. The aniline benzene ring had a slightly different rotation angle and S2' subsite had a deeper hydrophobic pocket beyond Val56' toward Phe67'.

When DRV bound to HTLV-1 protease, both P1 and P1' moieties were largely exposed to channels occupied by water molecules (FIG. 10, segments c and d). These moieties are nestled in hydrophobic pockets in HIV-1 protease with favorable hydrophobic contacts. In HTLV-1 protease the favorable packing around these moieties was substantially decreased, which was also the case for the overall inhibitor due to the larger active site (FIG. 10, segment e).

Figure 5:
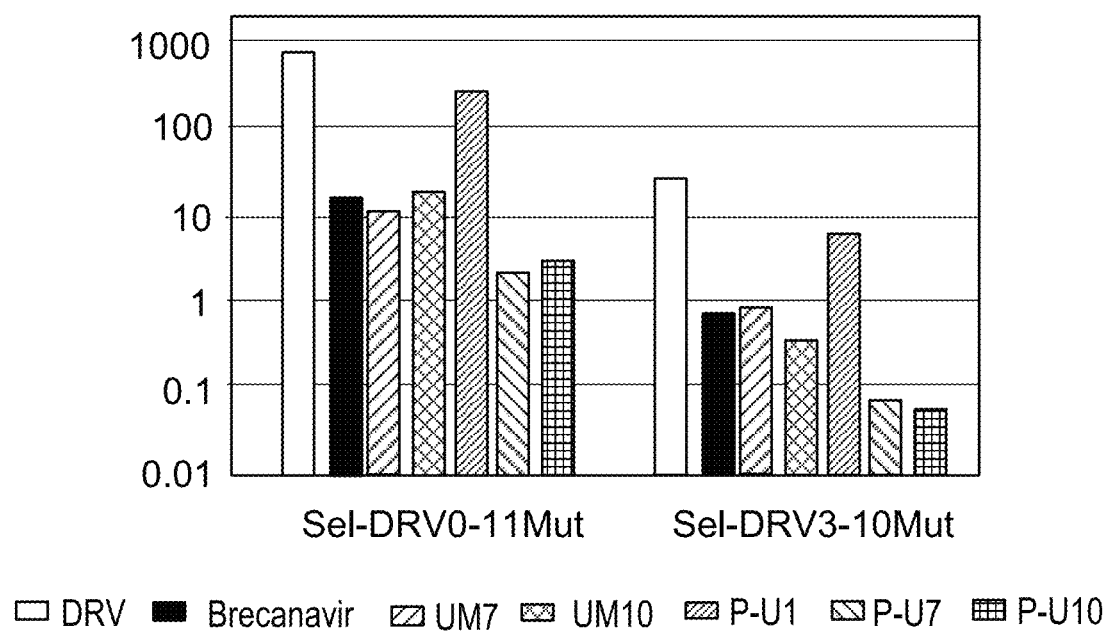
FIG. 5 contains a bar graph showing enzyme inhibition constants (Ki in nM) of DRV and phosphonate series against highly resistant protease variants. Four of these inhibitors (UM7, PU5, PU7, and PU10) are 10-100 fold more potent than DRV and often more potent than brecanavir.
Figure 19:
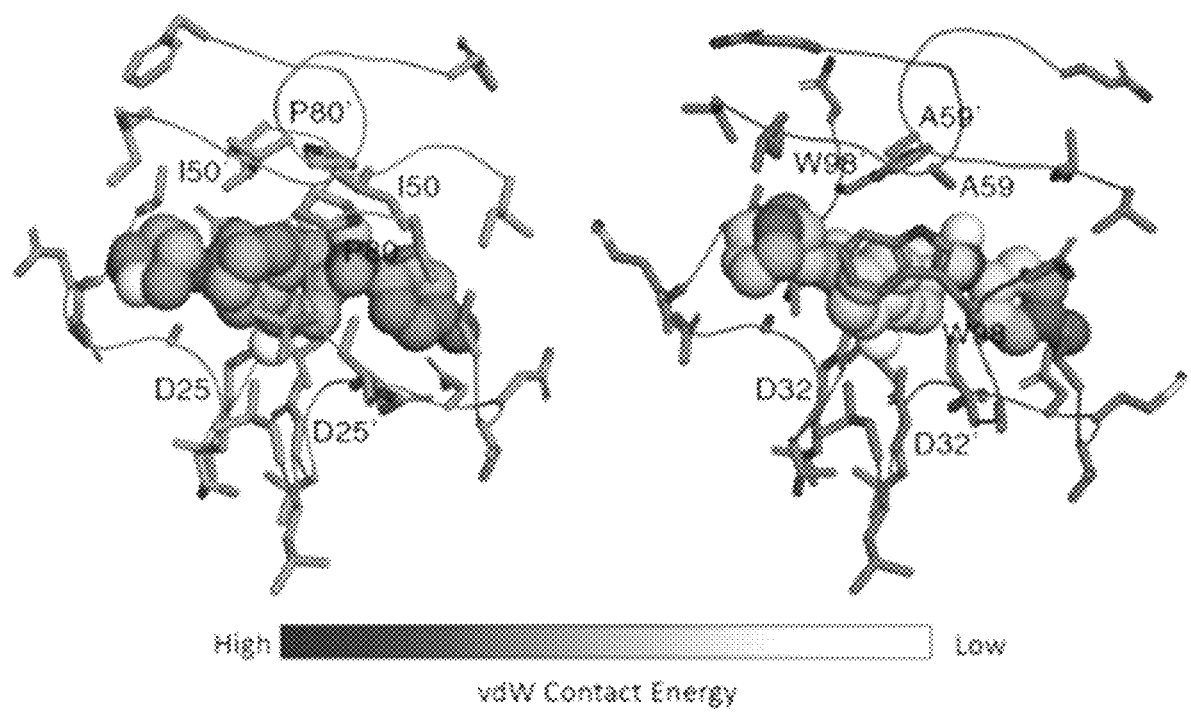
FIG. 19 contains images showing packing around DRV at the active site of HIV-1 protease (left) and HTLV-1 protease (right) (VdW energy from MD simulations) mapped onto the inhibitor structure.

In sum, DRV forms 9 hydrogen bonds (hbonds) with HIV-1 protease including 2 water mediated ones (FIG. 5A), 8 of which are extremely stable. In contrast, DRV forms only 7 h-bonds with HTLV-1 protease and only 4 are reasonably stable. The bis-THF moiety, sulfonamide group and the central flap water all have suboptimal interactions with HTLV-1 protease active site and the flaps, in stark contrast with HIV-1 protease (See FIG. 18). Additionally, the packing around DRV at the active site, quantified by van der Waals (VdW) contact energies, is not as complementary in HTLV-1 compared with HIV-1 protease (see FIG. 19). A key difference decreasing packing around DRV is that the critical flap-tip residue Ile50 of HIV-1 protease is replaced with Ala59 in HTLV-1 protease. The phenyl moiety of DRV at the P1 position is not optimal for HTLV-1 protease active site due to the large neighboring Trp98.

Improved Potency of Exemplified Compounds toward HTLV-1 Protease

Cocrystal structures of DRV analogs that had improved potency were determined with HTLV-1 protease. Both UM6 and example 7 have a larger isohexyl moiety at the P1' position compared to DRV's isobutyl. When bound to the protease, these aliphatic moieties had diverging conformations (FIG. 12) which could all be accommodated within the relatively large hydrophobic S1' subsite (FIG. 12, segment b). The conformation of the P1' moiety seemed to impact that of the P2' aniline, suggesting subsite interdependence and the need to optimize these moieties simultaneously. The P1' isohexyl moiety was not large enough to displace any water molecules in the extended S1' channel. However, hydrophobic packing against S1' residues (Ala59' and Trp98) were enhanced (FIG. 13), likely underlying the improved potency of analogs with the larger P1' moiety. Even larger P1' moieties that pack against these hydrophobic moieties while extending into the channel with a polar face to interact with Arg10 may further increase the binding affinity.

Figure 13:
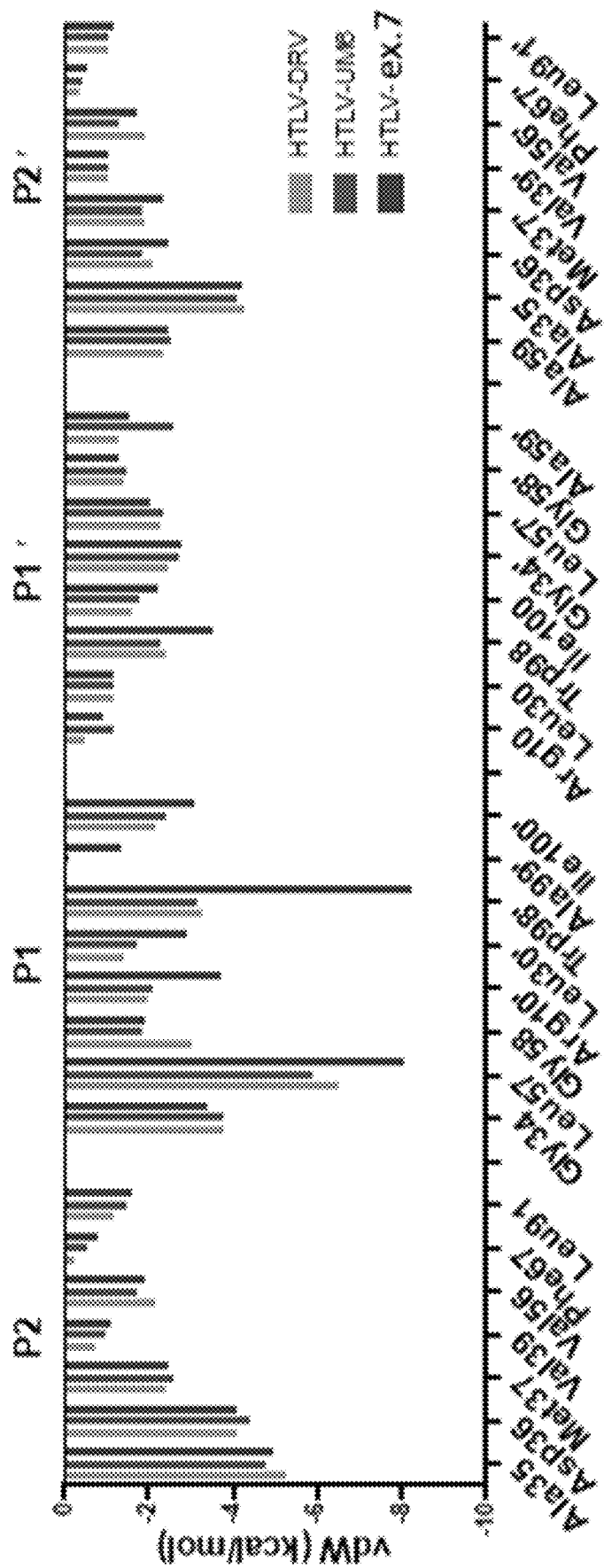
FIG. 13 contains a bar graph showing per-residue VdW contacts between protease and inhibitor, grouped by inhibitor moiety.

On the flip side of the active site, the invariant P2 bis-THF and P1 benzene ring superimposed well with only minor conformational divergence (FIG. 12, segments a and c). The phosphonate added to the P1 ring in example 7 extended into the S1 channel, substantially increasing VdW contacts with Leu57, Trp98', Arg10' (FIG. 13). These enhanced interactions account for the order of magnitude increase in the measured inhibition constant (FIG. 8).

Figure 14:
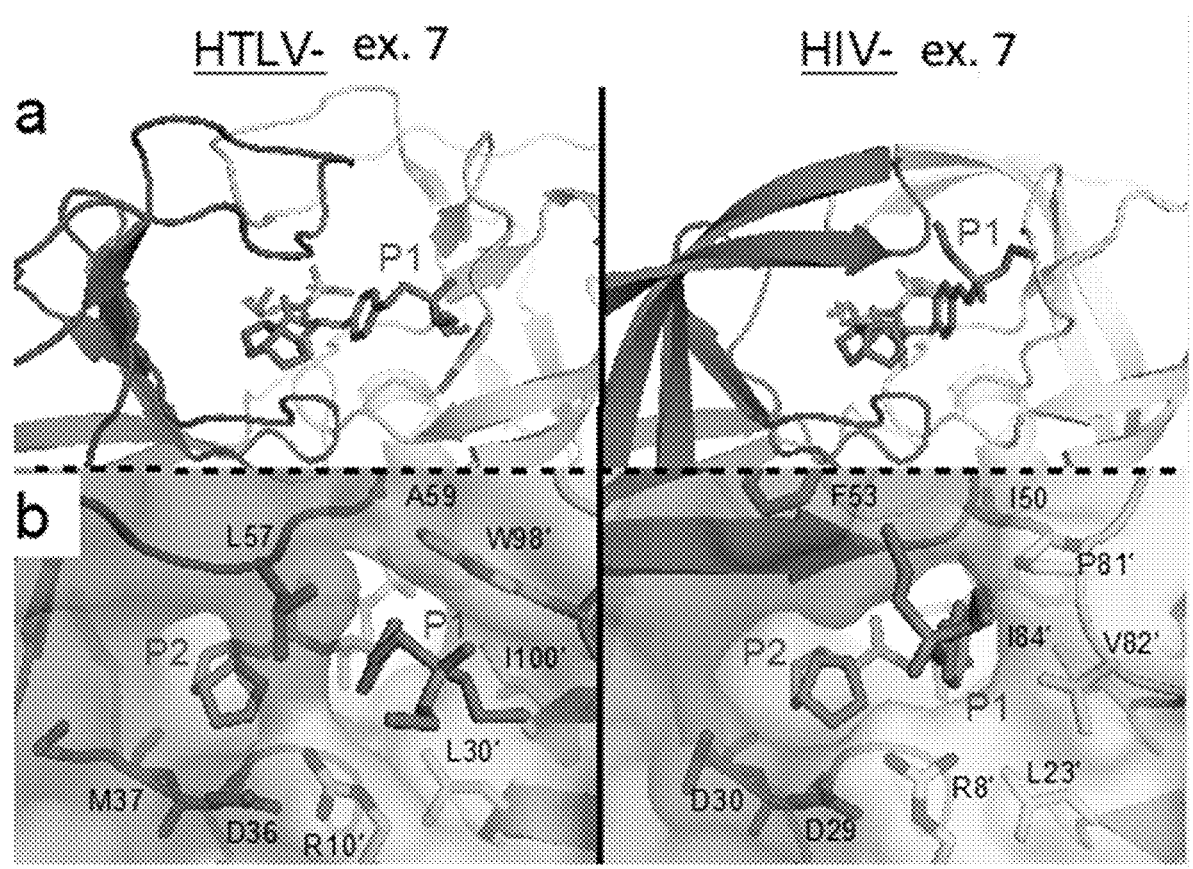
FIG. 14 contains images showing comparison of Example 7 when bound to HTLV-1 and HIV-1 protease. (a) The phosphonate moiety of Example 7 sticks out into the S1 subsite in HTLV-1, whereas it binds up against the flaps in HIV-1 protease. (b) Residue L57 prevents the phosphonate from interacting with the flaps of HTLV-1 protease.

The phosphonate addition to the P1' benzene ring has been reported for other HIV-1 protease inhibitor scaffolds to increase potency against resistant variants by "solvent anchoring". For the example 7 inhibitor bound to HIV-1 protease crystal structure was determined to both investigate the mechanism of increased potency and to compare with HTLV-1 protease (FIG. 14). The conformation of the phosphonate moiety was completely different in the two cocrystal structures. In HIV-1 protease, one branch of the phosphonate moiety interacted with Pro81' in the 80s loop while the other extended to the flaps. This suggests that rather than solvent interactions, the mechanism of improved potency against resistant HIV-1 protease variants is through interactions with the invariant Pro81' and stabilization of the closed conformation of the flaps. In HTLV-1 protease, the phenyl ring intercalates between Leu57 and Trp98', while Leu57 prevents the phosphonate group from interacting with the protease flaps. Instead, the phosphonate addition extends into the S1 channel, as detailed above.

Figure 15:
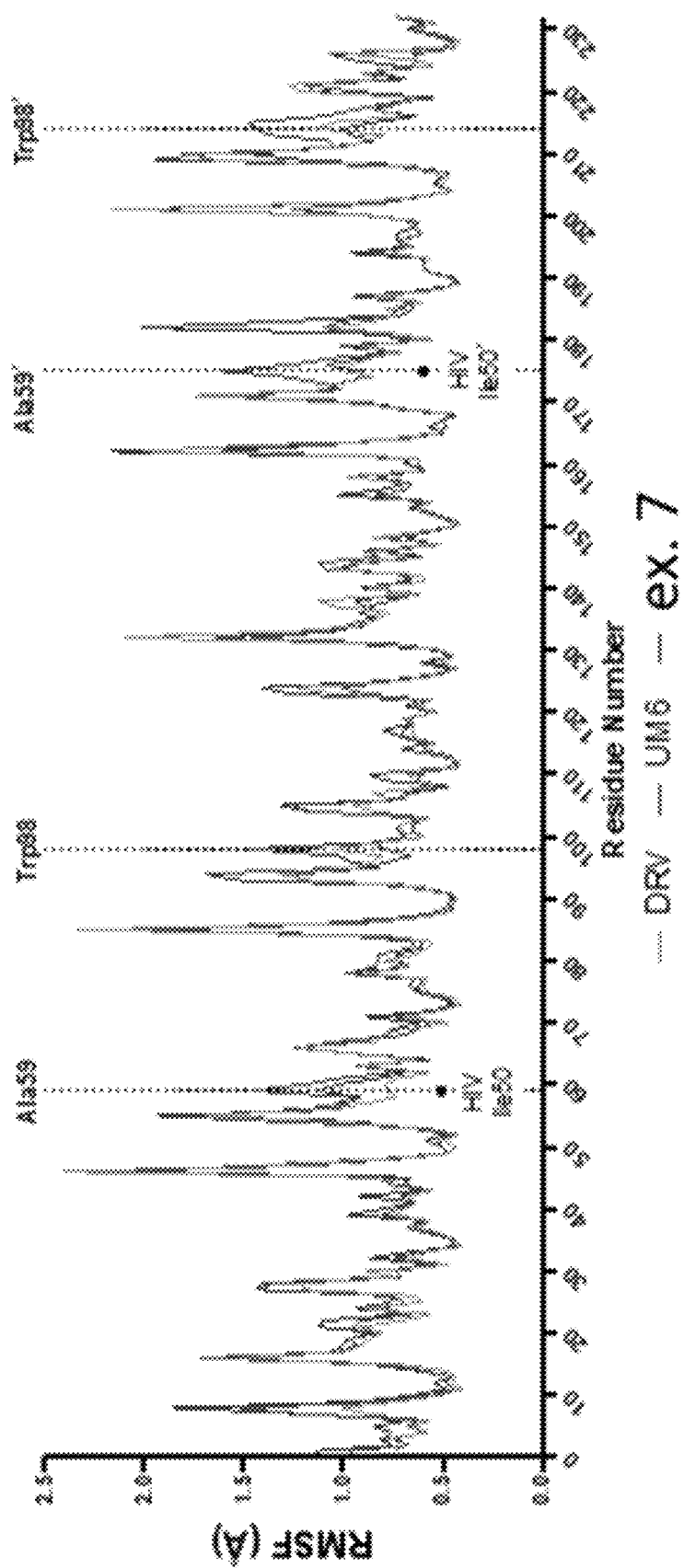
FIG. 15 contains a line plot Root-Mean-Square Fluctuation (RMSF) of Ca atoms for DRV, UM6 and example 7 in complex with HTLV-1 protease from molecular dynamics simulations. Ala59/59' residues are at the tips of the flaps in HTLV-1 protease (corresponding to Ile50/50' in HIV-1 protease), and Trp98/98' are at the P1/P1' subsites of the active site.
Figure 16:
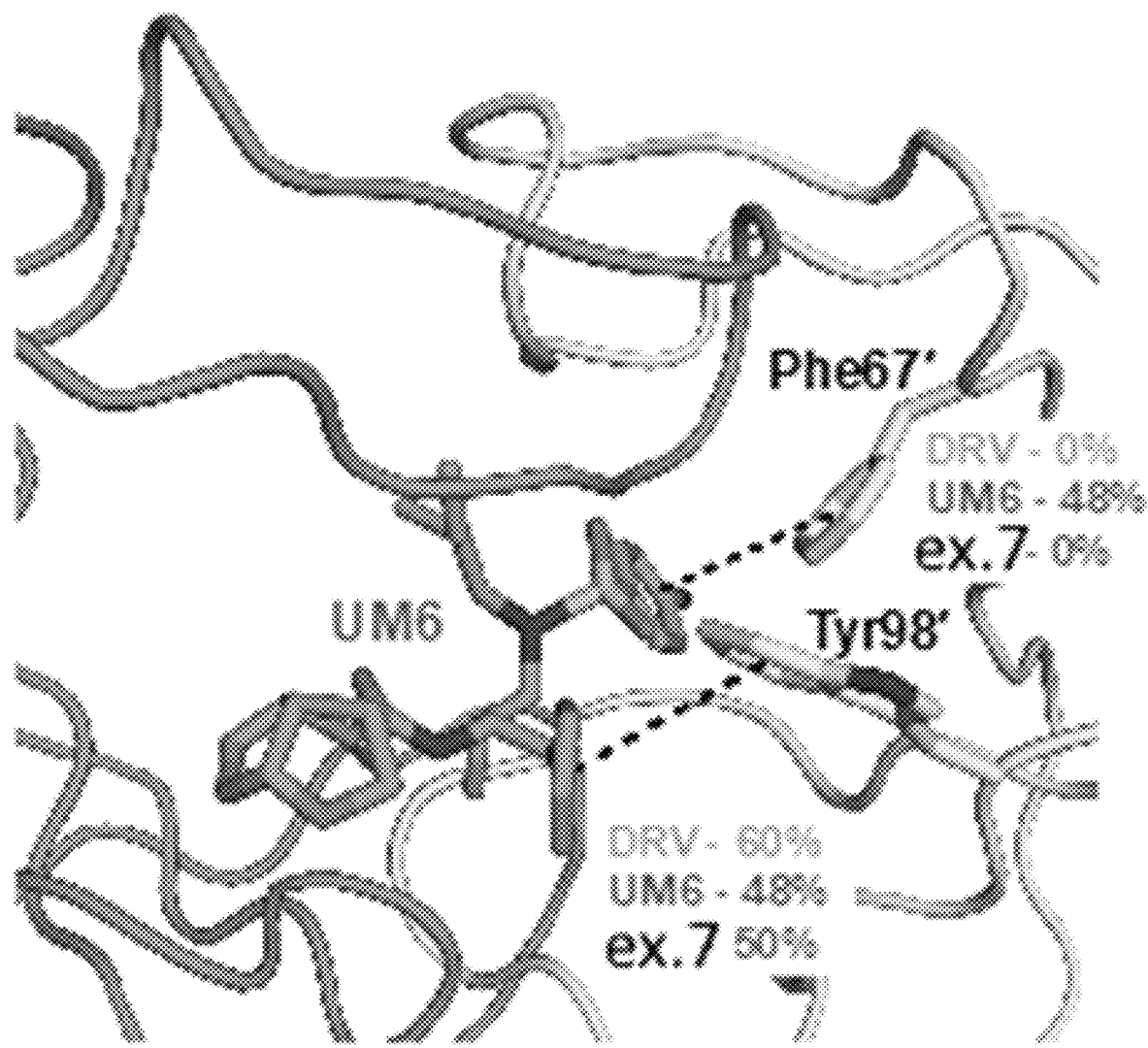
FIG. 16 contains an image showing that aromatic side chains in HTLV-1 active site can form π-π stacking interactions, primarily in edge-to-face configuration, with the P1 phenylalanine and P2' aniline of exemplified compounds. Frequency of the π-π stacking interactions (dashed lines) during MD simulations is indicated.

The crystal structures indicate that exploration of larger P1' and P1 moieties to fill the water-occupied channels is highly promising. The MD simulations indicate Ala59/59' and Trp98/98' to be highly flexible (FIG. 15). Modifications that increase interactions with Ala59/59' to stabilize the flaps and with Trp98/98' to lock the side chain conformer further increase inhibitor potency. These tryptophan residues and phenylalanine (Phe67/Phe67') in the $S_2/S_2'$ subsites also provide an opportunity for π-π stacking interactions between protease and inhibitor (FIG. 16). Previously reported $C_2$-symmetric pyrrolidine-based inhibitors with $P_1/P_1'$ aromatic rings had π-π stacking interactions with Trp98, which improved potency. In the MD simulations, π-π stacking of Pi phenylalanine with Trp98 was maintained only about half of the time, and, e.g., compound of example 7 formed edge-to-face π-π stacking with Phe67' for about half of the simulation time. Stabilizing these stacking interactions further increases potency.

Other Embodiments

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A compound of Formula (I):

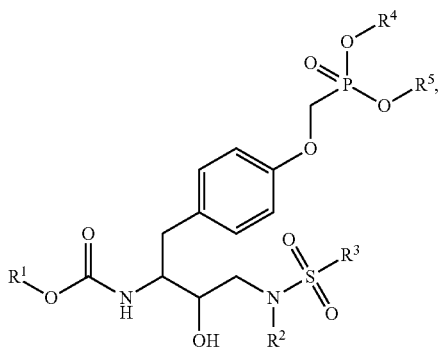

or a pharmaceutically acceptable salt thereof, wherein:

$R^1$ is a 5-11-membered saturated heterocycloalkyl group comprising 1, 2, or 3 oxygen atoms, which is optionally substituted with 1, 2, or 3 substituents independently selected from halo, $C_{1-3}$ alkyl, $C_{1-3}$ haloalkyl, $C_{1-3}$ alkoxy, and $C_{1-3}$ haloalkoxy;

$R^2$ is $C_{1-8}$ alkyl, which is optionally substituted with 1 or 2 substituents independently selected from halo, $C_{1-3}$ haloalkyl, $C_{1-3}$ alkoxy, $C_{1-3}$ haloalkoxy, and $Cy^1$;

each $Cy^1$ is independently selected from $C_{6-10}$ aryl, $C_{3-10}$ cycloalkyl, 5-10 membered heteroaryl, and 4-10 membered heterocycloalkyl, each of which is optionally substituted with 1 or 2 substituents independently selected from halo, $C_{1-3}$ alkyl, $C_{1-3}$ haloalkyl, $C_{1-3}$ alkoxy, and $C_{1-3}$ haloalkoxy;

$R^3$ is selected from $C_{6-10}$ aryl, which is substituted with HO-$C_{1-3}$ alkylene or $NH_2$-$C_{1-3}$ alkylene, and 5-10 membered bicyclic heteroaryl having 1, 2, 3 or 4 heteroatom ring members independently selected from nitrogen, sulfur and oxygen, which is optionally substituted with 1 or 2 substituents independently selected from OH, halo, $C_{1-3}$ alkyl, $C_{1-3}$ haloalkyl, $C_{1-3}$ alkoxy, $C_{1-3}$ haloalkoxy, HO-$C_{1-3}$ alkylene, $NH_2$-$C_{1-3}$ alkylene, amino, $C_{1-6}$ alkylamino, and di($C_{1-6}$ alkyl)amino; and $R^4$ and $R^5$ are each independently selected from $C_{1-6}$ alkyl and $C_{1-6}$ haloalkyl.

2. The compound of claim 1, wherein $R^1$ is selected from tetrahydrofuran, hexahydropyran, hexahydrofurofuran, hexahydrofuropyran, octahydrofurooxepine, dioxabicyclodecane, and hexahydro-3,5-methanofuro[2,3-b]pyran, each of which is optionally substituted with 1 or 2 independently selected $C_{1-3}$ alkyl.

3. The compound of claim 1, wherein $R^1$ is a group selected from:

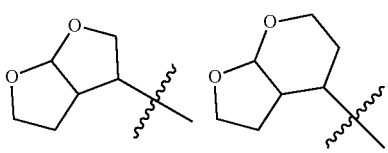

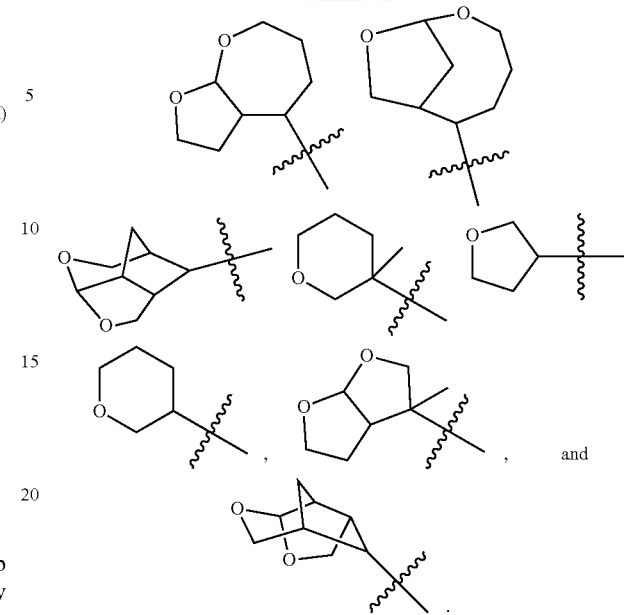

4. The compound of claim 1, wherein the compound of Formula (I) has formula:

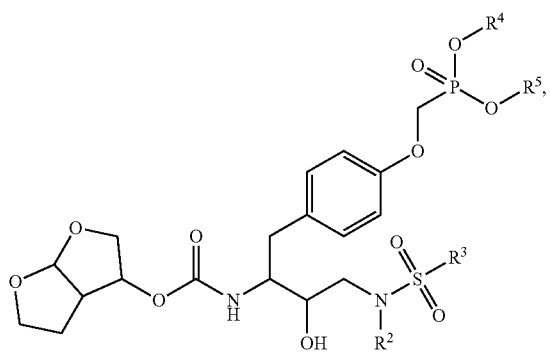

or a pharmaceutically acceptable salt thereof.

5. The compound of claim 1, wherein $R^2$ is $C_{1-8}$ alkyl, optionally substituted with halo or $Cy^1$.

6. The compound of claim 5, wherein $R^2$ is selected from 2-methylbutyl, 2-ethylbutyl, 3-methylbutyl, 2-ethylpentyl, 2-ethyl-4-F-butyl, and sec-butyl.

7. The compound of claim 5, wherein $R^2$ is $C_{1-8}$ alkyl substituted with $Cy^1$.

8. The compound of claim 7, wherein $R^2$ is $C_{1-8}$ alkyl substituted with a group selected from:

$C_{6-10}$ aryl, which is optionally substituted with halo or $C_{1-3}$ alkyl;

$C_{3-10}$ cycloalkyl, which is optionally substituted with halo or $C_{1-3}$ alkyl;

5-10 membered heteroaryl, which is optionally substituted with halo or $C_{1-3}$ alkyl; and 4-10 membered heterocycloalkyl, which is optionally substituted with halo or $C_{1-3}$ alkyl.

9. The compound of claim 7, wherein $R^2$ is selected from cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene.

10. The compound of claim 1, wherein $R^3$ is $C_{6-10}$ aryl substituted with HO-$C_{1-3}$ alkylene or $NH_2$-$C_{1-3}$ alkylene.

11. The compound of claim 10, wherein $R^3$ is phenyl substituted with HO-$C_{1-3}$ alkylene or $NH_2$-$C_{1-3}$ alkylene.

12. The compound of claim 1, wherein $R^3$ is 5-10 membered bicyclic heteroaryl having 1, 2, 3 or 4 heteroatom ring members independently selected from nitrogen, sulfur and oxygen, optionally substituted with $C_{1-3}$ alkoxy, HO-$C_{1-3}$ alkylene, $NH_2$-$C_{1-3}$ alkylene, amino, or $C_{1-3}$ alkylamino.

13. The compound of claim 12, wherein $R^3$ is selected from benzodioxolyl, benzofuranyl, benzothiophenyl, indolyl, benzooxazolyl, and benzothiazolyl, each of which is optionally substituted with $C_{1-3}$ alkoxy, HO-$C_{1-3}$ alkylene, $NH_2$-$C_{1-3}$ alkylene, amino, or $C_{1-3}$ alkylamino.

14. The compound of claim 1, wherein $R^4$ is $C_{1-3}$ alkyl and $R^5$ is $C_{1-3}$ alkyl.

15. The compound of claim 1, wherein:
$R^2$ is $C_{1-8}$ alkyl optionally substituted with halo or $Cy^1$;
$R^3$ is selected from $C_{6-10}$ aryl, which is substituted with HO-$C_{1-3}$ alkylene or $NH_2$-$C_{1-3}$ alkylene, and 5-10 membered bicyclic heteroaryl having 1, 2, 3 or 4 heteroatom ring members independently selected from nitrogen, sulfur and oxygen, which is optionally substituted with $C_{1-3}$ alkoxy, HO-$C_{1-3}$ alkylene, $NH_2$-$C_{1-3}$ alkylene, amino, or $C_{1-3}$ alkylamino;
$R^4$ is $C_{1-3}$ alkyl; and
$R^5$ is $C_{1-3}$ alkyl.

16. The compound of claim 1, wherein:
$R^2$ is selected from 2-methylbutyl, 2-ethylbutyl, 3-methylbutyl, 2-ethylpentyl, 2-ethyl-4-F-butyl, sec-butyl, cyclohexyl-methylene, cyclopropyl-methylene, cyclobutyl-methylene, phenyl-methylene, phenyl-ethylene, 2-phenyl-2-methylethyl, pyridinyl-methylene, oxiranyl-methylene, and oxetanyl-methylene;
$R^3$ is selected from phenyl, which is substituted with HO-$C_{1-3}$ alkylene or $NH_2$-$C_{1-3}$ alkylene, and a ring selected from benzodioxolyl, benzofuranyl, benzothiophenyl, indolyl, benzooxazolyl, and benzothiazolyl, each of which is optionally substituted with $C_{1-3}$ alkoxy, HO-$C_{1-3}$ alkylene, $NH_2$-$C_{1-3}$ alkylene, amino, or $C_{1-3}$ alkylamino;
$R^4$ is $C_{1-3}$ alkyl; and
$R^5$ is $C_{1-3}$ alkyl.

17. The compound of claim 1, wherein the compound of Formula (I) is selected from:

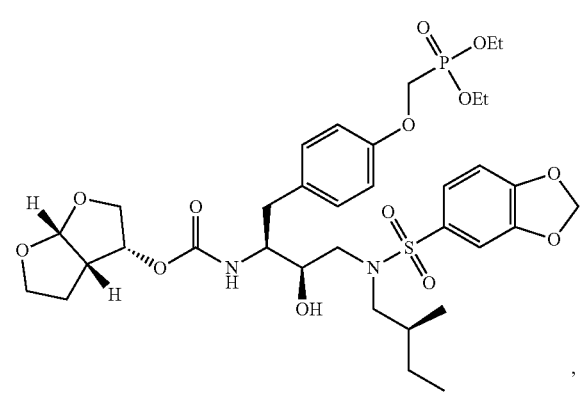

-continued

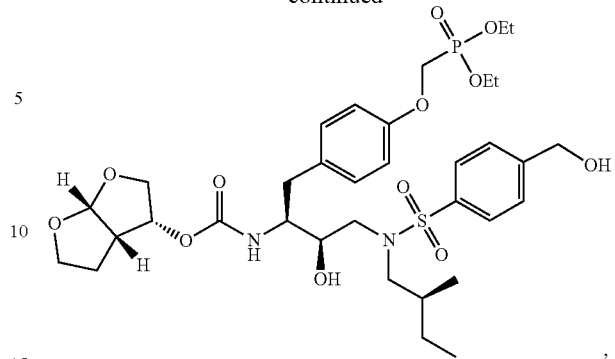

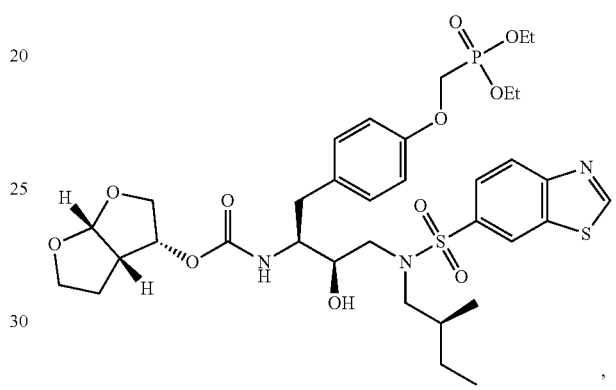

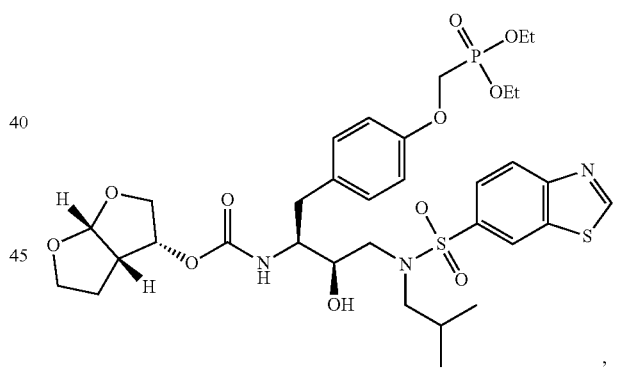

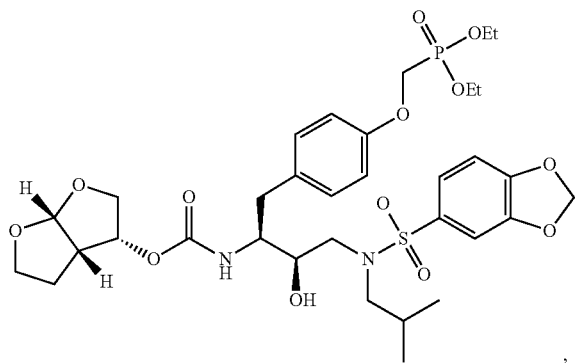

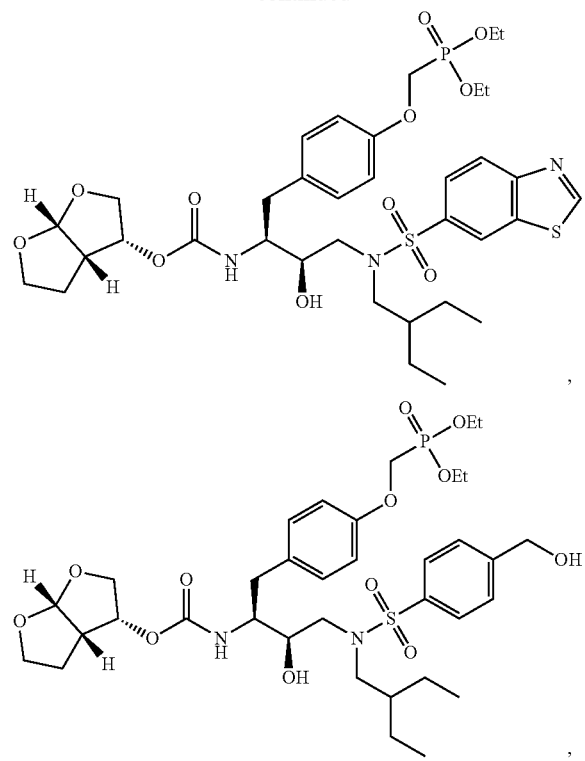

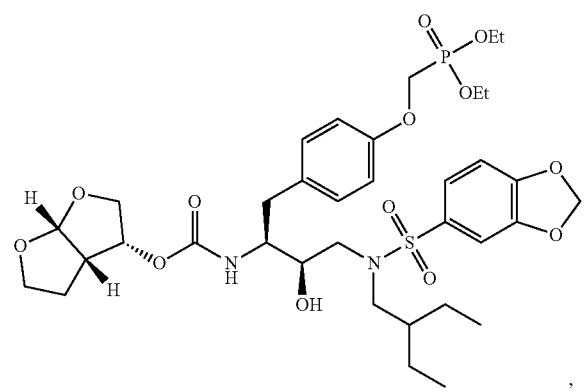

and

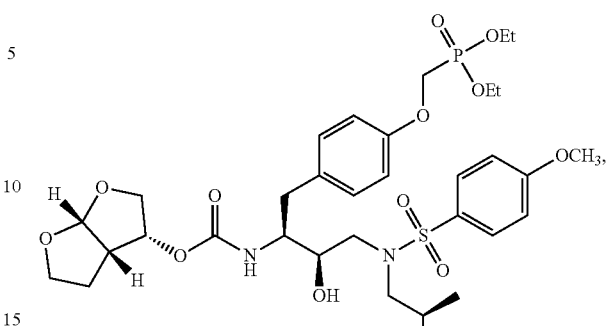

or a pharmaceutically acceptable salt thereof.

18. A pharmaceutical composition comprising a compound of claim 1, or a pharmaceutically acceptable salt thereof, and a pharmaceutically acceptable carrier.

19. A method of treating a human immunodeficiency virus (HIV) infection, the method comprising administering to a subject in need thereof a therapeutically effective amount of a compound of claim 1, or a pharmaceutically acceptable salt thereof.

20. A method of treating a human T-cell leukemia-lymphoma virus (HTLV) infection, the method comprising administering to a subject in need thereof a therapeutically effective amount of a compound of claim 1, or a pharmaceutically acceptable salt thereof.

21. A compound selected from:

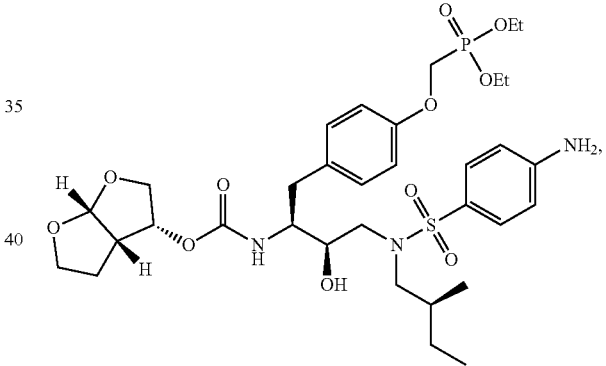

and

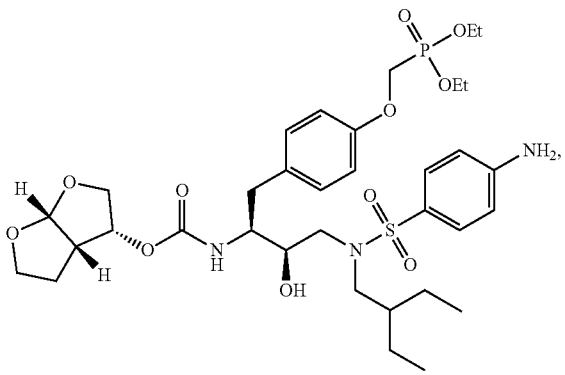

or a pharmaceutically acceptable salt thereof.

* * * * *